(12) United States Patent
Miller et al.

(10) Patent No.: US 8,131,852 B1
(45) Date of Patent: *Mar. 6, 2012

(54) USING VIRTUAL NETWORKING DEVICES TO MANAGE ROUTING COMMUNICATIONS BETWEEN CONNECTED COMPUTER NETWORKS

(75) Inventors: Kevin Christopher Miller, Herndon, VA (US); Eric Jason Brandwine, Haymarket, VA (US); Andrew J. Doane, Vienna, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/094,334

(22) Filed: Apr. 26, 2011

Related U.S. Application Data

(63) Continuation of application No. 12/648,217, filed on Dec. 28, 2009, now Pat. No. 7,953,865.

(51) Int. Cl.
*G06F 15/16* (2006.01)
(52) U.S. Cl. ........ 709/224; 709/206; 709/227; 370/313; 370/401
(58) Field of Classification Search .................. 709/206, 709/220, 227; 370/313, 401
See application file for complete search history.

(56) References Cited

U.S. PATENT DOCUMENTS

| | | | |
|---|---|---|---|
| 6,078,586 A | 6/2000 | Dugan et al. | 370/395 |
| 6,085,238 A | 7/2000 | Yuasa et al. | 709/223 |
| 6,236,365 B1 | 5/2001 | LeBlanc et al. | 342/457 |
| 6,826,607 B1 | 11/2004 | Gelvin et al. | 709/224 |
| 7,155,518 B2 | 12/2006 | Forslow | 709/227 |
| 7,469,294 B1 | 12/2008 | Luo et al. | 709/229 |
| 7,567,580 B2 * | 7/2009 | Kreiner et al. | 370/401 |
| 7,574,495 B1 * | 8/2009 | Rajagopalan | 709/223 |
| 7,613,826 B2 | 11/2009 | Guichard et al. | 709/238 |
| 7,733,795 B2 | 6/2010 | Johnson et al. | 370/252 |
| 7,870,604 B1 | 1/2011 | Guichard et al. | 726/15 |
| 7,953,865 B1 * | 5/2011 | Miller et al. | 709/227 |
| 2002/0133534 A1 | 9/2002 | Forslow | 709/200 |
| 2004/0022194 A1 | 2/2004 | Ricciulli | 370/238 |
| 2004/0162914 A1 | 8/2004 | St. Pierre et al. | 709/245 |
| 2004/0214576 A1 | 10/2004 | Myers et al. | 455/445 |
| 2005/0025071 A1 | 2/2005 | Miyake et al. | 370/254 |
| 2005/0124010 A1 | 6/2005 | Short et al. | 435/7.23 |

(Continued)

OTHER PUBLICATIONS

"ATLAS: Arbor Networks' Goldmine Should Be Open," Mar. 10, 2009, retrieved on Nov. 5, 2009, from http://packetrancher.com/atlas-arbor-networks-goldmine-should-be-open/, 4 pages.

(Continued)

*Primary Examiner* — Khanh Dinh
(74) *Attorney, Agent, or Firm* — Seed IP Law Group PLLC

(57) ABSTRACT

Techniques are described for providing managed virtual computer networks whose configured logical network topology may have one or more virtual networking devices, such as by a network-accessible configurable network service, with corresponding networking functionality provided for communications between multiple computing nodes of a virtual computer network by emulating functionality that would be provided by the networking devices if they were physically present. The networking functionality provided for a managed computer network may include supporting a connection between that managed computer network and one or more other managed computer networks, such as via a provided virtual peering router to which each of the managed computer networks may connect, with the functionality of the virtual peering router being emulated by modules of the configurable network service without physically providing the virtual peering router, including to manage routing communications between the inter-connected managed computer networks in accordance with client-specified configuration information.

23 Claims, 15 Drawing Sheets

U.S. PATENT DOCUMENTS

| | | | | |
|---|---|---|---|---|
| 2005/0232285 | A1 | 10/2005 | Terrell et al. | 370/401 |
| 2006/0229090 | A1 | 10/2006 | LaDue | 455/507 |
| 2006/0248205 | A1 | 11/2006 | Randle et al. | 709/229 |
| 2007/0186009 | A1 | 8/2007 | Guichard et al. | 709/238 |
| 2007/0263645 | A1* | 11/2007 | Kreiner et al. | 370/401 |
| 2008/0225875 | A1 | 9/2008 | Wray et al. | 370/419 |
| 2008/0232295 | A1* | 9/2008 | Kreiner et al. | 370/313 |
| 2009/0119384 | A1* | 5/2009 | Kreiner et al. | 709/206 |
| 2009/0129385 | A1 | 5/2009 | Wray et al. | 370/392 |
| 2010/0027552 | A1 | 2/2010 | Hill | 370/401 |
| 2010/0107162 | A1 | 4/2010 | Edwards et al. | 718/1 |
| 2011/0211481 | A1 | 9/2011 | Ding et al. | 370/252 |

OTHER PUBLICATIONS

"IBM Tivoli Framework," retrieved on Jul. 31, 2009, from http://en.wikipedia.org/wiki/IBM_Tivoli_Framework, 2 pages.

"OpenFlow: What is OpenFlow?" retrieved on Sep. 8, 2009, from http://www.openflowswitch.org/wp/learnmore/, 2 pages.

McKeown, N., et al., "OpenFlow: Enabling Innovation in Campus Networks," Mar. 14, 2008, retrieved on Sep. 8, 2009, from http://www.openflowswitch.org/documents/openflow-wp-latest.pdf, 6 pages.

Meyer, D., "Routeviews Update + What is LISP?" May, 2009, retrieved on Jul. 31, 2009, from http://lacnic.net/documentos/lacnicxii/presentaciones/napla/02_David_Meyer.pdf, 74 pages.

Scudder, J., et al., "BGP Monitoring Protocol," Jul. 13, 2009, retrieved on Nov. 5, 2009, from http://www.ietf.org/id/draft-ietf-grow-bmp-02.txt, 11 pages.

* cited by examiner

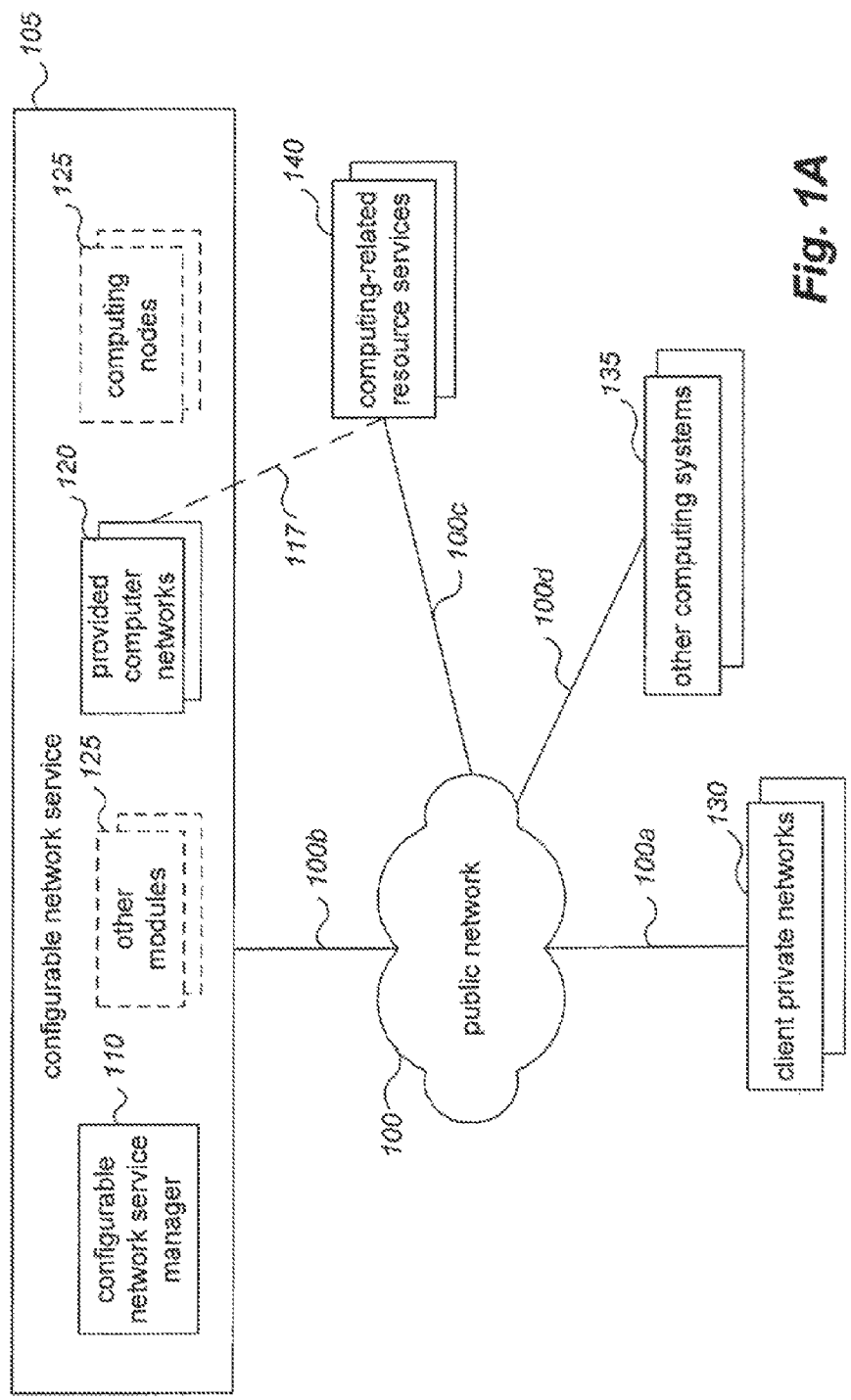

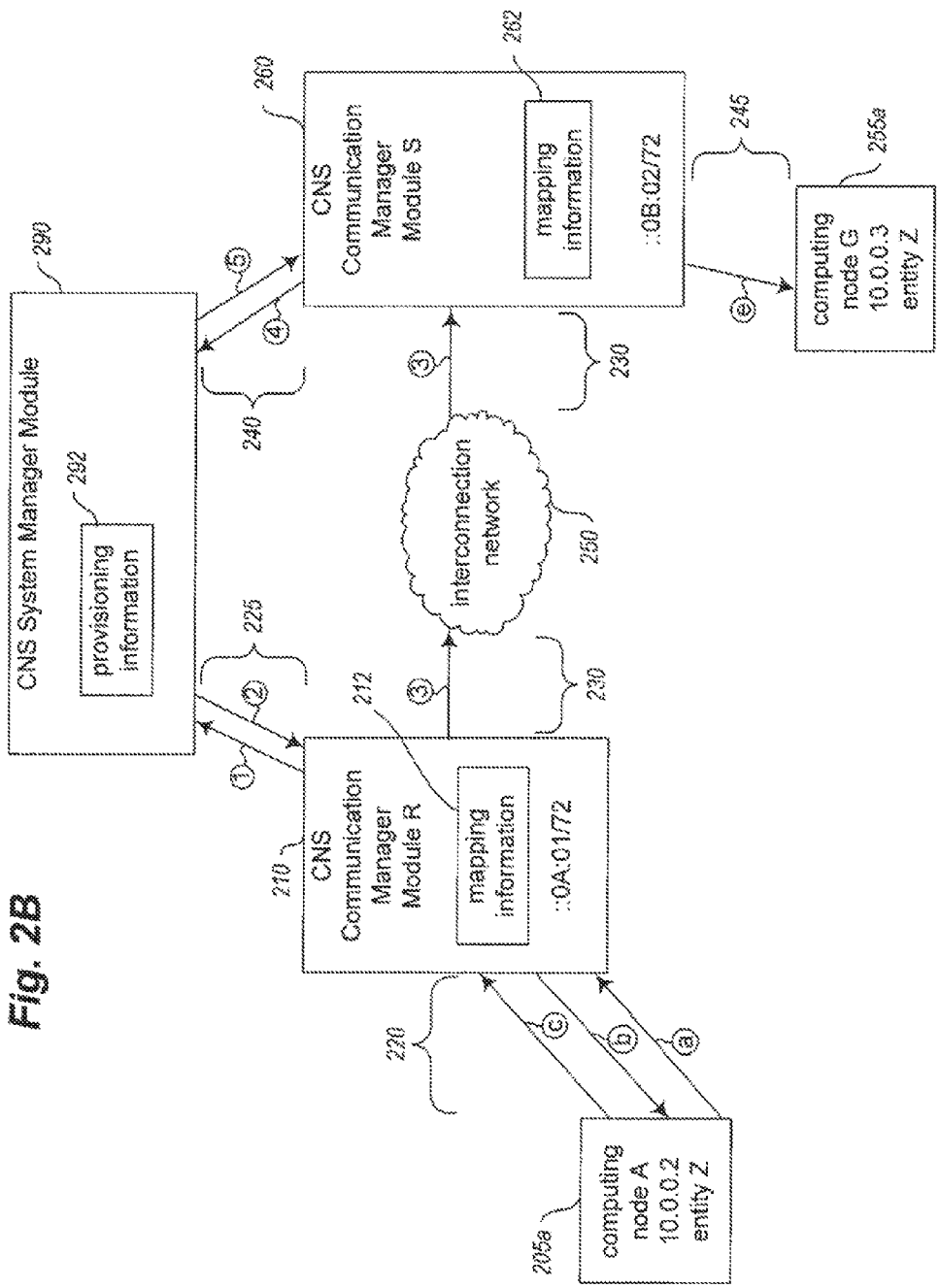

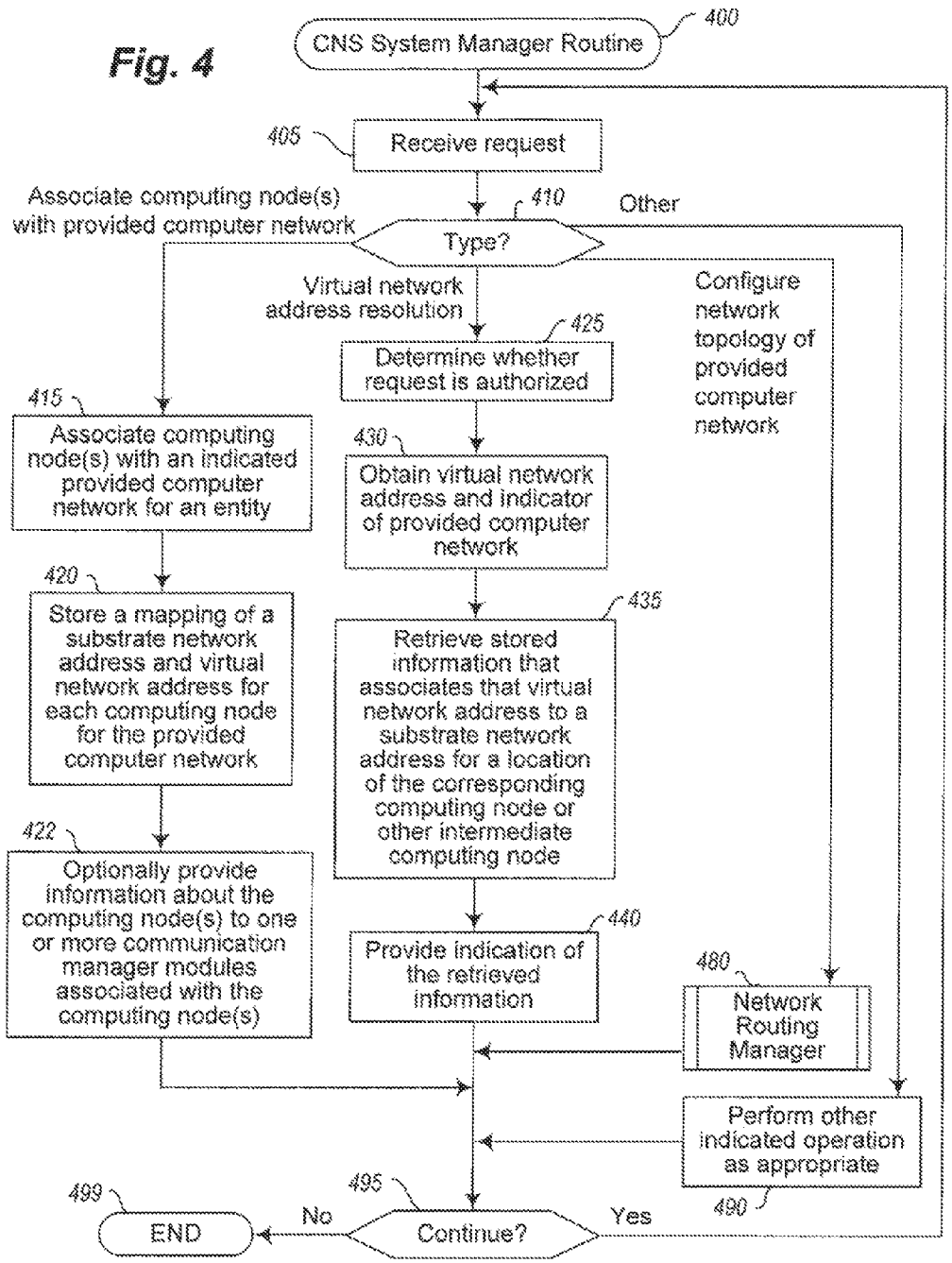

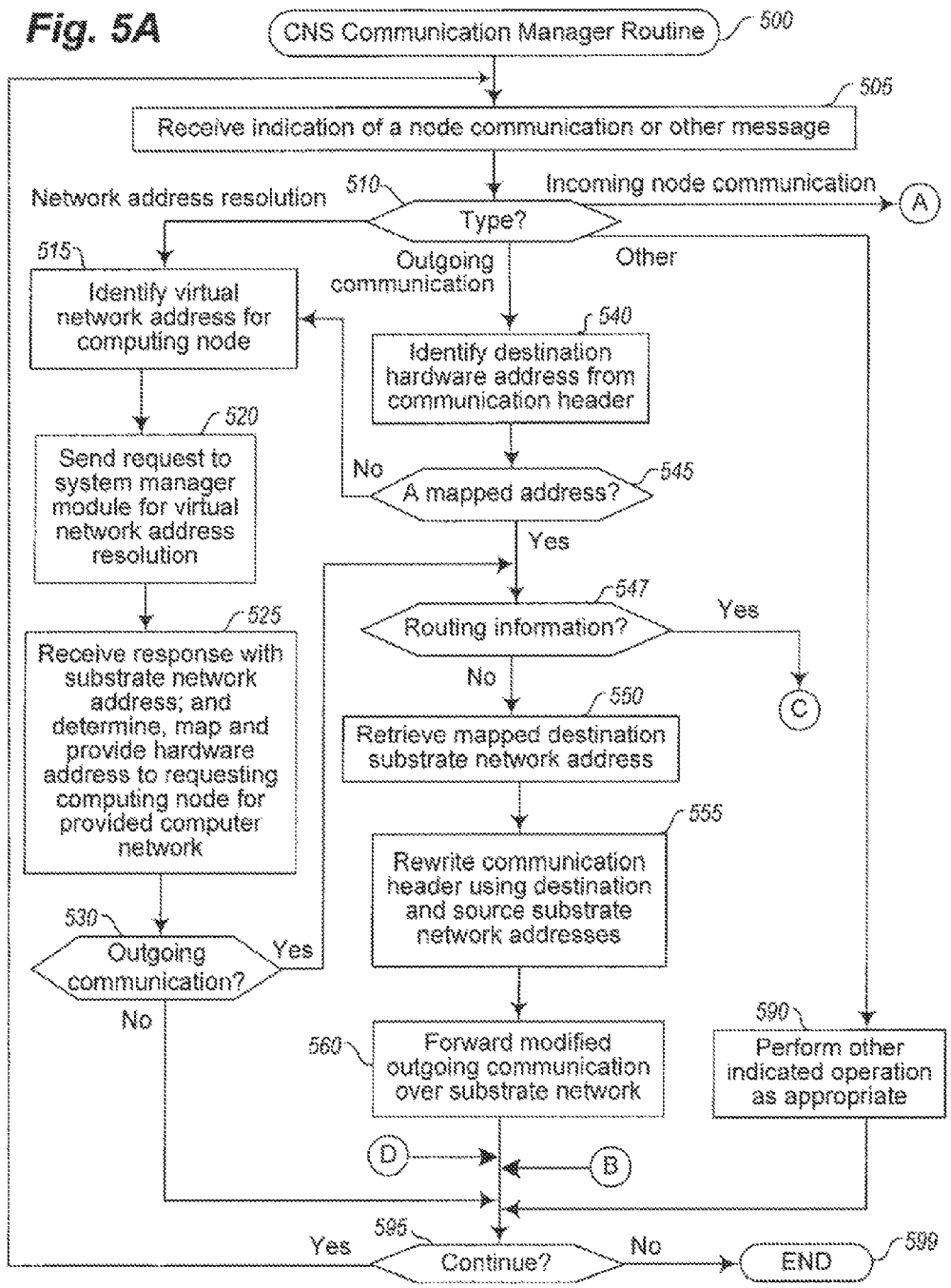

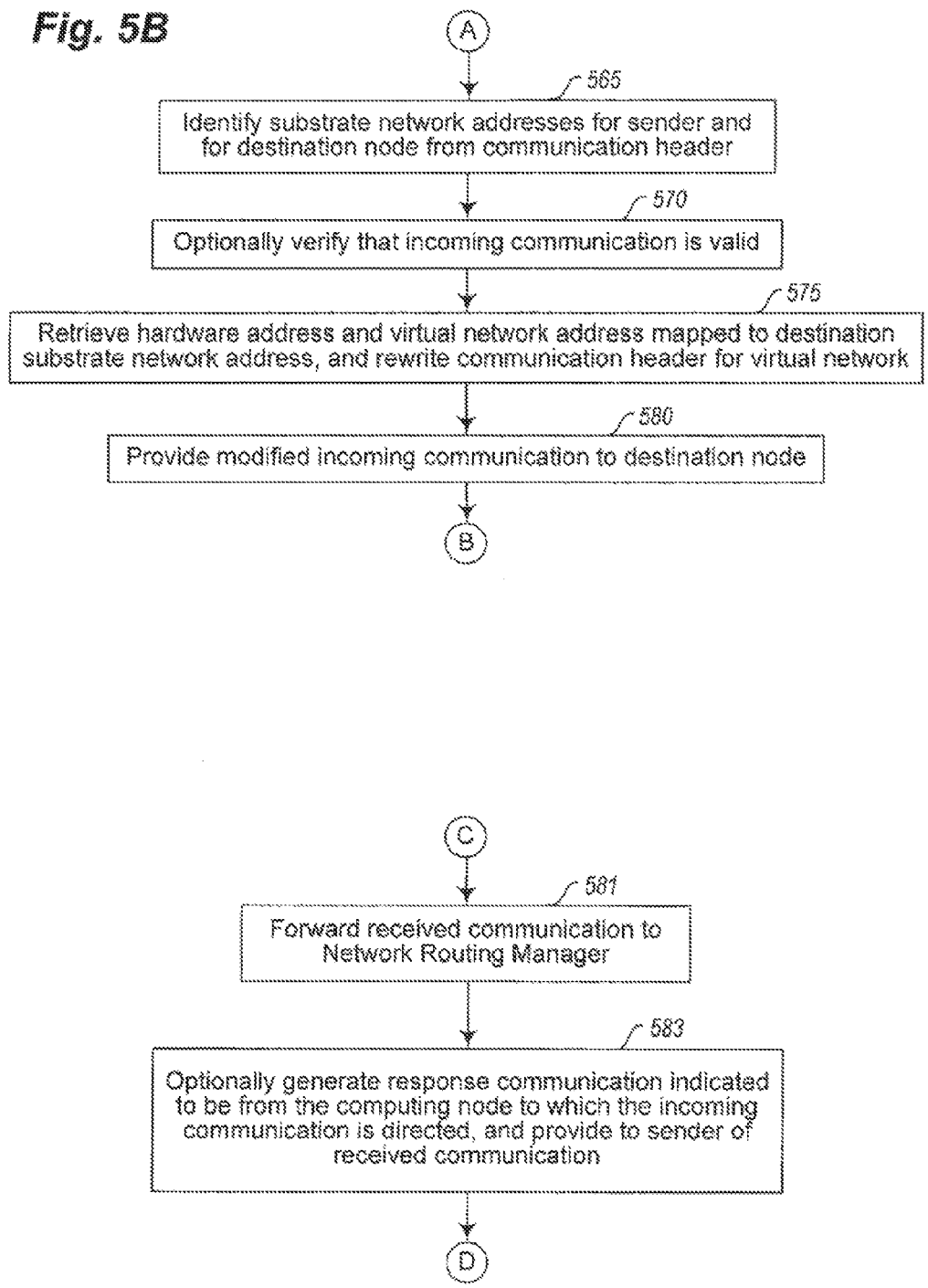

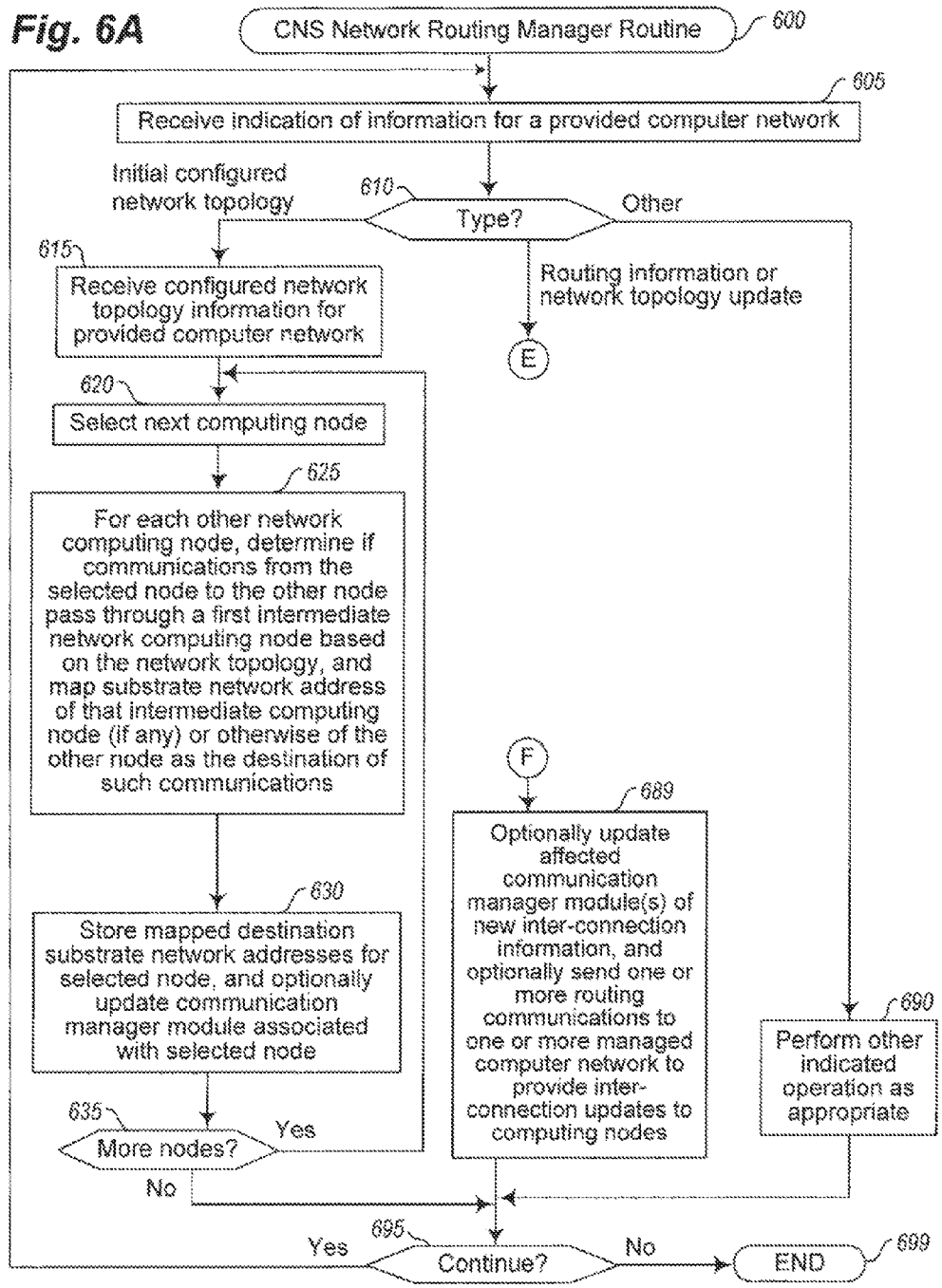

USING VIRTUAL NETWORKING DEVICES TO MANAGE ROUTING COMMUNICATIONS BETWEEN CONNECTED COMPUTER NETWORKS

CROSS-REFERENCE TO RELATED APPLICATIONS

This application is a continuation of co-pending U.S. patent application Ser. No. 12/648,217, filed Dec. 28, 2009 and entitled "Using Virtual Networking Devices to Manage Routing Communications Between Connected Computer Networks," which is hereby incorporated herein by reference.

BACKGROUND

Many companies and other organizations operate computer networks that interconnect numerous computing systems to support their operations, with the computing systems alternatively co-located (e.g., as part of a private local area network, or "LAN") or instead located in multiple distinct geographical locations (e.g., connected via one or more other private or shared intermediate networks). For example, data centers housing significant numbers of interconnected computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIGS. 1A-1C are network diagrams illustrating example embodiments of configuring and managing networking functionality provided for computing nodes belonging to a managed computer network.

FIGS. 2A-2F illustrate examples of managing communications between computing nodes of a managed virtual overlay computer network.

FIG. 4 illustrates a flow diagram of an example embodiment of a CNS System Manager routine.

FIGS. 5A-5B illustrate a flow diagram of an example embodiment of a CNS Communication Manager routine.

FIGS. 6A-6B illustrate a flow diagram of an example embodiment of a CNS Network Routing Manager routine.

DETAILED DESCRIPTION

Figure 1B:
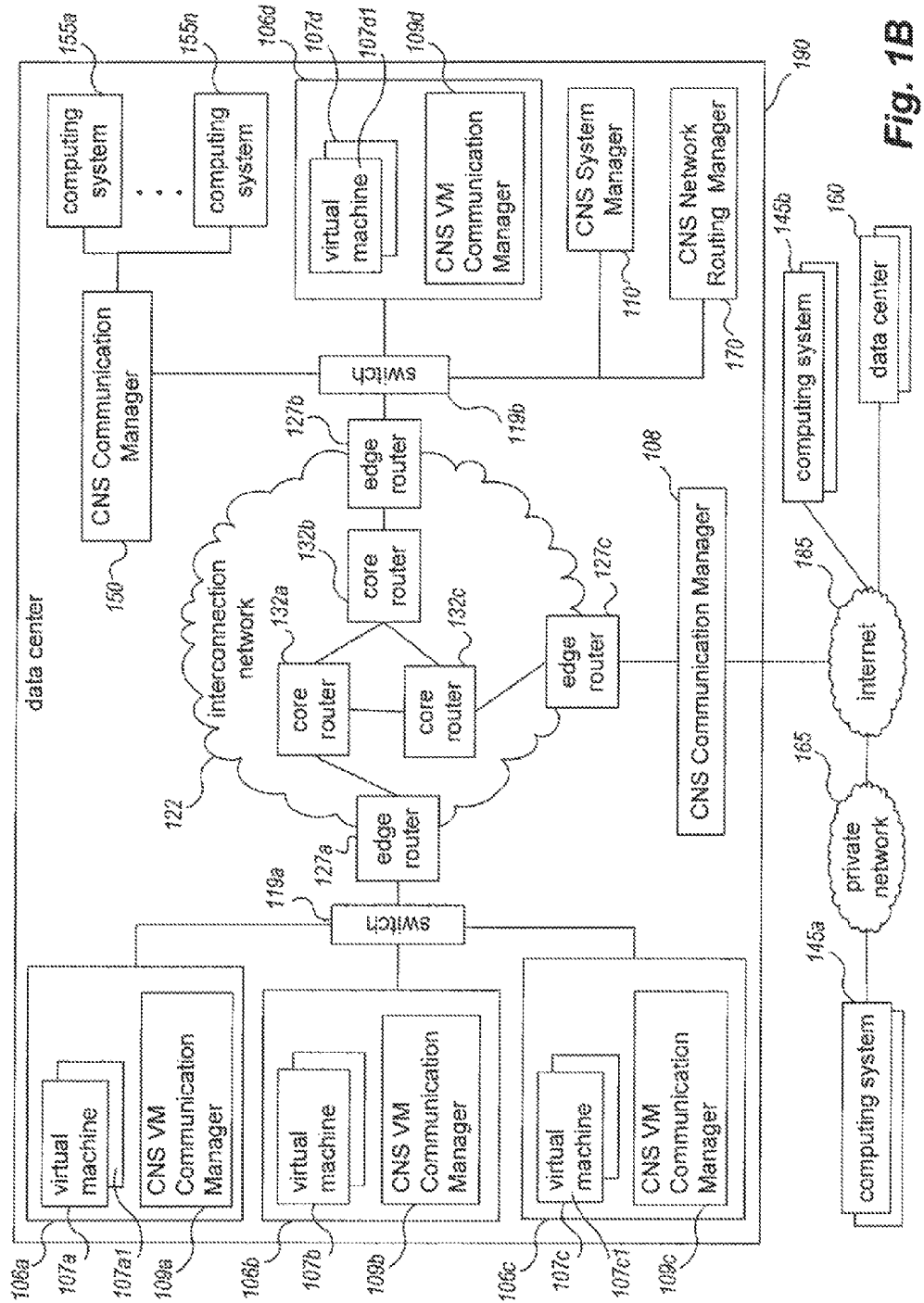

Techniques are described for providing virtual networking functionality for managed computer networks, such as for computer networks that are managed for and provided on behalf of users or other entities. Such managed computer networks may in some embodiments be provided by a configurable network service to users or other entities who are customers (e.g., for a fee) or otherwise clients of the configurable network service, such as to remote clients that access the configurable network service and/or the provided managed computer networks from remote locations over one or more intervening networks. In at least some embodiments, the described techniques enable a user to configure or otherwise specify a network topology for a managed computer network being provided for the user, such as to separate multiple computing nodes of the managed computer network into multiple logical sub-networks interconnected by one or more specified networking devices, or to otherwise include one or more specified networking devices that are each associated with a specified group of the multiple computing nodes. After a network topology is specified for a managed computer network, networking functionality corresponding to the specified network topology may be provided in various manners, such as by implementing the managed computer network as a virtual computer network overlaid on one or more other computer networks, and by providing functionality corresponding to the specified network topology without physically implementing at least some of the specified network topology. For example, the configurable network service may in some embodiments handle communications between computing nodes of a managed computer network in accordance with its specified network topology by emulating at least some types of functionality that would be provided by virtual networking devices for the managed computer network if they were physically present, but without physically providing those networking devices. Similarly, in some embodiments, routing-related communications that include routing information for the managed computer network and that are directed to the specified networking devices may be managed without physically providing the networking devices, such as by intercepting the routing communications and using the routing information to update the network topology for the managed computer network. In at least some embodiments, some or all of the described techniques are automatically performed by embodiments of a Network Routing Manager ("NRM") module and/or one or more other modules, such as one or more NRM modules and multiple communication manager modules that are part of a network-accessible configurable network service that provides configurable computer networks to clients.

In some embodiments, the providing of networking functionality for a managed computer network provided by a configurable network service to a first client may include supporting connections between that managed computer network and one or more other managed computer networks that are provided by the configurable network service, such as other managed computer networks that are provided to other clients. Such inter-connections between managed computer networks may have various forms and be used for various purposes. As one illustrative example, a first client who has a managed computer network may use that managed computer network to provide a service that is available to others, such as a service that provides information to others on a regular basis—if so, other clients that also have managed computer networks may configure their managed computer networks to be inter-connected to the managed computer network of the first client in order to receive information from the service via that inter-connection, such as optionally in a uni-directional manner that prevents the other clients' managed computer networks from transmitting information to the first client's managed computer network. As another illustrative example, multiple clients who each have a managed computer network from the configurable network service may elect to have their managed computer networks be inter-connected in a bi-directional manner so that a computing node of any one of the managed computer networks may send at least some types of communications to a computing node on any other of the managed computer networks—such multiple clients may, for example, belong to multiple companies that operate as partners or affiliates. It will be appreciated that many other inter-connection configurations and uses may be provided.

In order to support connections between multiple managed computer networks, the configurable network service in at least some embodiments provides a virtual peering router device to which each of the multiple managed computer networks may logically connect, such as by the configurable network service performing operations to emulate functionality of the provided virtual peering router, or to otherwise perform operations to support the inter-connections between the multiple managed computer networks without physically providing the virtual peering router device. When one of the multiple managed computer networks logically connects to the virtual peering router device, computing nodes of that newly connected managed computer network are able to send routing-related communications to the connected virtual peering router device, such as to provide information about the computing nodes and associated routes of that managed computer network. If other managed computer networks are also logically connected to the virtual peering router device, and the virtual peering router device is configured to enable the other managed computer networks to send communications to the newly connected managed computer network, the configurable network service may further provide information to those other managed computer networks that includes at least some of the routing information for the newly connected managed computer network, such as via one or more routing communications that are sent to those other managed computer networks and that are spoofed so as to appear to be from the virtual peering router device—accordingly, those other managed computer networks are then able to route communications to the newly connected managed computer network via the virtual peering router device. If the virtual peering router device is so configured, similar routing information for those other managed computer networks may also be sent to the newly connected managed computer network, to similarly allow the newly connected managed computer network to send communications to those other managed computer networks via the virtual peering router device. The virtual peering router device may be enabled to inter-communicate with managed computer networks in a variety of manners, including in some embodiments based on the Border Gateway Protocol ("BGP"). Additional details related to actions of the configurable network service in providing functionality to support virtual peering routers and inter-connections between managed computer networks are included below.

As noted above, the described techniques enable a user or other entity to in at least some embodiments configure or otherwise specify one or more networking devices for a managed computer network being provided on behalf of the user or entity (e.g., virtual networking devices that are part of a logical network topology for the managed computer network, but that are not physically provided), and include performing various automated actions to support such specified networking devices (e.g., intercepting routing communications directed to virtual networking devices, and using routing information in the routing communications in various manners), including in embodiments in which the managed computer network is a virtual computer network. Before discussing some details of providing virtual networking functionality corresponding to such specified networking devices for a managed computer network, some aspects of such managed computer networks in at least some embodiments are introduced.

In particular, a managed computer network between multiple computing nodes may be provided in various ways in various embodiments, such as in the form of a virtual computer network that is created as an overlay network using one or more intermediate physical networks that separate the multiple computing nodes. In such embodiments, the intermediate physical network(s) may be used as a substrate network on which the overlay virtual computer network is provided, with messages and other communications between computing nodes of the overlay virtual computer network being passed over the intermediate physical network(s), but with the computing nodes being unaware of the existence and use of the intermediate physical network(s) in at least some such embodiments. For example, the multiple computing nodes may each have a distinct physical substrate network address that corresponds to a location of the computing node within the intermediate physical network(s), such as a substrate IP ("Internet Protocol") network address (e.g., an IP network address that is specified in accordance with IPv4, or "Internet Protocol version 4," or in accordance with IPv6, or "Internet Protocol version 6," such as to reflect the networking protocol used by the intermediate physical networks). In other embodiments, a substrate network on which a virtual computer network is overlaid may itself include or be composed of one or more other virtual computer networks, such as other virtual computer networks implemented by one or more third parties (e.g., by an operator or provider of Internet or telecom infrastructure).

When computing nodes are selected to participate in a managed computer network that is a virtual computer network overlaid on a substrate network, each computing node of the managed virtual computer network may also be assigned one or more virtual network addresses for the virtual computer network that are unrelated to those computing nodes' substrate network addresses, such as from a range of virtual network addresses used for the managed virtual computer network—in at least some embodiments and situations, the managed virtual computer network being provided may further use a networking protocol that is different from the networking protocol used by the substrate network (e.g., with the virtual computer network using the IPv4 networking protocol, and the substrate computer network using the IPv6 networking protocol). The computing nodes of the virtual computer network inter-communicate using the virtual network addresses (e.g., by sending a communication to another destination computing node by specifying that destination computing node's virtual network address as the destination network address for the communication), but the substrate network may be configured to route or otherwise forward communications based on substrate network addresses (e.g., by physical network router devices and other physical networking devices of the substrate network). If so, the overlay virtual computer network may be implemented from the edge of the intermediate physical network(s), by modifying the communications that enter the intermediate physical network(s) to use substrate network addresses that are based on the networking protocol of the substrate network, and by modifying the communications that leave the intermediate physical network(s) to use virtual network addresses that are based on the networking protocol of the virtual computer network. Additional details related to the provision of such an overlay virtual computer network are included below.

In at least some embodiments, a network-accessible configurable network service ("CNS") is available for use by customers, such as a CNS provided by a corresponding CNS system that provides and manages overlay virtual computer networks for remote customers (e.g., users and other entities). Such a CNS service may, for example, provide and use numerous computing nodes that are in one or more geographical locations (e.g., in one or more data centers) and that are inter-connected via one or more intermediate physical networks. The CNS system may use various communication manager modules at the edge of the one or more intermediate physical networks to manage communications for the various overlay virtual computer networks as they enter and leave the intermediate physical network(s), and may use one or more system manager modules to coordinate other operations of the CNS system. For example, to enable the communication manager modules to manage communications for the overlay virtual computer networks being provided, the CNS system may track and use various information about the computing nodes of each virtual computer network being managed, such as to map the substrate physical network address of each such computing node to the one or more overlay virtual network addresses associated with the computing node. Such mapping and other information may be stored and propagated in various manners in various embodiments, including centrally or in a distributed manner, as discussed in greater detail below.

Furthermore, in order to provide managed virtual computer networks to users and other entities, the CNS system allows users and other entities to interact with the CNS system in at least some embodiments to configure a variety of types of information for virtual computer networks that are provided by the CNS system on behalf of the users or other entities, and may track and use such configuration information as part of providing those virtual computer networks. The configuration information for a particular managed virtual computer network having multiple computing nodes may include, for example, one or more of the following non-exclusive list: a quantity of the multiple computing nodes to include as part of the virtual computer network; one or more particular computing nodes to include as part of the virtual computer network; a range or other group of multiple virtual network addresses to associate with the multiple computing nodes of the virtual computer network; particular virtual network addresses to associate with particular computing nodes or particular groups of related computing nodes; a type of at least some of the multiple computing nodes of the virtual computer network, such as to reflect quantities and/or types of computing resources to be included with or otherwise available to the computing nodes; a geographic location at which some or all of the computing nodes of the virtual computer network are to be located; etc. In addition, the configuration information for a virtual computer network may be specified by a user or other entity in various manners in various embodiments, such as by an executing program of the user or other entity that interacts with an API ("application programming interface") provided by the CNS system for that purpose and/or by a user that interactively uses a GUI ("graphical user interface") provided by the CNS system for that purpose.

FIG. 1A is a network diagram illustrating an example of a network-accessible service that provides client-configurable managed computer networks to clients. In particular, in this example, at least some of the managed computer networks may be virtual computer networks, such as virtual computer networks that are created and configured as network extensions to existing remote private computer networks of clients, although in other embodiments the managed computer networks may have other forms and/or be provided in other manners. After configuring such a managed computer network being provided by the network-accessible service, a user or other client of the network-accessible service may interact from one or more remote locations with the provided computer network, such as to execute programs on the computing nodes of the provided computer network, to dynamically modify the provided computer network while it is in use, etc. In particular, in the illustrated example of FIG. 1A, a configurable network service ("CNS") 105 is available that provides functionality to clients (not shown) over one or more public networks 100 (e.g., over the Internet) to enable the clients to access and use managed computer networks provided to the clients by the CNS 105, including to enable the remote clients to dynamically modify and extend the capabilities of their remote existing private computer networks using cloud computing techniques over the public network 100. In addition, the CNS 105 may provide functionality to enable clients to specify logical network topology information for their managed virtual computer networks, and if so provides corresponding networking functionality (e.g., under control of an NRM module of the CNS 105, such as one of the other modules 115), as described in greater detail later.

In the example of FIG. 1A, a number of clients interact over the public network 100 with a system manager module 110 of the CNS 105 to create and configure various managed computer networks 120 being provided by the CNS 105, with at least some of the provided computer networks 120 being private computer network extensions to remote existing client private networks 130, and with at least some such of the provided computer network extensions 120 being configured to enable private access from one or more corresponding client private networks 130 over the public network 100 (e.g., via VPN connections established over inter-connections 100a and 100b, or via other types of private or non-private inter-connections). In this example embodiment, the manager module 110 assists in providing functionality of the CNS 105 to the remote clients, such as in conjunction with various optional other modules 115 of the CNS 105 and optionally various computing nodes 125 and/or networking devices (not shown) that are used by the CNS 105 to provide the managed computer networks 120. In at least some embodiments, the CNS manager module 110 may execute on one or more computing systems (not shown) of the CNS 105, and may provide one or more APIs that enable remote computing systems to programmatically interact with the module 110 to access some or all functionality of the CNS 105 on behalf of clients (e.g., to create, configure, and/or initiate use of managed computer networks 120). In addition, in at least some embodiments, clients may instead manually interact with the module 110 (e.g., via a GUI provided by the module 110) to perform some or all such actions.

The public network 100 in FIG. 1A may be, for example, a publicly accessible network of linked networks, possibly operated by distinct parties, such as the Internet. The remote client private networks 130 may each include one or more existing private networks, such as a corporate or other private network (e.g., home, university, etc.) that is partially or wholly inaccessible to non-privileged users, and that includes computing systems and/or other networked devices (not shown) of a client. In the illustrated example, the provided computer networks 120 each include multiple computing nodes (not shown), at least some of which may be from a plurality of optional computing nodes 125 provided by or otherwise under the control of the CNS 105, while in other embodiments at least some other computing systems 135 may be used to provide some or all computing nodes for one or more of the provided computer networks 120, such as other computing systems 135 that are provided by or under control of the client for whom a computer network 120 that uses those other computing systems 135 is provided, or other computing systems 135 that are provided by third parties (e.g., for a fee). Each of the provided computer networks 120 may be configured in various ways by the clients for whom they are provided, such as to be an extension to a corresponding remote computer network 130, and may each be a private computer network that is accessible only by the client that creates it, although in other embodiments at least some computer networks provided by the CNS 105 for clients may be publicly accessible and/or may be standalone computer networks that are not extensions to other existing computer networks 130. Similarly, while at least some of the provided computer networks 120 in the example may be extensions to remote client computer networks 130 that are private networks, in other embodiments the provided computer networks 120 may be extensions to other client computer networks 130 that are not private networks.

Private access between a remote client private computer network 130 and corresponding private computer network extension 120 provided for a client may be enabled in various ways, such as by establishing a VPN connection or other private connection between them that allows intercommunication over the public network 100 in a private manner. For example, the CNS 105 may automatically perform appropriate configuration on its computing nodes and other computing systems to enable VPN access to a particular private network extension 120 of a client, such as by automatically configuring one or more VPN mechanisms hosted by the CNS 105 (e.g., software and/or hardware VPN mechanisms), and/or may automatically provide appropriate configuration information to the client (e.g., credentials, access points, and/or other parameters) to allow a VPN mechanism hosted on the remote client private network 130 (e.g., a software VPN endpoint that is provided by one of the multiple computing nodes of the provided network extension 120) to establish the VPN access. After VPN access has been appropriately enabled and/or configured, a VPN connection may be established between the remote client—private network and the provided private network extension, such as initiated by the client using IPsec ("Internet Protocol Security") or other appropriate communication technologies. For example, in some embodiments, a VPN connection or other private connection may be established to or between networks that use MPLS ("Multi Protocol Label Switching") for data transmission, such as instead of an IPsec-based VPN connection. In addition, in the illustrated example, various network-accessible remote resource services 140 may optionally be available to remote computing systems over the public network 100, including to computing nodes on the remote client private networks 130. The resource services 140 may provide various functionality to the remote computing nodes, such as for at least some of the resource services 140 to provide remote computing nodes with access to various types of network-accessible computing-related resources. Furthermore, at least some of the computer networks 120 that are provided by the CNS 105 may be configured to provide access to at least some of the remote resource services 140, with that provided access optionally appearing to computing nodes of the provided computer networks 120 as being locally provided via virtual connections 117 that are part of the provided computer networks 120, although the actual communications with the remote resource services 140 may occur over the public networks 100 (e.g., via inter-connections 100b and 100c). In addition, in at least some embodiments, multiple distinct provided computer networks 120 may be configured to enable inter-access with each other, as described in greater detail elsewhere.

The provided computer networks 120 may each be configured by clients in various manners. For example, in at least some embodiments, the CNS 105 provides various computing nodes 125 that are available for use with computer networks provided to clients, such that each provided computer network 120 may include a client-configured quantity of multiple such computing nodes that are dedicated for use as part of that provided computer network. In particular, a client may interact with the module 110 to configure a quantity of computing nodes to initially be included in a computer network provided for the client (e.g., via one or more programmatic interactions with an API provided by the CNS 105). In addition, the CNS 105 may provide multiple different types of computing nodes in at least some embodiments, such as, for example, computing nodes with various performance characteristics (e.g., processor speed, memory available, storage available, etc.) and/or other capabilities. If so, in at least some such embodiments, a client may specify the types of computing nodes to be included in a provided computer network for the client. In addition, in at least some embodiments, a client may interact with the module 110 to configure network addresses for a computer network provided for the client (e.g., via one or more programmatic interactions with an API provided by the CNS 105), and network addresses may later be dynamically added, removed or modified for a provided computer network of a client in at least some such embodiments, such as after the provided computer network has already been in use by the client. In addition, in at least some embodiments, a client may interact with the module 110 to configure network topology information for a computer network provided for the client (e.g., via one or more programmatic interactions with an API provided by the CNS 105), and such network topology information may later be dynamically modified for a provided computer network in at least some such embodiments, such as after the provided computer network has already been in use by the client. Furthermore, in at least some embodiments, a client may interact with the module 110 to configure various network access constraint information for a computer network provided for the client (e.g., via one or more programmatic interactions with an API provided by the CNS 105), and such network access constraint information may later be dynamically modified for a provided computer network in at least some such embodiments, such as after the provided computer network has already been in use by the client.

Network addresses may be configured for a provided computer network in various manners in various embodiments. For example, if a particular provided computer network that is being configured is an extension to an existing remote client computer network, the client may specify one or more address ranges (e.g., a Classless Inter-Domain Routing ("CIDR") address block) or other groups of network addresses for the provided computer network that are a subset of the network addresses used by the existing remote client computer network, such that at least some of the specified network addresses are used for the computing nodes of the provided computer network. Such configured network addresses may in some situations be virtual or private network addresses that are not directly addressable from computing systems on the public network 100 (e.g., if the existing remote client computer network and the corresponding provided network extension use network address translation techniques and/or virtual networking techniques for the client computer network and its provided network extension), while in other situations at least some of the configured network addresses may be public network addresses that are directly addressable from computing systems on the public network 100 (e.g., a public network address that is a static Internet-routable IP address or other non-changing network address). In other embodiments, the CNS 105 may automatically select network addresses to be used for at least some computing nodes of at least some provided computer networks, such as based on network addresses that are available for use by the CNS 105, based on selecting network addresses that are related to network addresses used by remote existing computer networks corresponding to the provided computer networks, etc. Furthermore, if two or more of the computer networks provided by the CNS 105 are configured to enable inter-communications between the provided computer networks (e.g., for two or more computer networks provided to a single customer, such as for different departments or groups within a single organization; for two or more computer networks provided to two or more distinct customers; etc.), the CNS 105 may in some embodiments automatically select network addresses to be used for at least some computing nodes of those provided computer networks to facilitate the inter-communications, such as by using different network addresses for the various provided computer networks. In addition, in at least some embodiments in which the CNS 105 provides virtual networks to clients, such as by using overlay networks on a substrate network, each client may be allowed to specify any network addresses to be used for their provided computer networks, even if multiple clients specify the same or overlapping network addresses for their respective provided computer networks—in such embodiments, the CNS 105 manages the network addresses distinctly for each client, such that a first client may have a first computing node associated with a particular specified network address for the first client's provided computer network, while a distinct second client may have a distinct second computing node associated with the same particular specified network address for the second client's provided computer network. Once network addresses are configured or otherwise determined for a provided computer network, the CNS 105 may assign the network addresses to various of the computing nodes selected for the provided computer network, such as in a random manner, by using DHCP ("Dynamic Host Configuration Protocol") or other techniques for dynamic assignment of network addresses, etc.

Network topology information may be configured for a provided computer network in various manners in various embodiments. For example, a client may specify particular types of networking devices (e.g., routers, switches, etc.) and/or other network devices or nodes (e.g., load balancers, firewalls, proxies, network storage devices, printers, etc.) to be part of the provided computer network, and may specify interconnectivity information between networking devices and computing nodes. Furthermore, in at least some embodiments, the CNS 105 may provide available computing nodes in multiple geographical locations (e.g., in multiple geographically distributed data centers), and the configuration information specified by a client for a provided computer network may further indicate one or more geographical locations in which computing nodes of the provided computer network are to be located (e.g., to provide fault tolerance among the computing nodes of a provided computer network by having them located in multiple geographical locations), and/or may otherwise provide information about preferences or requirements of how the computing nodes of the provided computer network are to interoperate that is used by the CNS 105 to select one or more such geographical locations (e.g., minimum or maximum network latency or bandwidth for computing node intercommunications; minimum or maximum network proximity between computing nodes; minimum or maximum geographic proximity between computing nodes; having local access to particular resources or functionality that is not available in all such geographic locations; having specified locations relative to other external computing systems, such as to a remote computer network of the client and/or to a remote resource service; constraints or other preferences based on the cost of obtaining use of particular computing nodes and/or for particular types of interactions with particular computing nodes, such as costs associated with providing data to and/or from those computing nodes; etc.). As discussed in greater detail elsewhere, in at least some embodiments, the inter-connections and intercommunications between computing nodes of a provided computer network are managed using an underlying substrate network of the CNS 105, and if so, some or all of the configured network topology information may be simulated or otherwise emulated in at least some such embodiments using the underlying substrate network and corresponding modules of the CNS 105. For example, each of the computing nodes provided by the CNS 105 may be associated with a node communication manager module of the CNS 105 that manages communications to and from its associated computing node(s), and if so, the associated communication manager module for a computing node may take various actions to emulate desired functionality of a network with respect to that computing node, as discussed in greater detail elsewhere.

Network access constraint information may also be configured for a provided computer network in various manners in various embodiments. For example, a client may specify information about whether and how some or all of the computing nodes of a provided computer network are allowed to communicate with other computing nodes of the provided computer network and/or with other external computing systems, such as based on one or more of the following: directions of communications (incoming versus outgoing); types of communications (e.g., based on the types of content included and/or the types of communication protocols used, such as to allow HTTP requests for text but not images and to not allow FTP requests); locations of other computing systems (e.g., whether part of the provided computer network, part of a remote client computer network corresponding to the provided computer network, part of a remote resource service to which access has been established, external to the provided computer network and any corresponding remote client computer network, etc.); types of other computing systems; etc. In a manner similar to that for network topology information, the CNS 105 may enforce network access constraint information for provided computer networks in various manners.

Thus, managed computer networks may be provided for clients in various manners in various embodiments, and may be configured to have various types of functionality in various embodiments.

In addition, in at least some embodiments, the computing nodes of the managed computer networks may be physical computing systems and/or may be virtual machines that are each hosted on one or more physical computing systems, and the communications that are handled for managed computer networks may include transmissions of data (e.g., messages, packets, frames, streams, etc.) in various formats. As previously noted, some or all computing nodes used for a particular provided overlay virtual computer network may in some embodiments be provided by the CNS system for use by users, while in other embodiments some or all such computing nodes may instead be provided by a user who uses those computing nodes. Furthermore, in at least some situations, an embodiment of the CNS system, may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center). In at least some such embodiments, virtual computer networks to which computing nodes belong may be selected based on associated users, such as based on the computing nodes executing programs on behalf of a user or other entity.

As previously noted, a virtual computer network may in some embodiments be provided as an overlay network that uses one or more intermediate physical networks as a substrate network, and one or more such overlay virtual computer networks may be implemented over the substrate network in various ways in various embodiments. For example, in at least some embodiments, communications between nodes of an overlay virtual computer network are managed by sending those communications over the substrate network without encapsulating the communications, such as by embedding virtual network address information for a computing node of the virtual computer network (e.g., the destination computing node's virtual network address) in a larger physical network address space used for a networking protocol of the one or more intermediate physical networks. As one illustrative example, a virtual computer network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual computer network and substrate computer network may be implemented using the same network addressing protocol (e.g., IPv4 or IPv6), and data transmissions sent via the provided overlay virtual computer network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay computer networks may be implemented using encapsulation of communications. Additional details related to SIIT are available at "Request For Comments 2765—Stateless IP/ICMP Translation Algorithm", February 2000, at tools<dot>ietf<dot>org<slash>html<slash>rfc2765 (where <dot> and <slash> are replaced by the corresponding characters with those names), which is hereby incorporated by reference in its entirety. More generally, in some embodiments when implementing a first overlay network using a second substrate network, an N-bit network address that is specified for the first overlay network in accordance with a first network addressing protocol may be embedded as part of another M-bit network address that is specified for the second substrate network in accordance with a second network addressing protocol, with "N" and "M" being any integers that correspond to network addressing protocols. In addition, in at least some embodiments, an N-bit network address may be embedded in another network address using more or less than N bits of the other network address, such as if a group of N-bit network addresses of interest may be represented using a smaller number of bits (e.g., with L-bit labels or identifiers being mapped to particular N-bit network addresses and embedded in the other network addresses, where "L" is less than "N").

Various benefits may be obtained from embedding virtual network address information in substrate network addresses for an underlying substrate network, including enabling an overlay of the virtual computer network on the substrate network without encapsulating communications or configuring physical networking devices of the substrate network, as discussed in greater detail below. Furthermore, other information may similarly be embedded in the larger physical network address space for a communication between computing nodes in at least some embodiments and situations, such as an identifier specific to a particular virtual computer network that includes those computing nodes (e.g., a virtual computer network for a user or other entity on whose behalf those computing nodes operate), an identifier corresponding to a particular virtual local area network, etc. Additional details related to provision of such virtual computer networks via use of overlay networks are included below.

Furthermore, in addition to managing configured network topologies for provided virtual computer networks, the CNS system may use the described techniques to provide various other benefits in various situations, such as limiting communications to and/or from computing nodes of a particular virtual computer network to other computing nodes that belong to that virtual computer network. In this manner, computing nodes that belong to multiple virtual computer networks may share parts of one or more intermediate physical networks, while still maintaining network isolation for computing nodes of a particular virtual computer network. In addition, the use of the described techniques also allows computing nodes to easily be added to and/or removed from a virtual computer network, such as to allow a user to dynamically modify the size of a virtual computer network (e.g., to dynamically modify the quantity of computing nodes to reflect an amount of current need for more or less computing resources). Furthermore, the use of the described techniques also supports changes to an underlying substrate network— for example, if the underlying substrate network is expanded to include additional computing nodes at additional geographical locations, existing or new virtual computer networks being provided may seamlessly use those additional computing nodes, since the underlying substrate network will route communications to and from the substrate network addresses for those additional computing nodes in the same manner as for other previously existing substrate network computing nodes. In at least some embodiments, the underlying substrate network may be of any size (e.g., spanning multiple countries or continents), without regard to network latency between computing nodes at different locations.

At least some such benefits may similarly apply for logical sub-networks (or "subnets") that are specified for such a particular provided virtual computer network, with the substrate network functionality used to emulate various functionality corresponding to the specified logical subnets. For example, the use of the underlying substrate network may enable different computing nodes assigned to a particular logical subnet to be located at any position within the substrate network, with the substrate network forwarding communications to destination computing nodes based on those destination computing nodes' substrate network addresses. As such, the substrate network may support any specified logical subnets, without any configuration regarding such specified logical subnets and without any other use of information about such specified logical subnets, and with the CNS system modules (e.g., communication manager modules) instead managing the corresponding functionality from the logical edges of the substrate network where the CNS system modules connect to the substrate network. In addition, modules of the CNS system may similarly operate to limit communications within a particular provided virtual computer network to occur only between computing nodes assigned to particular logical subnets specified for the provided computer network, if so configured, such as by authorizing whether to forward particular communications to indicated destination computing nodes and by directing communications to particular computing nodes selected to act as destination computing nodes, so as to provide network isolation for computing nodes assigned to those specified logical subnets.

For illustrative purposes, some embodiments are described below in which specific types of computing nodes, networks, communications, network topologies, and configuration operations are performed. These examples are provided for illustrative purposes and are simplified for the sake of brevity, and the inventive techniques may be used in a wide variety of other situations, some of which are discussed below.

FIG. 1B is a network diagram illustrating an example embodiment of configuring and managing communications between computing nodes belonging to a virtual computer network, by overlaying the virtual computer network and the communications on one or more intermediate physical networks in a manner transparent to the computing nodes of the virtual computer network. In this example, the configuring and managing of the communications is facilitated by a system manager module, a network routing manager module, and multiple communication manager modules of an example embodiment of the CNS system. The example CNS system may be used, for example, in conjunction with a publicly accessible program execution service (not shown), or instead may be used in other situations, such as with any use of virtual computer networks on behalf of one or more entities (e.g., to support multiple virtual computer networks for different parts of a business or other organization on a private network of the organization).

The illustrated example includes an example data center 190 with multiple physical computing systems operated on behalf of the CNS system. The example data center 190 is connected to an internet 185 external to the data center 190, which provides access to one or more computing systems 145a via private network 165, to one or more other globally accessible data centers 160 that each have multiple computing systems (not shown), and to one or more other computing systems 145b. The internet 185 may be, for example, a publicly accessible network of networks (possibly operated by various distinct parties), such as the Internet, and the private network 165 may be, for example, a corporate network that is wholly or partially inaccessible from computing systems external to the private network 165. Computing systems 145b may be, for example, home computing systems or mobile computing devices that each connects directly to the Internet (e.g., via a telephone line, cable modem, a Digital Subscriber Line ("DSL"), cellular network or other wireless connection, etc.).

The example data center 190 includes a number of physical computing systems 106a-106d and 155a-155n, as well as a Communication Manager module 150 that executes on one or more other computing systems or devices (not shown) to manage communications for the associated computing systems 155a-155n, an external Communication Manager module 108 that executes on one or more other computing systems or devices (not shown) to manage external communications that pass in and out of the data center 190 over the internet 185, a System Manager module 110 that executes on one or more computing systems (not shown), and a Network Routing Manager module 170 that executes on one or more computing systems (not shown). While not illustrated here, in some embodiments one or more other modules may also be present and executing on one or more computing systems or devices of the data center 190, and the System Manager module 110 and/or the Network Routing Manager module 170 may have one or more associated Communication Manager modules that manage information sent to and from the modules 110 and 170. In this example, each physical computing system 106a-106d hosts multiple virtual machine computing nodes and includes an associated virtual machine ("VM") communication manager module (e.g., as part of a virtual machine hypervisor monitor for the physical computing system), such as VM Communication Manager module 109a and multiple virtual machines 107a on host computing system 106a, and such as VM Communication Manager module 109d and multiple virtual machines 107d on host computing system 106d. Physical computing systems 155a-155n do not execute any virtual machines in this example, and thus may each act as a computing node that directly executes one or more software programs on behalf of a user. The Communication Manager module 150 that manages communications for the associated computing systems 155a-155n may be implemented as part of various types of devices, such as, for example, a proxy computing device, a firewall device, or a networking device (e.g., a switch, router, hub, etc.) through which communications to and from the physical computing systems travel. Similarly, the Communication Manager module 108 that manages communications between the data center 190 and the internet 185 may be implemented as part of various types of devices, such as, for example, a firewall device, a network address translation ("NAT") device, one or more load balancer devices, the edge router 127c, or another networking device. In other embodiments, all or none of the physical computing systems at the data center may host virtual machines.

This example data center 190 further includes multiple physical networking devices, such as switches 119a-119b, edge router devices 127a-127c, and core router devices 132a-132c. Switch 119a is part of a physical sub-network that includes physical computing systems 106a-106c, and is connected to edge router 127a. Switch 119b is part of a distinct physical sub-network that includes physical computing systems 106d and 155a-155n, as well as the computing systems providing the Communication Manager module 150, the System Manager module 110, and the Network Routing Manager module 170, and is connected to edge router 127b. The physical sub-networks established by switches 119a-119b, in turn, are connected to each other and other networks (e.g., the internet 185) via an intermediate inter-connection network 122, which includes the edge routers 127a-127c and the core routers 132*a*-132*c*. The edge routers 127*a*-127*c* provide gateways between two or more physical sub-networks or networks. For example, edge router 127*a* provides a gateway between the physical sub-network established by switch 119*a* and the inter-connection network 122, while edge router 127*c* provides a gateway between the inter-connection network 122 and internet 185 (e.g., via the module 108). The core routers 132*a*-132*c* manage communications within the inter-connection network 122, such as by routing or otherwise forwarding packets or other data transmissions as appropriate based on characteristics of such data transmissions (e.g., header information including source and/or destination addresses, protocol identifiers, etc.) and/or the characteristics of the inter-connection network 122 itself (e.g., routes based on the physical network topology, etc.).

The illustrated System Manager module and Communication Manager modules may perform at least some of the described techniques in order to configure, authorize and otherwise manage communications sent to and from associated computing nodes, including to support providing various virtual networking functionality for one or more virtual computer networks that are provided using various of the computing nodes, and/or to support providing various emulated functionality for one or more virtual networking devices that are configured for one or more such provided virtual computer networks. Such functionality may further be supported in at least some embodiments by one or more Network Routing Manager modules, such as Network Routing Manager module 170, which assist in determining and configuring routing information to be used to support provided virtual computer networks, as discussed in greater detail below. For example, Communication Manager module 109*a* manages associated virtual machine computing nodes 107*a*, Communication Manager module 109*d* manages associated virtual machine computing nodes 107*d*, and each of the other Communication Manager modules 109 and 150 may similarly manage communications for a group of one or more other associated computing nodes. The illustrated Communication Manager modules may configure communications between computing nodes so as to overlay one or more particular virtual networks over one or more intermediate physical networks that are used as a substrate network, such as over the inter-connection network 122, and so as to support one or more virtual networking devices for such an overlaid particular virtual network that are not physically provided. Furthermore, a particular virtual computer network may optionally be extended beyond the data center 190 in some embodiments, such as if one or more other data centers 160 also provide computing nodes that are available for use by the example CNS system, and the particular virtual network includes computing nodes at two or more such data centers at two or more distinct geographical locations. Multiple such data centers or other geographical locations of one or more computing nodes may be inter-connected in various manners, including the following: directly via one or more public networks in a non-private manner, or via a private connection, not shown (e.g., a dedicated physical connection that is not shared with any third parties, such as a leased line; a VPN or other mechanism that provides the private connection over a public network; etc.). In addition, while not illustrated here, other such data centers or other geographical locations may each include one or more other Communication Manager modules that manage communications for computing systems at that data center or other geographical location, such as Communication Manager modules similar to module 108 that manage external communications for their data centers.

In addition, a particular virtual computer network may optionally be extended beyond the data center 190 in other manners in other embodiments, such as based on one or more other Communication Manager modules external to the data center 190 (e.g., if another Communication Manager module is made part of private network 165, so as to manage communications for computing systems 145*a* over the internet 185 and private network 165; etc.). Thus, for example, if an organization operating private network 165 desires to virtually extend its private computer network 165 to one or more of the computing nodes of the data center 190, it may do so by implementing one or more Communication Manager modules as part of the private network 165 (e.g., as part of the interface between the private network 165 and the internet 185)—in this manner, computing systems 145*a* within the private network 165 may communicate with those data center computing nodes as if those data center computing nodes were part of the private network. In other embodiments, the private computer network 165 may instead be extended to one or more computing nodes of the data center 190 by the module 108 of the data center 190 managing the communications between computing nodes of the private network 165 and particular data center 190 computing nodes.

Thus, as one illustrative example, one of the virtual machine computing nodes 107*a* on computing system 106*a* (in this example, virtual machine computing node 107*a*1) may be part of the same provided virtual computer network as one of the virtual machine computing nodes 107*d* on computing system 106*d* (in this example, virtual machine computing node 107*d*1), and may further both be assigned to a specified logical subnet of that virtual computer network that includes a subset of the computing nodes for that virtual computer network, such as with the IPv4 networking protocol being used to represent the virtual network addresses for the virtual computer network. The virtual machine 107*a*1 may then direct an outgoing communication (not shown) to the destination virtual machine computing node 107*d*1, such as by specifying a virtual network address for that destination virtual machine computing node (e.g., a virtual network address that is unique for the local broadcast domain of the specified subnet). The Communication Manager module 109*a* receives the outgoing communication, and in at least some embodiments determines whether to authorize the sending of the outgoing communication, such as based on previously obtained information about the sending virtual machine computing node 107*a*1 and/or about the destination virtual machine computing node 107*d*1 (e.g., information about virtual computer networks and/or entities with which the computing nodes are associated, information about any specified logical subnets to which the computing nodes belong, etc.), and/or by dynamically interacting with the System Manager module 110 (e.g., to obtain an authorization determination, to obtain some or all such information, etc.). By not delivering unauthorized communications to computing nodes, network isolation and security of entities' virtual computer networks is enhanced.

If the Communication Manager module 109*a* determines that the outgoing communication is authorized (or does not perform such an authorization determination), the module 109*a* determines the actual physical network location corresponding to the destination virtual network address for the communication. For example, the Communication Manager module 109*a* may determine the actual destination network address to use for the virtual network address of the destination virtual machine 107*d*1 by dynamically interacting with the System Manager module 110, or may have previously determined and stored that information (e.g., in response to a request from the sending virtual machine 107a1 for information about that destination virtual network address, such as a request that the virtual machine 107a1 specifies using Address Resolution Protocol, or ARP). The Communication Manager module 109a then re-headers or otherwise modifies the outgoing communication so that it is directed to Communication Manager module 109d using an actual substrate network address, such as if Communication Manager module 109d is associated with a range of multiple such actual substrate network addresses. FIGS. 2A-2F provide examples of doing such communication management in some embodiments, including to emulate functionality corresponding to one or more virtual networking devices specified for the virtual network that are not physically provided.

When Communication Manager module 109d receives the communication via the inter-connection network 122 in this example, it obtains the virtual destination network address for the communication (e.g., by extracting the virtual destination network address from the communication), and determines to which of the virtual machine computing nodes 107d managed by the Communication Manager module 109d that the communication is directed. The Communication Manager module 109d next determines whether the communication is authorized for the destination virtual machine computing node 107d1, with examples of such authorization activities discussed in further detail in the examples of FIGS. 2A-2F. If the communication is determined to be authorized (or the Communication Manager module 109d does not perform such an authorization determination), the Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards the modified communication to the destination virtual machine computing node 107d1. In at least some embodiments, before forwarding the incoming communication to the destination virtual machine, the Communication Manager module 109d may also perform additional steps related to security, as discussed in greater detail elsewhere.

In addition, while not illustrated in FIG. 1B, in some embodiments the various Communication Manager modules may take further actions to provide virtual networking functionality corresponding to a specified network topology for the provided virtual computer network (e.g., for one or more virtual networking devices for the provided virtual computer network), such as by managing communications between computing nodes of the provided virtual computer network in specified manners and by responding to other types of requests sent by computing nodes of the virtual computer network. For example, although being separated from computing node 107a1 on physical computing system 106a by the inter-connection network 122 in the example embodiment of FIG. 1B, virtual machine computing node 107d1 on physical computing system 106d may be configured to be part of the same logical sub-network of the virtual computer network as computing node 107a1 (e.g., to not be separated by any specified router devices). Conversely, despite the physical proximity of virtual machine computing node 107c1 on physical computing system 106c to virtual machine computing node 107a1 on physical computing system 106a (i.e., being part of the same physical sub-network without any intervening physical router devices) in the example embodiment of FIG. 1B, computing node 107c1 may be configured to be part of a distinct logical sub-network of the virtual computer network from that of computing node 107a1 (e.g., may be configured to be separated by one or more specified router devices, not shown, which in this example are virtual router devices that are not physically provided for the virtual computer network). If computing nodes 107a1 and 107d1 are configured to be part of the same logical sub-network, the previous example of sending a communication from computing node 107a1 to computing node 107d1 may be performed in the manner previously described, without emulating the actions of any intervening virtual router devices (despite the use of multiple physical router devices in the substrate inter-connection network 122 for forwarding the communication), since computing nodes 107a1 and 107d1 are configured to be part of single sub-network in the specified network topology.

However, if computing node 107a1 sends an additional communication to computing node 107c1, the Communication Manager modules 109a and/or 109c on the host computing systems 106a and 106c may perform additional actions that correspond to one or more virtual specified router devices configured in the specified network topology to separate the computing nodes 107a1 and 107c1. For example, the source computing node 107a1 may send the additional communication in such a manner as to initially direct it to a first of the virtual specified router devices that is configured to be local to computing node 107a1 (e.g., by including a virtual hardware address in the header of the additional communication that corresponds to that first virtual specified router device), with that first virtual specified router device being expected to forward the additional communication on toward the destination computing node 107c1 via the specified logical network topology. If so, the source Communication Manager module 109a may detect that forwarding of the additional communication to the virtual first router device (e.g., based on the virtual hardware address used in the header of the additional communication), or otherwise be aware of the configured network topology for the virtual computer network, and may take actions to emulate functionality of some or all of the virtual specified router devices that are configured in the specified network topology to separate the computing nodes 107a1 and 107c1. For example, each virtual router device that forwards the additional communication may be expected to take actions such as modifying a TTL ("time to live") hop value for the communication, modify a virtual destination hardware address that is specified for the communication to indicate the next intended destination of the additional communication on a route to the destination computing node, and/or otherwise modify the communication header. If so, the source Communication Manager module 109a may perform some or all of those actions before forwarding the additional communication directly to the destination Communication Manager module 109c over the substrate network (in this case, via physical switch device 119a) for provision to destination computing node 107c1. Alternatively, some or all such additional actions to provide the virtual networking functionality for the sent additional communication may instead be performed by the destination Communication Manager module 109c after the additional communication is forwarded to the Communication Manager module 109c by the Communication Manager module 109a.

By providing virtual networking functionality using the described techniques, the CNS system provides various benefits. For example, because the various Communication Manager modules manage the overlay virtual network and may emulate functionality of virtual networking devices, specified networking devices and other network topology do not need to be physically implemented for virtual computer networks being provided, and thus corresponding modifications are not needed to the inter-connection network 122 or switches 119a-119b to support particular configured network topologies. Nonetheless, if the computing nodes and software programs of a virtual computer network have been configured to expect a particular network topology for the provided virtual computer network, the appearance and functionality of that network topology may nonetheless be transparently provided for those computing nodes by the described techniques.

In addition, as previously noted, the described techniques include performing various additional actions in at least some embodiments to support networking devices specified for managed computer networks, such as for virtual networking devices that are not physically provided and whose functionality is emulated, with the modules of a configurable network service being configured to perform various automated operations to support such emulated functionality.

In particular, in at least some embodiments in which a network-accessible configurable network service supports virtual networking devices that are not physically provided for managed computer networks, the configurable network service may perform various actions to enable the virtual networking devices to participate in routing protocols in the same manner or a similar manner as would an actual physically provided networking device of the managed computer network. Such routing protocols generally enable network routers and other networking devices of a computer network, as well as other computing nodes that provide functionality to facilitate handling communications for the computer network, to communicate with each other and exchange various types of routing information, so that network topology and optionally network operation characteristics may be shared and used throughout the computer network. For example, some routing protocols determine best paths to destinations based on the minimum number of hops or on some other minimum distance measure, and exchange routing information that may include routing tables indicating a total distance "cost" and next best hop for each known destination—thus, a network router that receives such routing table information may update its own routing table if the received routing information includes any "better" (i.e., lower cost) routes to known destinations, as well as to add information for any previously unknown destinations. Other routing protocols determine best paths to destinations based on various cost measures that are not limited to minimum distance, such as to instead or also consider information such as actual network bandwidth, latency, reliability, load, etc.)—such other routing protocols may exchange routing information that includes connectivity-related information (e.g., who are a sending router's nearest neighbors) and optionally network operation characteristics information. A network router that receives such connectivity-related information may use it to optionally update its map of the connectivity of the various routers in the network, which it may then use to calculate the current best paths from itself to the various destinations. The types of destinations that a routing protocol may represent when using such cost information or other information may include, for example, a range of IP addresses (e.g., IPv4 addresses, IPv6 addresses, etc.) that are represented by an IP address prefix, or instead one or more network addresses that are represented in another form (e.g., using MPLS labels). Typically, each router will generate a subset of the set of total routing information (also referred to as a "routing table" and/or "Routing Information Base," or "RIB") that it has obtained, with the generated subset (referred to as a "forwarding table" and/or "Forwarding Information Base," or "FIB") including only the preferred routes (e.g., one route for each IP address prefix), as determined based on the routing protocol in use and available information. Each router's generated FIB is used to rapidly make forwarding decisions for network communication packets that are received. In addition, in some situations, a router may generate and store multiple alternative routes for a destination as part of its FIB information, such as to represent ECMP ("Equal Cost Multi-Path") routing information that is received—if so, the router may use various techniques to select a particular one of the routes when forwarding a network packet to that destination. Thus, each router will typically make its own decisions regarding how to route network communication packets in an attempt to maximize the local operation of the network near the router, using whatever information is locally available to the router.

In at least some situations in which an embodiment of a configurable network service provides a managed computer network as a virtual computer network overlaid on a substrate network, such routing information for the virtual computer network is not needed by the configurable network service to determine how to send network communications to their final destinations. For example, if the configurable network service tracks the location in the substrate network of each computing node that is part of the virtual computer network, then network communications may in some situations be forwarded to a destination computing node over the substrate network without using routing information for the virtual computer network (although optionally modifying the network communications to make changes that would have been made by appropriate virtual networking devices of the virtual computer network if they were physically provided and used to forward the network communications, as discussed in greater detail elsewhere). However, the network topology and other configuration for the virtual computer network may influence how network communications are forwarded between computing nodes in at least some other situations. As a simple illustrative example, consider a virtual computer network that is configured into two logical subnets, with one of the virtual network computing nodes acting as a firewall that has distinct network interfaces in each of the two logical subnets to facilitate handling inter-subnet network communications by performing analysis of and possibly interdiction of such network communications that pass through it. In such a situation, if the sending and destination computing nodes for a network communication are in separate logical subnets, the configurable network service does not merely forward the communication over the substrate network directly to the destination computing node—instead, the logical network topology for the virtual computer network dictates that the configurable network service forward the communication from the sending computing node over the substrate network to the intermediate firewall device computing node for handling, with the communication sent to the network interface of the firewall device computing node that is connected to the sending computing node's logical subnet. If the firewall device computing node passes the communication on (optionally with modifications), the configurable network service then further forwards the communication over the substrate network from the other network interface of the firewall device computing node in the other logical subnet to the ultimate destination computing node.

In at least some embodiments and situations, the routing information that is forwarded over a managed virtual computer network by computing nodes of the virtual computer network may be of use to the configurable network service in various manners, including to update network topology information for the virtual computer network. For example, as a continuation of the prior example having a virtual computer network with two logical subnets, the client associated with the virtual computer network may have initially configured the network topology of the virtual computer network to have the two logical subnets and to have them separated by at least one specified virtual network router or other virtual networking device, but not have initially configured any intermediate firewall device between the logical subnets. As discussed in greater detail elsewhere, such initial configuration information may be supplied by the client using an API of the configurable network service, or instead in other manners. In addition, as noted above, in such a situation, communications that are initially forwarded between computing nodes in separate logical subnets may be directly sent to the destination computing node over the substrate network, without having the communications pass through any intermediate computing nodes of the virtual computer network. However, after the virtual computer network is in use and one or more such network communications have been forwarded between computing nodes, the client may dynamically make changes to the virtual computer network that affect the network topology of the virtual computer network. As one example, the client may execute firewall-related software on one of the computing nodes of the virtual computer network, and that new firewall computing node may begin to act as the firewall device in the prior example, so as to analyze communications that pass between computing nodes of the two logical subnets. In order to detect this network topology change and take appropriate actions, the configurable network service may intercept routing-related communications that are sent by the new firewall device in accordance with whatever routing protocol is used for the virtual computer network, and use the routing information included in those routing-related communications to detect the location and operation of the new firewall device, such as based on the network interfaces of the new firewall device in the two logical subnets. In this manner, the configurable network service will determine to route subsequent network communications between the logical subnets via the firewall device, using the network interfaces of the firewall device, in the manner previously discussed.

Various routing protocols are defined and in use, and in at least some embodiments, the configurable network service may support the use of some or all of the various protocols (e.g., with a first managed virtual computer network that is provided by the configurable network service using a first routing protocol, with a distinct second managed virtual computer network that is provided by the configurable network service using one or more distinct second routing protocols, etc., and with the configurable network service extracting and using routing information sent using the various routing protocols for the various managed virtual computer networks). A non-exclusive list of predefined routing protocols that may be supported by embodiments of the configurable network service includes the following: OSPF (Open Shortest Path First); IS-IS (Intermediate System to Intermediate System); BGP (Border Gateway Protocol); RIP (Routing Information Protocol); IGRP (Interior Gateway Routing Protocol); EIGRP (Enhanced Interior Gateway Routing Protocol); RSVP (Resource ReSerVation Protocol); GARP (gratuitous address resolution protocol); etc. Moreover, by supporting multiple routing protocols that are in use by a single managed virtual computer network, the configurable network service may in some embodiments enable more consistent and/or accurate routing information to be provided to computing nodes of the managed virtual computer network that participate in one or more of those routing protocols. For example, consider a situation in which the managed virtual computer network has a first computing node that uses a first routing protocol (e.g., BGP), which is connected to a second computing node that uses a distinct second routing protocol (e.g., OSPF), and the second computing node is connected to one or more other third computing nodes that also use the first routing protocol. In this situation, routing information that the first computing node receives using the first routing protocol would typically be converted to the second routing protocol for the second computing node, and then later converted back to the first routing protocol for the third computing node(s)—however, such conversions may result in the routing information that is provided to the third computing nodes using the first routing protocol being different from the routing information that was originally provided to the first computing node using the first routing protocol (e.g., with respect to cost information for particular routing paths or other information related to connectivity). Instead, some embodiments of the configurable network service may instead manage the routing information that is provided to the third computing nodes using the first routing protocol to ensure that it is the same as or otherwise consistent with the routing information received by the first computing node. More generally, if a particular group of routing information is sent to various computing nodes of a managed virtual computer network using two or more routing protocols, some embodiments of the configurable network service may manage that routing information to assist in maintaining consistency between the various routing protocols' routing information.

In addition, various types of computing nodes may send routing information to the virtual networking devices of managed virtual computer networks in various embodiments. Such computing nodes may be provided by the configurable network service and part of the virtual computer networks for which they send routing information (e.g., under control of the client for whom the virtual computer network is being provided), or may include other types of computing nodes that are not part of the virtual computer networks. For example, if a client operates a separate computer network that interacts with a managed virtual computer network provided by an embodiment of the configurable network service (e.g., a remote computer network for which the managed virtual computer network is an extension), such as may interact via one or more VPN connections or other connections, one or more computing nodes of the other computer network may in some embodiments and situations send routing-related communications that include such routing information of potential use to the configurable network service. In addition, the types of computing nodes that send such routing-related communications may be actual network routers or other actual networking devices (e.g., provided by and under control of the configurable network service and/or provided by and under control of a client for whom a managed virtual computer network is being provided), and/or various other types of computing nodes that may be configured (e.g., via software) to provide at least some types of functionality related to handling network communications (e.g., firewalls; proxy devices; load balancers; VPN endpoints; intrusion detection and/or prevention systems; etc.), such as computing nodes of a managed virtual computer network provided for a client that are configured by the client to operate as virtual appliances for the virtual computer network.

In addition, in order to facilitate handling of routing-related communications from other computing nodes to virtual networking devices of managed virtual computer networks, embodiments of the configurable network service may further take various actions to represent the virtual networking devices to the other computing nodes. In particular, the configurable network service may in some embodiments assign at least one network address for a virtual computer network to each virtual networking device for the virtual computer network, so as to enable routing-related communications to be directed to the virtual networking devices using those assigned virtual network addresses. For example, if a client specifies configuration information that indicates multiple virtual network addresses to be used with a managed virtual computer network, each of the multiple computing nodes of the managed virtual computer network may be assigned at least one of those multiple virtual network addresses, and each of the virtual networking devices may be assigned at least one other of those virtual network addresses that is distinct from the virtual network addresses used for the multiple computing nodes (and for the other virtual networking devices). As discussed in greater detail elsewhere, when network communications are received by the configurable network service that are directed to a virtual network address assigned to a virtual networking device, the configurable network service may intercept the communications, extract the routing information from the communications, and use the extracted routing information in various manners. In addition, in at least some embodiments, the configurable network service may further take actions to send routing information to other computing nodes of a managed virtual computer network (e.g., to send routing-related communications that are spoofed to be or otherwise identified as being from virtual networking devices of the managed virtual computer network), such as in accordance with the routing protocol(s) used for that managed virtual computer network. Such routing information may be sent to computing nodes of the managed virtual computer network, for example, for one or more of the following reasons: to forward routing information directed to the virtual networking devices from other computing nodes; to provide updates about routing-related changes that a client has made to the managed virtual computer network by modifying configuration information for the virtual computer network, such as modifying network topology information via an API of the configurable network service; etc. Thus, in at least some embodiments and situations, clients to whom managed virtual computer networks are provided may be unaware that the virtual networking devices of their managed virtual computer networks are not physically provided devices with which the other computing nodes are actually interacting, based on the actions of the configurable network service to emulate various functionality of those virtual networking devices, including corresponding to routing-related communications.

As previously noted, routing-related communications that are directed to virtual networking devices of managed virtual computer networks may be intercepted and used by the configurable network service in various situations. For example, in at least some embodiments, each computing node of a managed virtual computer network has an associated communication manager module of the configurable network service that manages communications for the computing node. In such embodiments, those communication manager modules may perform at least some of the described techniques. For example, when such a communication manager module receives a routing-related communication from one of the computing nodes that it manages that is directed to a virtual networking device, the communication manager module may identify that intended destination as being a virtual networking device (e.g., based on the destination virtual network address used, based on a particular routing protocol used for the communication, etc.), and instead process the routing-related communication so as to enable the routing information in the communication to be used by the configurable network service. In some embodiments, the communication manager module may extract the routing information from the routing-related communication, and forward the extracted routing information to another module of the configurable network service for further processing (e.g., to a Network Routing Manager, or NRM, module). Furthermore, if a response message would typically be provided by the intended destination virtual networking device based on the routing protocol in use, the local communication manager module may generate and provide a spoofed response to the sender as appropriate that is indicated to be from the virtual networking device. In other embodiments, the various communication manager modules may instead forward the routing-related communications to the NRM module (or other module) for similar processing by the NRM module, such as to enable the NRM module to extract the routing information. As previously noted, in at least some embodiments, the communication manager modules and/or the NRM module may support multiple distinct routing protocols.

When the NRM module receives routing information from a routing-related communication directed to a virtual networking device of a managed virtual computer network (whether directly from a communication manager module, or after extracting the routing information from a routing-related communication received from the communication manager module), the NRM module analyzes the routing information to determine if it indicates any changes with respect to the previously known network topology and connectivity information for the managed virtual computer network, such as that would affect how network communications are routed for the managed virtual computer network (e.g., whether there are intermediate computing nodes of the managed virtual computer network through which particular network communications are to be routed). If network topology changes are identified for the managed virtual computer network, the NRM module takes actions to correspondingly update the routing information that is used for the managed virtual computer network. In particular, in at least some embodiments, the communication manager modules associated with computing nodes of managed virtual computer networks perform various actions to manage outgoing network communications from their associated computing nodes, such as by forwarding those outgoing network communications to appropriate destinations—in such embodiments, the communication manager module(s) that are associated with computing nodes of the managed virtual computer network that are affected by the identified network topology change may be updated to handle network communications for those associated computing nodes in a manner consistent with the identified network topology change. For example, in the previously discussed situation in which a firewall device computing node of a managed virtual computer network is dynamically added between two logical subnets of that managed virtual computer network, the communication manager module(s) associated with the computing nodes of those two logical subnets are updated to handle new network communications between the two logical subnets in a corresponding manner. Thus, for a particular computing node in a first of the two logical subnets, the associated communication manager module is updated so that destination virtual network addresses for other computing nodes of the first logical subnet will continue to be mapped to the substrate network locations of those other computing nodes (so that communications directed to those computing nodes will be forwarded directly to those computing nodes over the substrate network), while destination virtual network addresses for computing nodes of the other second logical subnet will newly be mapped to the substrate network location of the firewall device computing node for further handling (so that communications directed to those computing nodes will be forwarded over the substrate network to the firewall device for intermediate handling).

Thus, the NRM module may obtain routing information from routing-related communications directed to virtual networking devices of a managed virtual computer network, and use the routing information to update a configured network topology of the managed virtual computer network. In addition, in at least some embodiments, the NRM module may take further actions to facilitate the routing of network communications for such a managed virtual computer network over an underlying substrate network in an appropriate manner. For example, when the managed virtual computer network is first created, the NRM module may use any configured network topology information for the managed virtual computer network (e.g., as specified via an API of the configurable network service) in a similar manner to determine whether and when any network communications between computing nodes of the managed virtual computer network are to be directed through one or more intermediate computing nodes of the managed virtual computer network based on the configured network topology information, and configure the communication manager modules for the computing nodes of the managed virtual computer network in a corresponding manner. Similarly, if configured network topology information for the managed virtual computer network is updated after the managed virtual computer network is in use, such as via configuration information explicitly supplied by the associated client to the system manager module of the configurable network service (e.g., via an API and/or GUI provided by the configurable network service), the NRM module may similarly identify any network topology changes that affect the routing of network communications, and update the appropriate communication manager modules to handle those network topology changes in an appropriate manner.

Furthermore, in addition to managing the routing of network communications via the substrate network, the NRM module may use the obtained routing information for a managed virtual computer network in other manners in at least some embodiments. For example, when the NRM module identifies a change in network topology for the managed virtual computer network (whether from obtained routing information or from new network topology configuration information received from the client), the NRM module may in some embodiments generate routing-related communications that include corresponding routing information in order to update other computing nodes of the managed virtual computer network. Thus, for each of one or more of the computing nodes of the managed virtual computer network that participate in the defined routing protocol for the managed virtual computer network and that perform functionality that involves handling network communications, the NRM module may instruct a communication manager module that manages that computing node to supply that computing node with the routing information corresponding to the network topology change, such as by sending a routing-related communication to that communication manager module that is destined for that computing node. Such a communication supplied to such a computing node of the managed virtual computer network may, for example, have spoofed sender information so that the communication appears to come from a virtual networking device of the managed virtual computer network, or may instead be sent in other manners in other embodiments.

When providing routing information for a managed virtual computer network to computing nodes of the managed virtual computer network, as well as when providing substrate network routing information to particular communication manager modules that manage communications for computing nodes of the managed virtual computer network, the NRM module may determine the routing information in a manner that is contextualized to the recipient, as different computing nodes and/or communication manager modules typically route network communications differently depending on their network location (e.g., their relative location in the configured network topology of the managed virtual computer network). Nonetheless, by having a centralized location for the various information about the network topology of a managed virtual computer network, including in some embodiments to have a combination of client-supplied configuration information and dynamically supplied routing information from the actual managed virtual computer network, the NRM module may in some embodiments use the aggregate information to determine consistent routing information to be used by the various computing nodes of the managed virtual computer network (e.g., to determine network paths for particular computing nodes to use that are globally optimized for the managed virtual computer network, including in light of network traffic from paths used by other computing nodes of the managed virtual computer network that facilitate handling communications for the managed virtual computer network). Thus, rather than having each such network router and other computing node of the managed virtual computer network independently attempt to determine best paths in a localized manner, the NRM module in such embodiments may coordinate the routing information used across the managed virtual computer network, such as to maximize or otherwise enhance any desired criteria regarding characteristics of the operation of the managed virtual computer network (e.g., to balance network traffic passing between multiple particular computing nodes, to minimize or maximize network traffic passing through a particular computing node relative to one or more other computing nodes, etc.).

Furthermore, in at least some embodiments, the configurable network service may perform various actions to accomplish other goals. For example, in order to limit undesirable behavior, the configurable network service may in some embodiments limit the types of changes to network topology information that some or all computing nodes of a managed virtual computer network are allowed to make. As one example, in some embodiments, some types of network topology changes may be limited to being made via configuration information supplied to the system manager module of the configurable network service by the client, rather than via routing information from computing nodes of the managed virtual computer network, or vice versa. Furthermore, the configurable network service may limit the rate and/or total quantity of routing-related communications that some or all computing nodes of a managed virtual computer network are allowed to make. Such limiting of routing-related communications and/or other filtering of network topology changes may be performed in various manners, including by the communication manager modules associated with the computing nodes that attempt to send such routing-related communications or otherwise make such network topology changes (e.g., by discarding routing-related communications if appropriate), and/or by the NRM module (e.g., by not updating the configured network topology for a managed virtual computer network in accordance with disallowed network topology changes and/or routing-related communications, such as by not updating communication manager modules for the computing nodes of the managed virtual computer network to support such changes).

Thus, a configurable network service may take various actions to support a configured logical network topology for a managed computer network, such as to include one or more virtual networking devices as part of a managed virtual computer network. As one example, the CNS system may use multiple communication manager modules to transparently manage communications sent by and to the computing nodes of the virtual computer network in a manner that emulates functionality that would be provided by one or more virtual networking devices if they were physically implemented for the virtual computer network and were configured to route or otherwise forward the communications in accordance with the specified network topology. Furthermore, the configurable network service may use multiple communication manager modules to emulate responses to networking requests made by computing nodes in the manner of a local physical networking device, such as to respond to ping requests, SNMP ("Simple Network Management Protocol") queries, etc. In this manner, the configurable network service may provide virtual networking functionality that corresponds to a specified network topology for a managed virtual computer network that is provided by the configurable network service, but without the computing nodes of the virtual computer network (or the associated client user or other entity) being aware that the actual computer network is not configured in the normal manner to support the network topology and to physically include the virtual networking devices. Furthermore, as described in greater detail below, in at least some embodiments, multiple modules of the configurable network service may operate together in a distributed manner to provide functionality corresponding to a particular, virtual networking device, such that no single module or physical device is singly responsible for emulating a particular virtual networking device.

Figure 1C:
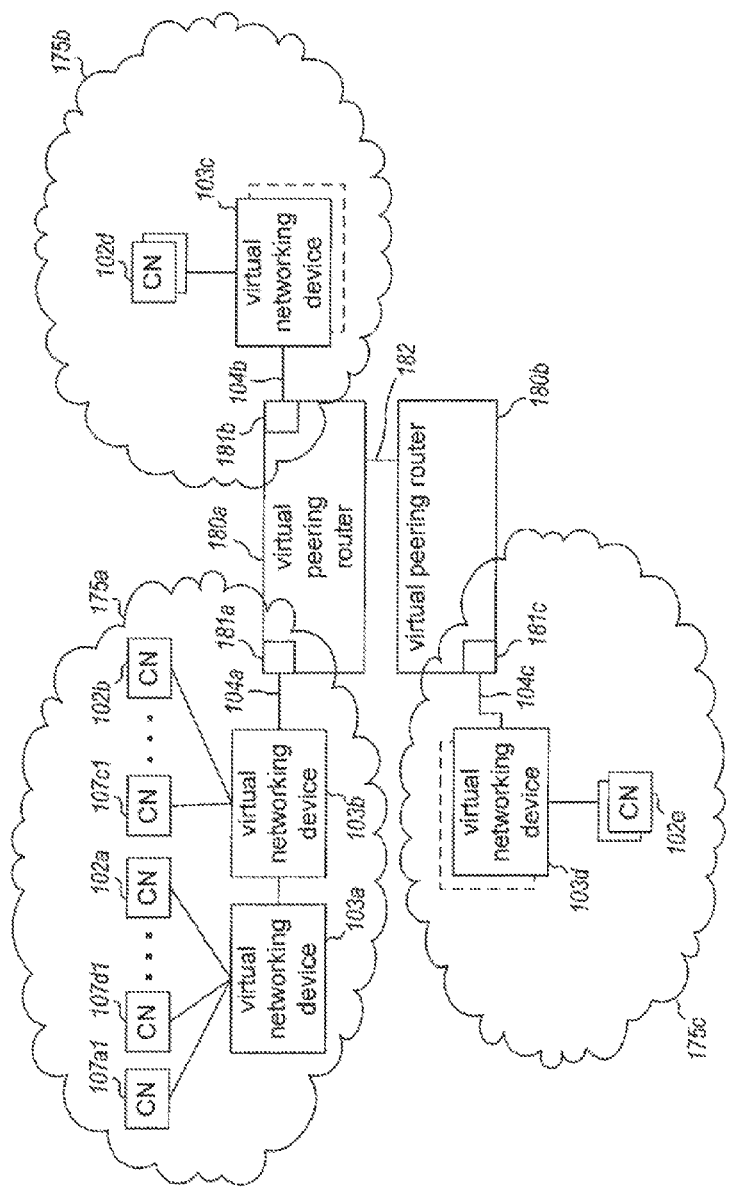

In addition, as previously noted, the providing of networking functionality for a managed virtual computer network may include supporting connections between multiple managed virtual computer networks. FIG. 1C illustrates an abstracted logical view of virtual computer networks that may be provided by an embodiment of the configurable network service, such as at the data center 190 of FIG. 1B, although the particular hardware computing systems and devices of FIG. 1B are not illustrated. Instead, the logical view of FIG. 1C illustrates that various computing nodes may be used to provide at least three managed computer networks 175, such as for one or more clients (not shown), such as by implementing the three managed computer networks 175 as virtual networks that are overlaid on the various hardware computing systems and devices. For example, the illustrated managed computer network 175a in this example corresponds to the previously described virtual computer network that includes virtual machine computing nodes 107a1, 107c1 and 107d1, as well as other computing nodes 102a and 102b in this example, with the managed computer network 175a being provided for a first client (not shown) in this example. The example managed computer network 175a is also configured in this example to include multiple specified networking devices, which are implemented as virtual networking devices 103a and 103b (e.g., virtual router devices) in this example. Managed computer networks 175b and 175c also each include various computing nodes and specified networking devices, and are each provided for a client (e.g., for second and third clients that are distinct from the first client; for the first client as well, such as if the first client is an organization and the different virtual computer networks are provided to different departments or other groups within the organization; etc.).

In the example of FIG. 1C, the configurable network service has provided two virtual peering routers 180a and 180b that enable interconnections between the managed computer networks 175a, 175b and 175c, and which are connected to each other via one or more logical connections 182 in this example, although in other embodiments the interconnections between the various managed computer networks may instead be provided by a single peering router or by a peering fabric that includes more than two interconnected peering routers. In this example, the illustrated virtual peering routers include a first virtual peering router 180a that includes virtual interfaces 181a and 181b corresponding to the managed computer networks 175a and 175b, respectively, and a second virtual peering router 180b that includes virtual interface 181c corresponding to the managed computer network 175c. Thus, in this example, the first client for whom managed computer network 175a is provided configures the managed computer network 175a to include a logical connection 104a to the virtual interface 181a of the virtual peering router 180a. The connection 104a enables the managed computer network 175a to logically interact with the virtual peering router 180a to provide routing information for managed computer network 175a and/or to receive routing information for one or both of managed computer networks 175b and 175c, such as based on logical communications passed between the virtual peering router 180a and the virtual networking device 103b, and based on peering configuration information specified by the first client for the connection 104a. Such specified peering configuration information may be used, for example, to control whether other managed computer networks are allowed to send routing information to and/or receive routing information from the managed computer network 175a, and to control whether other managed computer networks are allowed to send communications to and/or receive communications from computing nodes of the managed computer network 175a, such as by defining one or more policies related to such communications. In some situations, at least some routing information may be initiated by one or more of the computing nodes of the managed computer network 175a that participate in the routing protocol in use for managed computer network 175a, such as a computing node that is configured to operate for the managed computer network 175a in a manner that facilitates communications between other computing nodes (e.g., to provide firewall capabilities, VPN endpoint capabilities, etc.). As discussed in greater detail elsewhere, in at least some embodiments, the virtual peering routers 180a and/or 180b are not physically implemented using any actual router devices, and the configurable network service instead provides the functionality of the virtual peering routers 180a and/or 180b using one or more modules of the configurable network service (e.g., in a distributed manner), such as the NRM module 170 of FIG. 1B, the System Manager module 110 of FIG. 1B, and/or one or more of the Communication Manager modules 109 and 150 of FIG. 1B.

In a manner similar to that of managed computer network 175a, the clients for whom the managed computer networks 175b and 175c are provided also configure those managed computer networks to connect with the virtual peering routers 180a and 180b via logical connections 104b and 104c to interfaces 181b and 181c, respectively. In particular, the example managed computer network 175*b* includes multiple computing nodes 102*d* and one or more specified virtual networking devices 103*c*, and the connection 104*b* is established between at least one of the virtual networking devices 103*c* and the virtual interface 180*b* of the virtual peering router 180*a*. Similarly, the example managed computer network 175*c* includes multiple computing nodes 102*e* and one or more specified virtual networking devices 103*d*, and the connection 104*c* is established between at least one of the virtual networking devices 103*d* and the virtual interface 180*c* of the virtual peering router 180*b*. Routing information may also be passed between the virtual peering routers 180 and the managed computer networks 175*b* and 175*c* in a manner similar to that previously described for managed computer network 175*a*. In addition, in at least some embodiments, one or both the managed computer networks 175*b* and 175*c* may have specified peering configuration information for the connections 104*b* and 104*c*, respectively, in order to control how routing communications and/or computing node communications to and/or for the managed computer networks 175*b* and 175*c* are handled, such as in accordance with policies specified for those managed computer networks by the client(s) for whom those managed computer networks are provided.

Thus, the virtual peering routers 180*a* and 180*b* may be configured in various manners to support various types of functionality, whether by one or more of the clients that supplies peering configuration information in order to manage the connections 104 to their managed computer network, and/or by the configurable network service. For example, in some embodiments, one of the clients may request the creation of one or both of the virtual peering routers 180*a* and 180*b*, and provide peering configuration information for those virtual peering routers, such as to indicate which clients or managed computer networks are allowed to connect to the virtual peering router, the types of connections and/or communications that are allowed for some or all connected managed computer networks, etc. As one illustrative example, the managed computer network 175*a* may initiate the creation of the virtual peering router 180*a*, and configure the virtual peering router 18*a*0 in such a manner that the managed computer network 175*a* is enabled to send communications to other managed computer networks that subsequently logically connect to the virtual peering router 180*a* (such as managed computer network 175*b* directly, and managed computer network 175*c* via virtual peering router 180*b*), but such that those other managed computer networks are not enabled to send communications to the computing nodes of the managed computer network 175*a* (or are enabled to send only a specified type of communication, such as HTTP requests to a particular network address of the managed computer network 175*a*, response communications to communications initiated by the managed computer network 175*a*, etc.). In such a situation, the other managed computer networks may or may not be enabled to communicate with each other. In order to inhibit the ability of the managed computer networks 175*b* and 175*c* to send communications to the computing nodes of the managed computer network 175*a*, the peering configuration information for virtual peering router 180*a* may block some or all routing communications from the managed computer network 175*a* from being passed to the managed computer networks 175*b* and 175*c*, such as to prevent the specified networking devices of the managed computer networks 175*b* and 175*c* from having routing information corresponding to the managed computer network 175*a* (and/or to other external computer systems, not shown, that are accessible from the managed computer network 175*a*). However, while the virtual peering router 180*a* may further be configured by the specified peering configuration information to block some or all communications from the managed computer networks 175*b* and 175*c* that are directed to the computing nodes of the managed computer network 175*a*, the specified peering configuration information may allow routing communications from the managed computer networks 175*b* and 175*c* to be forwarded to the managed computer network 175*a*, such as to facilitate the sending of communications from the managed computer network 175*a* to the computing nodes of the managed computer networks 175*b* and 175*c*. As a further example, the client for managed computer network 175*b* may specify peering configuration information for virtual peering router 180*a* that authorizes communications to computing nodes of managed computer network 175*b* from managed computer network 175*a* (e.g., based on managed computer network having created virtual peering router 180*a*), but not from any other connected managed computer networks (e.g., from managed computer network 175*c*). However, the client for managed computer network 175*c* may specify peering configuration information for virtual peering router 180*b* that authorizes communications to computing nodes of managed computer network 175*c* for any other managed computer network (or may not specify any peering configuration information, and the default peering configuration information for virtual peering router 180*b* may enable such communications from other managed computer networks), thus enabling both managed computer networks 175*a* and 175*b* to send communications to computing nodes of managed computer network 175*c*, but only managed computer network 175*a* to send communications to computing nodes of managed computer network 175*b*. As an alternative example to that discussed above, the virtual peering routers 180*a* and 180*b* may instead be configured to enable all connected managed computer networks to send one or more types of communications to any other connected managed computer network. It will be appreciated that various other, more specific configurations of the virtual peering routers 180*a* and 180*b* are possible.

As noted above, the virtual peering routers 180*a* and 180*b* may be configured to enable various types of communications to be exchanged between connected managed computer networks. In some embodiments, each managed computer network that connects to the virtual peering routers 180*a* and 180*b* may be allowed to specify peering configuration information that includes restrictions on the types of communications that the managed computer network is willing to accept, such as to include one or more of the following: to specify a routing filter, such as based on network address prefixes; to specify filters for or other indications of types of allowed or disallowed communications, such as based on communication protocol, port, etc.; to specify filters for or other indications of other clients or managed computer networks from which communications are allowed or disallowed, such as based on particular clients and/or computer networks that are indicated, or based on characteristics or other properties of such clients and/or computer networks; etc.). In some embodiments, such a managed computer network may similarly be able to specify restrictions on the types of communications that are allowed to be sent out from the managed computer network via the virtual peering router, whether in addition to or instead of restrictions on incoming communications to the connected managed computer network from other connected managed computer networks. When such filters are specified for a virtual peering router, information about the specified filters may be retrieved and used when determining whether to automatically forward a particular received routing communication from a first computer network to one or more other computer networks. In addition, when a specified filter or other configuration information is based at least in part on information external to a received routing communication and the routing protocol with which the routing communication is specified (e.g., external information related to other clients and/or managed computer networks from and/or to which communications are allowed or disallowed), information about such other clients and/or other managed computer networks may similarly be retrieved and used when determining whether to automatically forward a particular received routing communication from a first computer network to one or more other computer networks (e.g., to retrieve and use information about one or more of the first computer network, a first client for whom the first computer network is provided, the one or more other computer networks, and one or more clients for whom the one or more other computer networks are provided). Furthermore, while not illustrated here, particular connected managed computer networks may further have configurations internal to those managed computer networks to assist in managing incoming and/or outgoing communications, such as one or more firewall devices, intrusion detection systems, etc. Additional details related to configuration of virtual peering routers are included below.

Thus, as discussed with respect to FIG. 1C and elsewhere, the providing of networking functionality by a configurable network service may include supporting connections between multiple managed virtual computer networks, such as by providing one or more virtual peering routers to which the managed virtual computer networks connect. Various other aspects of providing managed computer networks are also described above, as well as elsewhere in this document, including to support virtual computer networks that are overlaid on an underlying substrate network.

Additional details are included below with respect to actions of configurable network service embodiments to support networking devices specified for managed computer networks, such as for virtual networking devices that are not physically provided and whose functionality is emulated, as well as for obtaining and using routing information for a managed computer network in various manners.

Figure 2A:
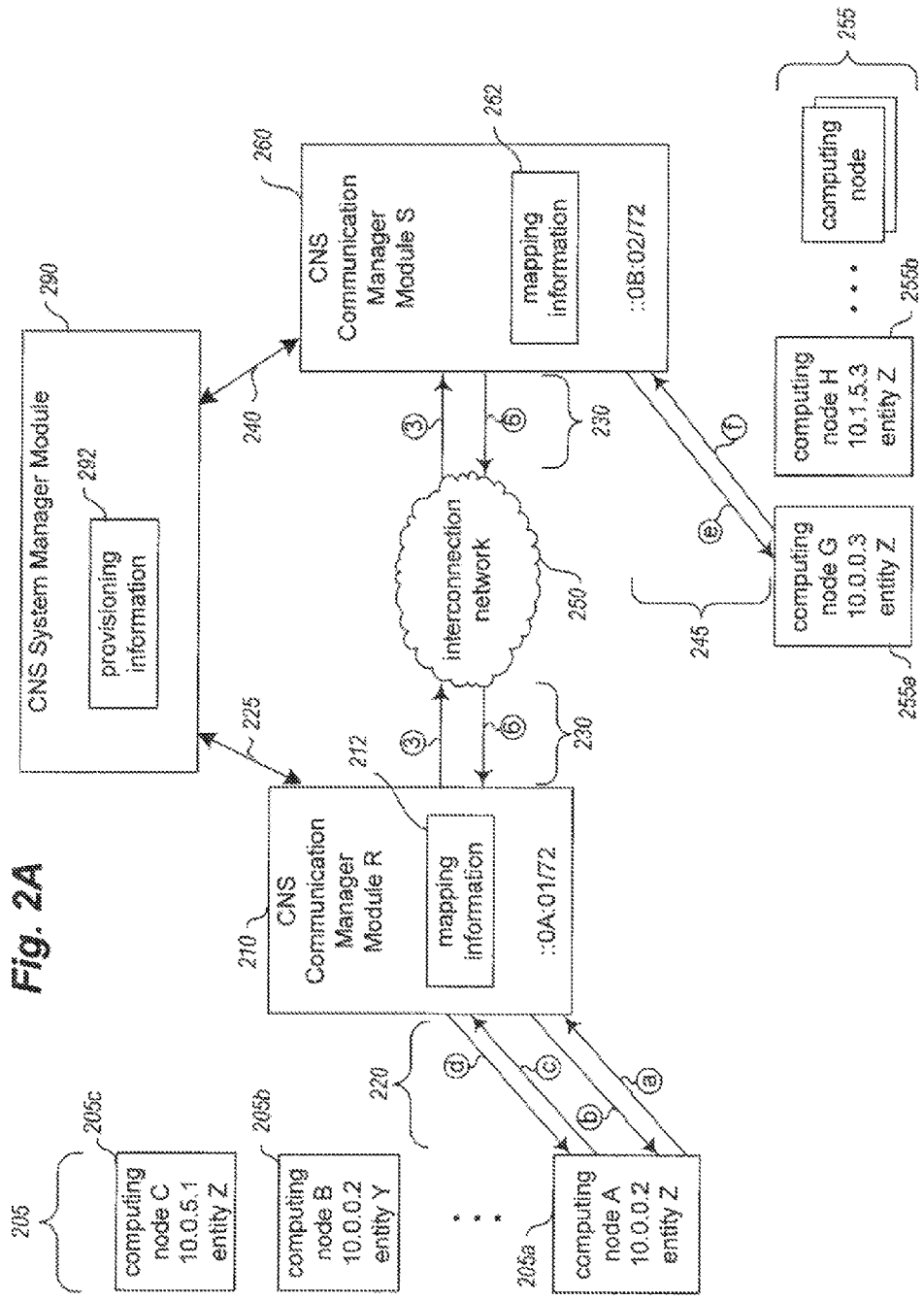
Figure 2C:
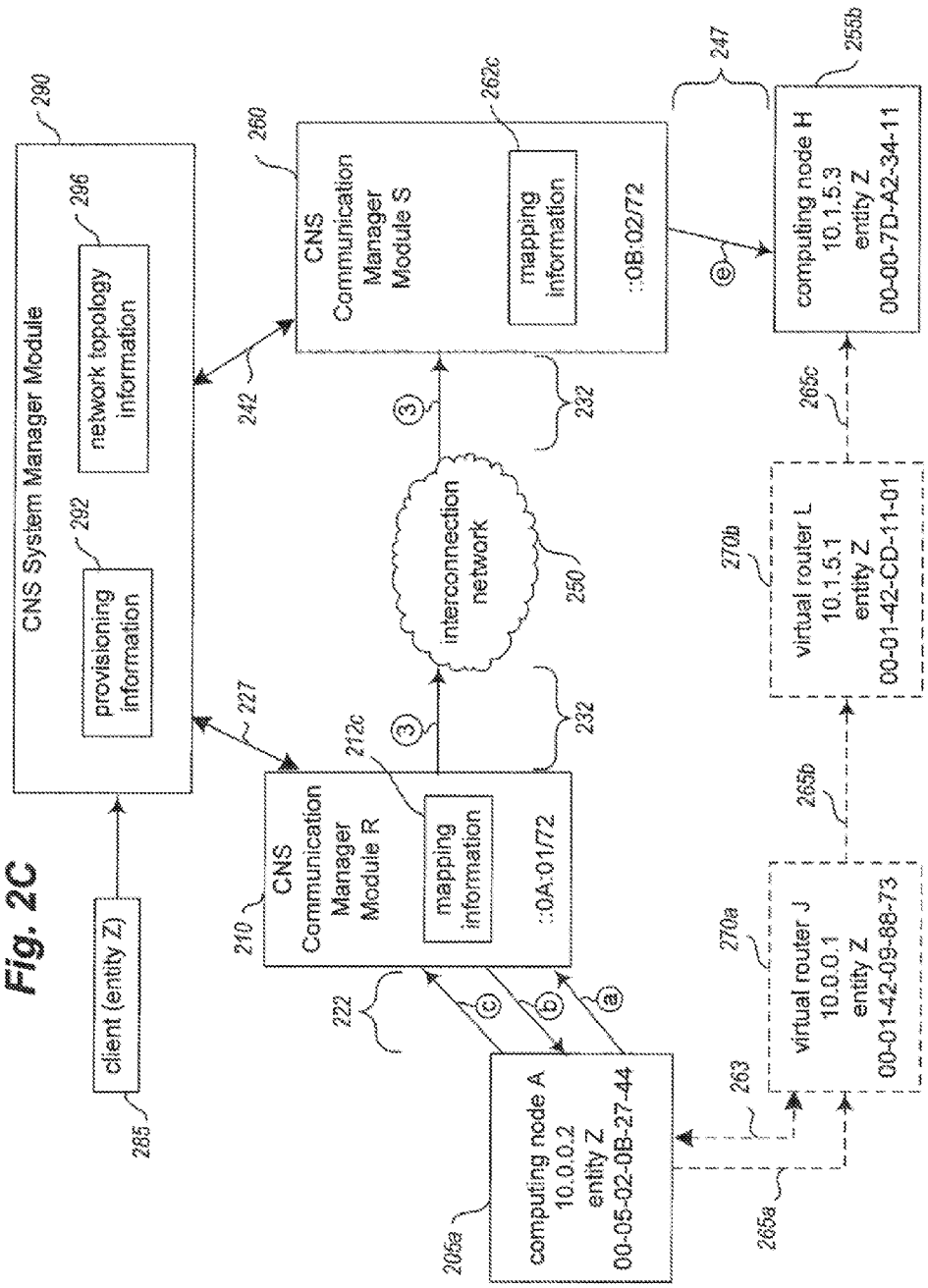
Figure 2D:
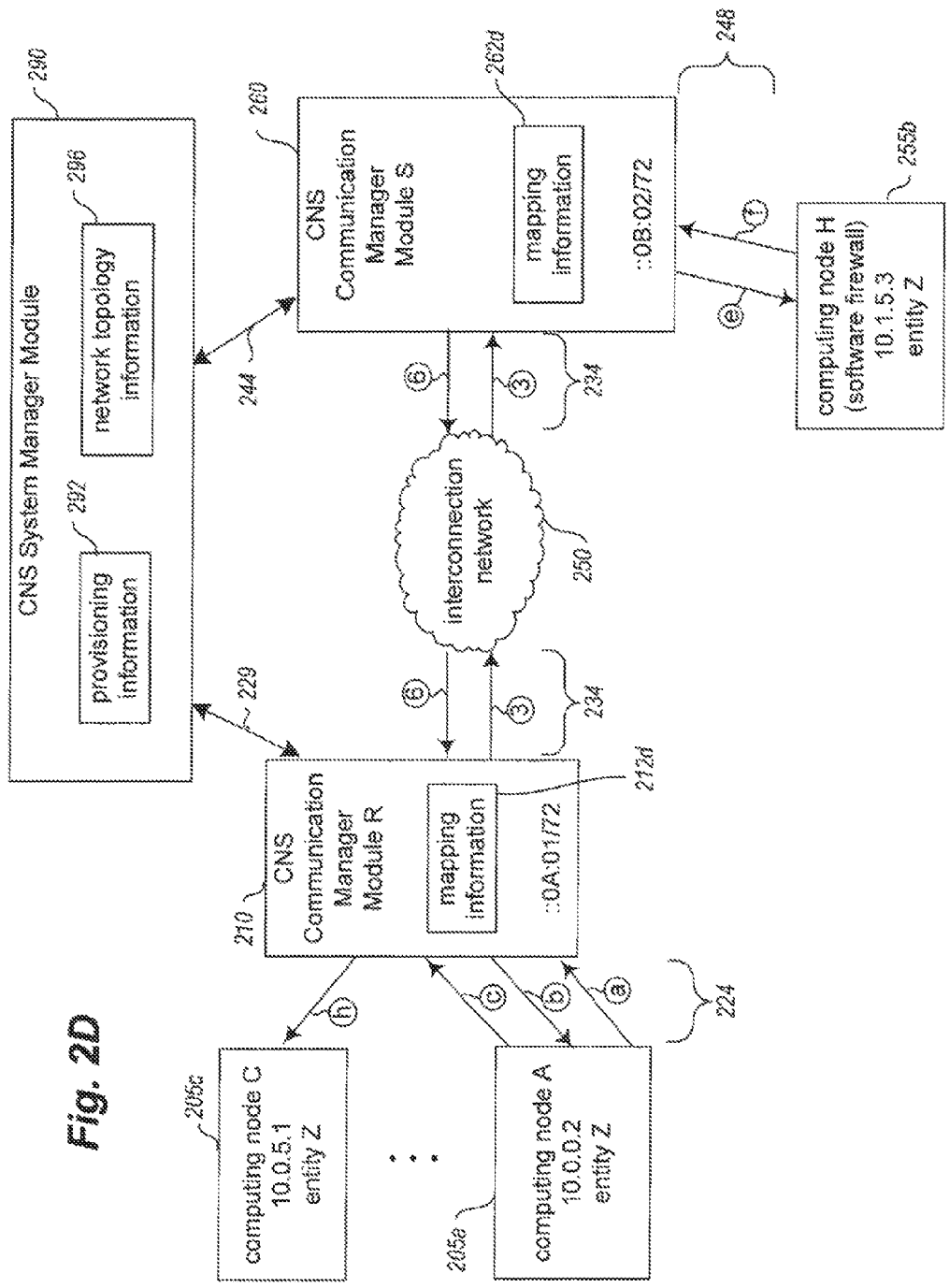
Figure 2E:
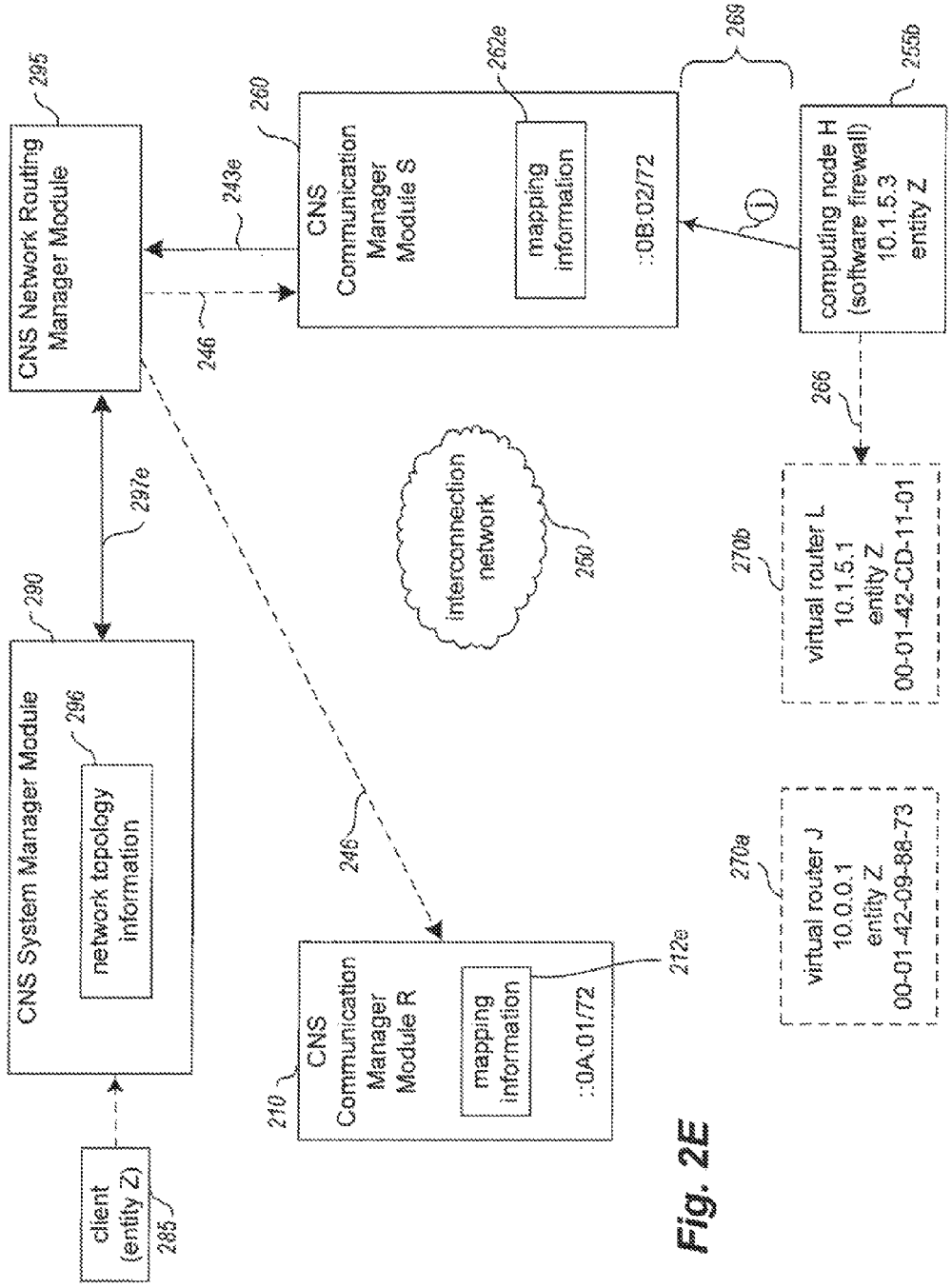
Figure 2F:
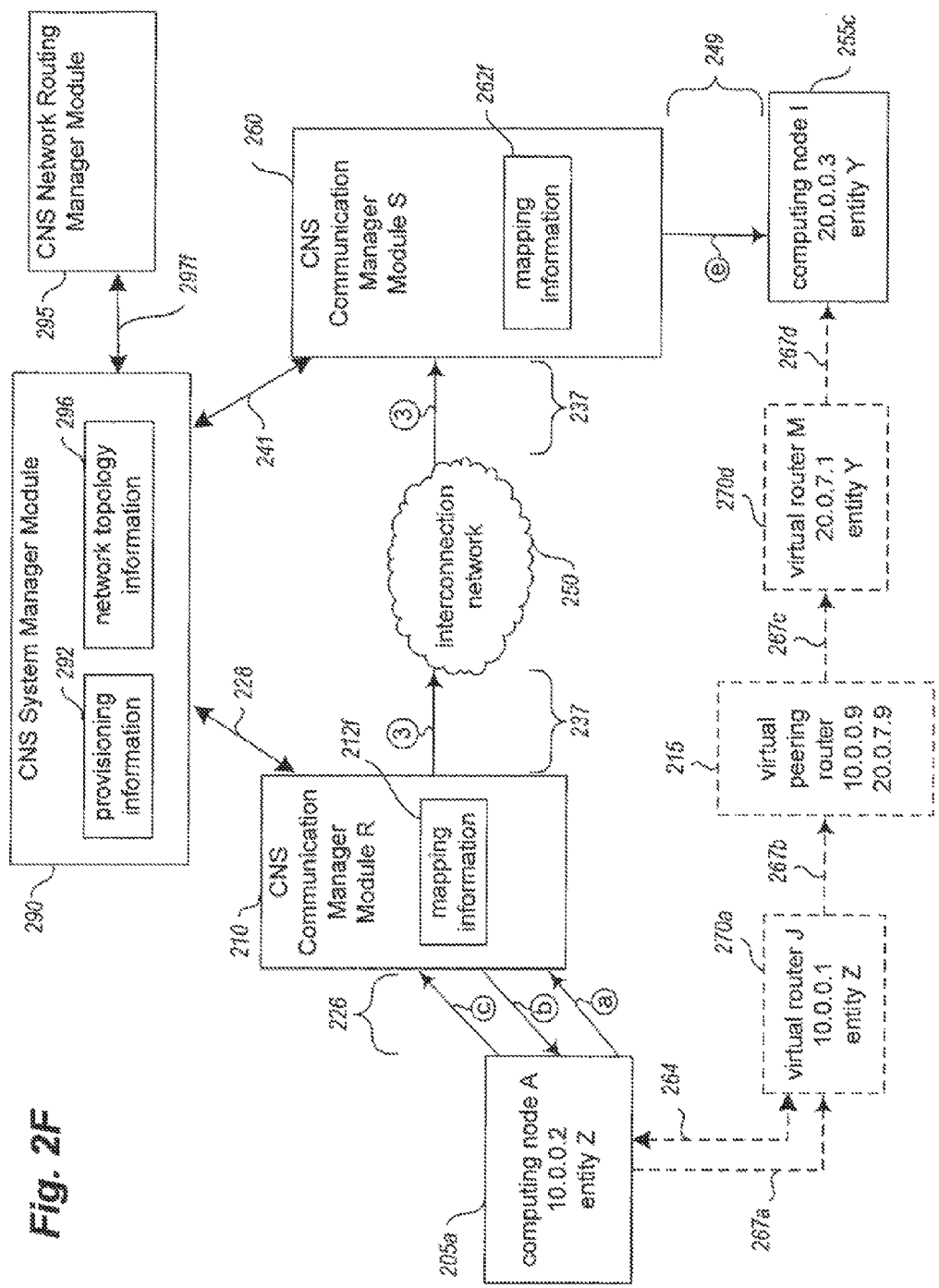

FIGS. 2A-2F illustrate further examples with additional illustrative details related to managing communications between computing nodes that occur via a virtual computer network overlaid over one or more physical substrate networks, such as may be used by the computing nodes and networks of FIGS. 1A-1C, or in other situations. In these examples, FIGS. 2A and 2B illustrate details regarding actions of various modules of an example CNS system in managing communications between computing nodes of a managed computer network, while FIGS. 2C and 2D illustrate additional details regarding similar actions in managing communications in a manner specific to a particular specified network topology, such as that includes virtual networking devices and/or intermediate computing nodes of the virtual computer network through which at least some inter-node communications pass. FIG. 2E illustrates additional details regarding obtaining and using routing information for a managed virtual computer network from routing-related communications directed to a virtual networking device of the managed virtual computer network, and FIG. 2F illustrates additional details regarding supporting inter-connections between multiple managed virtual computer networks.

In particular, FIG. 2A illustrates various example computing nodes 205 and 255 that may communicate with each other by using one or more intermediate inter-connection networks 250 as a substrate network. In this example, the inter-connection network 250 is an IPv6 substrate network on which IPv4 virtual computer networks are overlaid, although in other embodiments the inter-connection network 250 and overlay virtual computer networks may use the same networking protocol (e.g., IPv4). In addition, in this example embodiment, the computing nodes are operated on behalf of multiple distinct entities to whom managed virtual computer networks are provided, and a System Manager module 290 manages the association of particular computing nodes with particular entities and managed virtual computer networks, and tracks various configuration information specified for the managed virtual computer networks. The example computing nodes of FIG. 2A include four computing nodes executed on behalf of an example entity Z and part of a corresponding managed virtual computer network provided for entity Z, those being computing nodes 205a, 205c, 255a and 255b. In addition, other computing nodes are operated on behalf of other entities and belong to other provided virtual computer networks, such as computing node 205b and other computing nodes 255.

In this example, the computing nodes 205 are managed by and physically connected to an associated Communication Manager module R 210, and the computing nodes 255 are managed by and physically connected to an associated Communication Manager module S 260. The CNS Communication Manager modules 210 and 260 are physically connected to an inter-connection network 250, as is the System Manager module 290, although the physical inter-connections between computing nodes, modules and the inter-connection network are not illustrated in this example. As one example, computing nodes 205 may each be one of multiple virtual machines hosted by a single physical computing system, and Communication Manager module R may be part of a hypervisor virtual machine monitor for that physical computing system. For example, with reference to FIG. 1B, computing nodes 205 may represent the virtual machines 107a, and computing nodes 255 may represent the virtual machines 107d. If so, Communication Manager module R would correspond to Communication Manager module 109a of FIG. 1B, Communication Manager module S would correspond to Communication Manager module 109d of FIG. 1B, the inter-connection network 250 would correspond to inter-connection network 122 of FIG. 1B, and the System Manager module 290 would correspond to System Manager module 110 of FIG. 1B. Alternatively, computing nodes 205 or 255 may instead each be a distinct physical computing system, such as to correspond to computing systems 155a-155n of FIG. 1, or to computing nodes at other data centers or geographical locations (e.g., computing systems at another data center 160, computing systems 145a, etc.).

Each of the Communication Manager modules of FIG. 2A is associated with a group of multiple physical substrate network addresses, which the Communication Manager modules manage on behalf of their associated computing nodes. For example, Communication Manager module R is shown to be associated with the IPv6 network address range of "::0A:01/72", which corresponds to the 128-bit addresses (in hexadecimal) from XXXX:XXXX:XXXX:XXXA:0100:0000:0000:0000 to XXXX:XXXX:XXXX:XXXA:01FF:FFFF:FFFF:FFFF (representing 2 to the power of 56 unique IPv6 addresses), where each "X" may represent any hexadecimal character that is appropriate for a particular situation. The inter-connection network 250 will forward any communication with a destination network address in that range to Communication Manager module R—thus, with the initial 72 bits of the range specified, the Communication Manager module R may use substrate network addresses that include the remaining available 56 bits to represent the computing nodes that it manages and to determine how to process incoming communications whose destination network addresses are in that range.

For purposes of the example shown in FIG. 2A, computing nodes 205a, 205c, 255a, and 255b are part of a single managed virtual computer network provided for entity Z, and have assigned IPv4 virtual network addresses for that virtual computer network of "10.0.0.2", "10.0.5.1", "10.0.0.3", and "10.1.5.3", respectively. Because computing node 205b is part of a distinct managed virtual computer network that is provided for entity Y, it can share the same virtual network address as computing node 205a without confusion. In this example, computing node A 205a intends to communicate with computing node G 255a, which are configured in this example to be part of a single common physical sub-network (not shown) in a configured network topology for the managed virtual computer network, and the inter-connection network 250 and Communication Manager modules are transparent to computing nodes A and G in this example. In particular, despite the physical separation of computing nodes A and G, the Communication Manager modules 210 and 260 operate so as to overlay the managed virtual computer network for entity Z over the physical inter-connection network 250 for communications between those computing nodes, including to emulate functionality corresponding to the configured sub-network of the managed virtual computer network, so that the lack of an actual corresponding network is transparent to the computing nodes A and G.

In order to send the communication to computing node G, computing node A exchanges various messages 220 with Communication Manager module R 210, despite in the illustrated embodiment being unaware of the existence of Communication Manager module R (i.e., computing node A may believe that it is transmitting a broadcast message to all other nodes on the local sub-network, such as via a specified switching device that computing node A believes connects the nodes on the local sub-network). In particular, in this example, computing node A first sends an ARP message request 220-a that includes the virtual network address for computing node G (i.e., "10.0.0.3") and that requests the corresponding hardware address for computing node G (e.g., a 48-bit MAC address). Communication Manager module R intercepts the ARP request 220-a, and responds to computing node A with a spoofed ARP response message 220-b that includes a virtual hardware address for computing node G.

To obtain the virtual hardware address for computing node G to use with the response message, the Communication Manager module R first checks a local store 212 of information that maps virtual hardware addresses to corresponding IPv6 actual physical substrate network addresses, with each of the virtual hardware addresses also corresponding to an IPv4 virtual network address for a particular entity's managed virtual computer network. If the local store 212 does not contain an entry for computing node G (e.g., if none of the computing nodes 205 have previously communicated with computing node G and the System Manager module 290 does not push mapping information to the Communication Manager Module R without request, if a prior entry in local store 212 for computing node G has expired based on an associated expiration time, etc.), the Communication Manager module R interacts 225 with System Manager module 290 to obtain the corresponding actual IPv6 physical substrate network address for computing node G on behalf of computing node A. In particular, in this example, the System Manager module 290 maintains provisioning information 292 that identifies where each computing node is actually located and to which entity and/or managed virtual computer network the computing node belongs, such as by initiating execution of programs on computing nodes for entities and virtual computer networks or by otherwise obtaining such provisioning information. As discussed in greater detail with respect to FIG. 2B, the System Manager module may determine whether the request from Communication Manager module R on behalf of computing node A for computing node G's actual IPv6 physical substrate network address is valid, including whether computing node A is authorized to communicate with computing node G (e.g., such as based on being part of the same configured local area sub-network), and if so provides that actual IPv6 physical substrate network address. While the interactions 225 with the System Manager module 290 are not illustrated in this example as explicitly traveling over the inter-connection network 250, it will be appreciated that such interactions may include one or more communications that do travel over the inter-connection network 250 in at least some embodiments.

Communication Manager module R receives the actual IPv6 physical substrate network address for computing node G from the System Manager module 290, and stores this received information as part of an entry for computing node G in mapping information 212 for later use (optionally with an expiration time and/or other information). In addition, in this example, Communication Manager module R determines a virtual hardware address to be used for computing node G (e.g., by generating a dummy identifier that is locally unique for the computing nodes managed by Communication Manager module R), stores that virtual hardware address in conjunction with the received actual IPv6 physical substrate network address as part of the mapping information entry, and provides the virtual hardware address to computing node A as part of response message 220-b. By maintaining such mapping information 212, later communications from computing node A to computing node G may be authorized by Communication Manager module R without further interactions with the System Manager module 290, based on the use of the virtual hardware address previously provided by Communication Manager module R. In some embodiments, the hardware address used by Communication Manager module R for computing node G may not be a dummy address, such as if System Manager module 290 further maintains information about hardware addresses used by the various computing nodes (e.g., virtual hardware addresses assigned to virtual machine computing nodes, actual hardware addresses assigned to physical computing systems acting as computing nodes, etc.) and provides the hardware address used by computing node G to Communication Manager module R as part of the interactions 225. In such embodiments, the Communication Manager module R may take further actions if computing nodes on different virtual networks use the same virtual hardware address, such as to map each combination of computing node hardware address and managed virtual computer network to a corresponding substrate network address.

In other embodiments, Communication Manager module R may interact with System Manager module 290 to obtain a physical substrate network address for computing node G or otherwise determine such a physical substrate network address at times other than upon receiving an ARP request, such as in response to any received communication that is directed to computing node G using the virtual network address "10.0.0.3" as part of entity Z's virtual computer network, or if the System Manager module provides that information to Communication Manager module R without request (e.g., periodically; upon changes in the information, such as changes in network topology information for the managed virtual computer network; etc.). Furthermore, in other embodiments, the virtual hardware addresses that are used may differ from this example, such as if the virtual hardware addresses are specified by the System Manager module 290, if the virtual hardware addresses are not random and instead store one or more types of information specific to the corresponding computing nodes, etc. In addition, in this example, if computing node A had not been determined to be authorized to send communications to computing node G, whether by the System Manager module 290 and/or Communication Manager module R, Communication Manager module R would not send the response message 220-b with the virtual hardware address (e.g., instead sends no response or an error message response).

In this example, the returned IPv6 actual physical substrate network address corresponding to computing node G in interactions 225 is "::0B:02:<Z-identifier>:10.0.0.3", where "10.0.0.3" is stored in the last 32 bits of the 128-bit IPv6 address, and where "<Z-identifier>" is a 24-bit entity network identifier for computing node G corresponding to the managed virtual computer network for entity Z (e.g., as previously assigned by the System Manager module to that network to reflect a random number or some other number corresponding to the entity). The initial 72 bits of the IPv6 network address store the "::0B:02" designation, corresponding to the sub-network or other portion of the physical inter-connection network with a network address range of "::0B:02/72" to which Communication Manager module S corresponds—thus, a communication sent over the inter-connection network 250 to IPv6 destination network address "::0B:02:<Z-identifier>:10.0.0.3" will be routed to Communication Manager module S. In other embodiments, the entity network identifier may be other lengths (e.g., 32 bits, if Communication Manager module S has an associated network address range of 64 bits rather than 56 bits) and/or may have other forms (e.g., may be random, may store various types of information, etc.), and the remaining 56 bits used for the network address range after the "::0B:02" designation may store other types of information (e.g., an identifier for a particular entity, a tag or label for the virtual computer network, an identifier for a particular specified VLAN to which computing node G is assigned, etc.). In other embodiments, some or all such information may instead be stored and/or transmitted with a communication to computing node G in other manners, such as by including the information in a header of the communication, including in situations in which the substrate network uses the IPv4 networking protocol.

After receiving the response message 220-b from Communication Manager module R, computing node A creates and initiates the sending of an inter-node communication to computing node G, shown in FIG. 2A as communication 220-c. In particular, the header of communication 220-c includes a destination virtual network address for destination computing node G that is "10.0.0.3", a destination hardware address for destination computing node G that is the virtual hardware address provided to computing node A in message 220-b, a source virtual network address for sending computing node A that is "10.0.0.2", and a source hardware address for sending computing node A that is an actual or dummy hardware address that was previously identified to computing node A (e.g., by Communication Manager module R, based on prior configuration of computing node A, etc.). Since computing node A believes that computing node G is part of the same local sub-network as itself, computing node A does not need to direct the communication 220-c to any intermediate virtual router devices that are configured in a network topology for the managed virtual computer network to separate the computing nodes. Furthermore, in this example, there are no other computing nodes of the managed virtual computer network through which this inter-node communication is configured to pass.

Communication Manager module R intercepts the communication 220-c, modifies the communication as appropriate, and forwards the modified communication over the inter-connection network 250 to computing node G. In particular, Communication Manager module R extracts the virtual destination network address and virtual destination hardware address for computing node G from the header, and then retrieves the IPv6 actual physical substrate network address corresponding to that virtual destination hardware address from mapping information 212. As previously noted, the IPv6 actual physical substrate network address in this example is "::06:02:<Z-identifier>:10.0.0.3", and Communication Manager module R creates a new IPv6 header that includes that actual physical substrate network address as the destination address. Similarly, the Communication Manager module R extracts the virtual source network address and virtual source hardware address for computing node A from the header of the received communication, obtains an IPv6 actual physical substrate network address corresponding to that virtual source hardware address (e.g., from a stored entry in mapping information 212, by interacting with the System Manager module 290 to obtain that information if not previously obtained, etc.), and includes that actual physical substrate network address as the source network address for the new IPv6 header. In this example, the IPv6 actual physical substrate network address for computing node A is "::0A:01:<Z-identifier>:10.0.0.2", which if used in a reply by Communication Manager module S on behalf of computing node G will be routed to Communication Manager module R for forwarding to computing node A. The Communication Manager module R then creates communication 230-3 by modifying communication 220-c so as to replace the prior IPv4 header with the new IPv6 header (e.g., in accordance with SIIT), including populating the new IPv6 header with other information as appropriate for the communication (e.g., payload length, traffic class packet priority, etc.). Thus, the communication 230-3 includes the same content or payload as communication 220-c, without encapsulating the communication 220-c within the communication 230-3 in this example. Furthermore, access to the specific information within the payload is not needed for such re-headering, such as to allow Communication Manager module R to handle communications in which the payload is encrypted without needing to decrypt that payload.

In at least some embodiments, before forwarding communication 230-3 to Communication Manager module S, Communication Manager module R may perform one or more actions to determine that communication 220-c is authorized to be forwarded to computing node G as communication 230-3, such as based on the mapping information 212 including a valid entry for the destination virtual hardware address used in communication 220-c (e.g., an entry specific to sending computing node 205a in some embodiments, or instead an entry corresponding to any of the computing nodes 205 in other embodiments). In other embodiments, such an authorization determination may not be performed by Communication Manager module R for each outgoing communication, or instead may be performed in other manners (e.g., based on a determination that the sending node and destination node are part of the same managed virtual computer network, are associated with the same entity, or are otherwise authorized to inter-communicate; based on an interaction with System Manager module 290 to obtain an authorization determination for the communication; etc.).

After Communication Manager module R forwards the modified communication 230-3 to the inter-connection network 250, the inter-connection network uses the physical IPv6 destination network address of the communication to route the communication to Communication Manager module S. In doing so, the devices of the inter-connection network 250 do not use the portion of the destination network address that includes the embedded entity network identifier or embedded virtual network address, and thus do not need any special configuration to forward such a communication, nor even awareness that a managed virtual computer network is being overlaid on the physical inter-connection network.

When Communication Manager module S receives communication 230-3 via the inter-connection network 250, it performs actions similar to those of Communication Manager module R, but in reverse. In particular, in at least some embodiments, the Communication Manager module S verifies that communication 230-3 is legitimate and authorized to be forwarded to computing node G, such as via one or more interactions 240 with the System Manager module. As with the interactions 225, it will be appreciated that the interactions 240 may include one or more communications (not shown) that travel over the inter-connection network 250 in at least some embodiments. If the communication 230-3 is determined to be authorized (or if the authorization determination is not performed), the Communication Manager module S then modifies communication 230-3 as appropriate and forwards the modified communication to computing node G. Additional details related to the verification of the communication 230-3 are discussed with respect to FIG. 2B.

In particular, to modify communication 230-3, Communication Manager module S retrieves information from mapping information 262 that corresponds to computing node G, including the virtual hardware address used by computing node G (or generates such a virtual hardware address if not previously available, such as for a new computing node). Communication Manager module S then creates communication 245-e by modifying communication 230-3 so as to replace the prior IPv6 header with a new IPv4 header (e.g., in accordance with SIIT). The new IPv4 header includes the virtual network address and virtual hardware address for computing node G as the destination network address and destination hardware address for the new IPv4 header, the virtual network address and a virtual hardware address for computing node A as the source network address and source hardware address for the new IPv4 header, and includes other information as appropriate for the communication (e.g., total length, header checksum, etc.). The virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 255 for computing node A's hardware address). Thus, the communication 245-e includes the same content or payload as communications 220-c and 230-3. Communication Manager module S then forwards communication 245-e to computing node G.

After receiving communication 245-e, computing node G determines to send a response communication 245-f to computing node A, using the source virtual network address and source virtual hardware address for computing node A from communication 245-e. Communication Manager module S receives response communication 245-f, and processes it in a manner similar to that previously described with respect to communication 220-c and Communication Manager module R. In particular, Communication Manager module S optionally verifies that computing node G is authorized to send communications to computing node A (e.g., based on being a response to a previous communication, or otherwise based on configuration information for computing nodes A and G as previously described), and then modifies communication 245-f to create communication 230-6 by generating a new IPv6 header using mapping information 262. After forwarding communication 230-6 to the inter-connection network 250, the communication is sent to Communication Manager module R, which processes the incoming communication in a manner similar to that previously described with respect to communication 230-3 and Communication Manager module S. In particular, Communication Manager module R optionally verifies that computing node G is authorized to send communications to computing node A and that communication 230-6 actually was sent from the substrate network location of computing node G, and then modifies communication 230-6 to create response communication 220-d by generating a new IPv4 header using mapping information 212. Communication Manager module R then forwards response communication 220-d to computing node A. In some embodiments and situations, Communication Manager modules R and/or S may handle response communications differently from initial communications, such as to assume that response communications are authorized in at least some situations, and to not perform some or all authorization activities for response communications in those situations.

In this manner, computing nodes A and G may inter-communicate using a IPv4-based managed virtual computer network, without any special configuration of those computing nodes to handle the actual intervening IPv6-based substrate inter-connection network, and inter-connection network 250 may forward IPv6 communications without any special configuration of any physical networking devices of the inter-connection network, based on the Communication Manager modules overlaying the virtual computer network over the actual physical inter-connection network from the edges of the inter-connection network.

In addition, while not illustrated with respect to FIG. 2A, in at least some embodiments the Communication Manager modules may receive and handle other types of requests and communications on behalf of associated computing nodes. For example, Communication Manager modules may take various actions to support broadcast and multicast capabilities for computing nodes that they manage. As one example, in some embodiments, a special multicast group virtual network address suffix may be reserved from each entity network identifier prefix for use in signaling networking Layer 2 raw encapsulated communications. Similarly, for link-local broadcast and multicast communications, a special multicast group /64 prefix may be reserved (e.g., "FF36:0000::"), while a different destination address prefix (e.g., "FF15:0000::") may be used for other multicast communications. Thus, for example, multicast and broadcast IP frames may be encapsulated using a corresponding reserved 64-bit prefix for the first 64 bits of the 128-bit IPv6 address, with the remaining 64 bits including the virtual IPv4 network address for the destination computing node and the entity network identifier for the destination computing node in a manner similar to that previously described. Alternatively, in other embodiments, one or more types of broadcast and/or multicast communications may each have a corresponding reserved label or other identifier that has a different value or form, including using a different number of bits and/or being stored in a manner other than as a network address prefix. When a computing node sends a broadcast/multicast communication, any Communication Manager module with an associated computing node that has subscribed to that multicast/broadcast group would be identified (e.g., based on those Communication Manager modules having subscribed to the group, such as in response to prior join communications sent by those associated computing nodes), and the Communication Manager module for the sending computing node would forward the communication to each of the identified Communication Manager modules of the group, for forwarding to their appropriate managed computing nodes. In addition, in some embodiments and situations, at least some broadcast or multicast communications may not be forwarded by Communication Manager modules, such as communications with an IPv4 prefix of 224.0/16 or another designated prefix or other label or identifier.

In addition to supporting broadcast and multicast capabilities for managed computing nodes, the Communication Manager modules may receive and handle other types of requests and communications on behalf of associated computing nodes that correspond to configured network topologies for the virtual computer networks to which the computing nodes belong. For example, computing nodes may send various requests that a specified local router device or other specified networking device would be expected to handle (e.g., ping requests, SNMP queries, etc.), and the associated Communication Manager modules may intercept such requests and take various corresponding actions to emulate the functionality that would have been provided by the specified networking device if it was physically implemented. Furthermore, in at least some embodiments, Communication Manager modules may receive and handle routing-related communications that are directed to virtual networking devices rather than to computing nodes of the managed virtual computer network, as discussed in greater detail with respect to FIG. 2E.

In addition, it will be appreciated that a Communication Manager module may facilitate communications between multiple of the computing nodes that are associated with that Communication Manager module. For example, with respect to FIG. 2A, computing node 205a may wish to send an additional communication (not shown) to computing node 205c. If so, Communication Manager module R would perform actions similar to those previously described with respect to the handling of outgoing communication 220-c by Communication Manager module R and the handling of incoming communication 230-3 by Communication Manager module S, but without re-headering of the additional communication to use an IPv6 header (since the communication will not travel over the inter-connection network). However, if computing nodes 205a and 205c are configured in a network topology for the virtual computer network to be separated by one or more virtual networking devices, the Communication Manager module R may take additional actions to emulate the functionality of those virtual networking devices, as discussed in greater detail with respect to FIG. 2C. Similarly, if computing nodes 205a and 205c are configured in a network topology for the virtual computer network to be separated by one or more other intermediate computing nodes of the virtual computer network through which such communications are to pass, the Communication Manager module R may take additional actions to forward such communications to such intermediate computing nodes, as discussed in greater detail with respect to FIG. 2D.

While not illustrated with respect to FIG. 2A, in at least some embodiments other types of requests and communications may also be handled in various ways. For example, in at least some embodiments, an entity may have one or more computing nodes that are managed by Communication Manager module(s) and that are part of a managed virtual computer network for that entity, and may further have one or more other non-managed computing systems (e.g., computing systems that are directly connected to the inter-connection network 250 and/or that natively use IPv6 network addressing) that do not have an associated Communication Manager module that manages their communications. If the entity desires that those non-managed computing systems be part of that virtual computer network or otherwise communicate with the managed computing nodes of the virtual computer network, such communications between managed computing nodes and non-managed computing systems may be handled by the Communication Manager module(s) that manage the one or more computing nodes in at least some such embodiments. For example, in such situations, if such a non-managed computing system is provided with an actual IPv6 destination network address for such a managed computing node (e.g., "::0A:01:<Z-identifier>10.0.0.2" for managed computing node A in this example), the non-managed computing system may send communications to computing node A via inter-connection network 250 using that destination network address, and Communication Manager module R would forward those communications to computing node A (e.g., after re-headering the communications in a manner similar to that previously described) if Communication Manager module R is configured to accept communications from that non-managed computing system (or from any non-managed computing system). Furthermore, Communication Manager module R may generate a dummy virtual network address to correspond to such a non-managed computing system, map it to the actual IPv6 network address for the non-managed computing system, and provide the dummy virtual network address to computing node A (e.g., as the source network address for the communications forwarded to computing node A from the non-managed computing system), thus allowing computing node A to send communications to the non-managed computing system.

Similarly, in at least some embodiments and situations, at least some managed computing nodes and/or their virtual computer networks may be configured to allow communications with other devices that are not part of the virtual computer network, such as other non-managed computing systems or other types of network appliance devices that do not have an associated Communication Manager module that manages their communications. In such situations, if the managed computing nodes and/or the virtual computer network is configured to allow communications with such other non-managed devices, such a non-managed device may similarly be provided with the actual IPv6 destination network address for such a computing node (e.g., "::0A:01:<Z-identifier>10.0.0.2" for computing node A in this example), allowing the non-managed device to send communications to computing node A via inter-connection network 250 using that destination network address, with Communication Manager module R then forwarding those communications to computing node A (e.g., after re-headering the communications in a manner similar to that previously described). Furthermore, Communication Manager module R may similarly manage outgoing communications from computing node A to such a non-managed device to allow computing node A to send such communications.

In addition, as previously noted, a communication manager module manages communications for associated computing nodes in various ways, including in some embodiments by assigning virtual network addresses to computing nodes of a provided virtual computer network, and/or by assigning substrate physical network addresses to managed computing nodes from a range of substrate physical network addresses that correspond to the communication manager module. In other embodiments, some such activities may instead be performed by one or more computing nodes of the virtual computer network, such as to allow a DHCP (Dynamic Host Configuration Protocol) server or other device of a virtual computer network to specify virtual network addresses and/or substrate physical network addresses for particular computing nodes of the virtual network. In such embodiments, the communication manager module obtains such configuration information from the virtual network device(s), and updates its mapping information accordingly (and in some embodiments may further update one or more system manager modules that maintain information about computing nodes associated with virtual networks). In yet other embodiments, a user or other entity associated with a virtual computer network may directly configure particular computing nodes to use particular virtual network addresses. If so, the communication manager modules and/or system manager module may track which virtual network addresses are used by particular computing nodes, and similarly update stored mapping information accordingly.

In addition, in some embodiments and situations, a managed computing node may itself be treated as a phantom router, with multiple virtual network addresses associated with that managed computing node, and with that managed computing node forwarding communications to other computing nodes that correspond to those multiple virtual network addresses. In such embodiments, the communication manager module that manages communications for that managed router computing node handles communications to and from that computing node in a manner similar to that previously described. However, the communication manager module is configured with the multiple virtual network addresses that correspond to the managed router computing node, so that incoming communications to any of those multiple virtual network addresses are forwarded to the managed router computing node, and so that outgoing communications from the managed router computing node are given a substrate source physical network address that corresponds to the particular computing node that sent the communication via the managed router computing node. In this manner, routers or other networking devices of a particular customer or other entity may be virtually represented for a virtual computer network implemented for that entity.

FIG. 2B illustrates some of the computing nodes and communications discussed with respect to FIG. 2A, but provides additional details with respect to some actions taken by the Communication Manager modules 210 and 260 and/or the System Manager module 290 to authorize communications between computing nodes. For example, after computing node A sends message 220-a to request a hardware address for computing node G, Communication Manager module R may perform one or more interactions 225 with the System Manager module 290 in order to determine whether to provide that information, such as based on whether computing node A is authorized to communicate with computing node G, as well as to determine a corresponding substrate physical network address for computing node G based on inter-connection network 250. If the Communication Manager module R has previously obtained and stored that information and it remains valid (e.g., has not expired), then the interactions 225 may not be performed. In this example, to obtain the desired physical network address corresponding to computing node G, Communication Manager module R sends a message 225-1 to the System Manager module 290 that includes the virtual network addresses for computing nodes A and G, and that includes an entity network identifier for each of the computing nodes, which in this example is an entity network identifier for the managed virtual computer network of entity Z (e.g., a 32-bit or 24-bit unique identifier). In at least some embodiments, Communication Manager module R may send message 225-1 to the System Manager module 290 using an anycast addressing and routing scheme, so that multiple System Manager modules (not shown) may be implemented (e.g., one for each data center that includes Communication Manager modules and associated computing nodes) and an appropriate one of those (e.g., the nearest, the most underutilized, etc.) is selected to receive and handle the message.

After the System Manager module 290 determines that computing node A is authorized to communicate with computing node G (e.g., based on having the same entity network identifier, based on computing node A having an entity network identifier that is authorized to communicate with computing nodes of the entity network identifier for computing node G, based on other information provided by or associated with computing node A indicating that computing node A is authorized to perform such communications, based on information provided by or associated with computing node G indicating that computing node A is authorized to perform such communications, based on the configured network topology for the managed virtual computer network to which computing nodes A and G belong, etc.), the System Manager module 290 returns a response message 225-2 that includes the desired actual physical substrate network address corresponding to computing node G. In addition, in at least some embodiments, before sending the desired actual physical network address, the System Manager module 290 may further verify that Communication Manager module R is authorized to send the message 225-1 on behalf of computing node A, such as based on computing node A being determined to be one of the computing nodes with which Communication Manager module R is associated.

In other embodiments, Communication Manager module R may perform some or all of the actions described as being performed by System Manager module 290, such as to maintain provisioning information for the various computing nodes and/or to determine whether computing node A is authorized to send communications to computing node G, or instead no such authorization determination may be performed in some or all situations. Furthermore, in other embodiments, other types of authorization determinations may be performed for a communication between two or more computing nodes, such as based on a type of the communication, on a size of the communication, on a time of the communication, etc.

As previously noted with respect to FIG. 2A, after Communication Manager module S receives communication 230-3 intended for computing node G via the inter-connection network 250, Communication Manager module S may perform one or more interactions 240 with the System Manager module 290 in order to determine whether to authorize that communication. In particular, in this example, to verify that the communication 230-3 is valid and authorized to be forwarded to computing node G, Communication Manager module S first extracts the actual IPv6 destination network address and actual IPv6 source network address from the header of communication 230-3, and then retrieves the embedded entity network identifiers and virtual network addresses from each of the extracted IPv6 network addresses. The Communication Manager module S next exchanges messages 240 with System Manager module 290 to obtain the corresponding actual IPv6 physical network address for the sending computing node A on behalf of computing node G, including a message 240-4 that includes the extracted virtual network addresses for computing nodes A and G and the entity network identifier for each of the computing nodes. In at least some embodiments, Communication Manager module S may send message 240-4 to the System Manager module 290 using an anycast addressing and routing scheme, as previously described.

The System Manager module 290 receives message 240-4, and returns a response message 240-5 that includes the actual physical substrate network address corresponding to computing node A, which in this example is "::0A:01:<Z-identifier>:10.0.0.2". As previously discussed with respect to messages 225-1 and 225-2, in some embodiments the System Manager module 290 and/or Communication Manager module S may further perform one or more other types of authorization determination activities, such as to determine that computing node G is authorized to communicate with computing node A, that Communication Manager module S is authorized to send the message 240-4 on behalf of computing node G, etc. Communication Manager module S then verifies that the returned physical network address in response message 240-5 matches the source IPv6 network address extracted from the header of communication 230-3, so as to prevent attempts to spoof messages as being from computing node A that are actually sent from other computing nodes in other locations. Communication Manager module S optionally stores this received information from response message 240-5 as part of an entry for computing node A in mapping information 262 for later use, along with computing node A's virtual network address and a virtual hardware address for computing node A.

FIG. 2C illustrates a further example of managing ongoing communications for the virtual computer network described with respect to FIGS. 2A and 2B, but with communications being managed to support virtual networking functionality for the virtual computer network in accordance with a configured network topology for the virtual computer network. The network topology information may be configured for the managed virtual computer network in various manners and at various times. For example, entity Z 285 may directly interact with the System Manager module 290 to provide the configured network topology information, such as via an API (not shown) and/or GUI (not shown) that is provided by the module 290 to facilitate obtaining such configuration information. In addition, the network topology information may be configured, for example, as part of initially creating the virtual computer network for entity Z, and in some embodiments may further be dynamically updated while the virtual computer network is in use.

The example of FIG. 2C illustrates computing node A, Communication Manager modules R and S, System Manager module 290, and inter-connection network 250 in a manner similar to that shown in FIGS. 2A and 2B. However, FIG. 2C further illustrates additional information regarding computing node A 205a and computing node H 255b as compared to FIG. 2A, as well as logical representations 270a and 270b of two specified router devices that are part of the configured network topology for the managed virtual computer network but that are not actually physically implemented as part of providing the managed virtual computer network. In particular, in this example, computing node A is sending a communication to computing node H, and the actions of the physically implemented modules 210 and 260 and devices of network 250 in actually sending the communication are shown, as well as emulated actions of the virtual router devices 270a and 270b in logically sending the communication.

In this example, computing nodes A and H are configured to be part of two distinct sub-networks of the virtual computer network, and the virtual router devices 270a and 270b separate the computing nodes A and H in the configured network topology for the virtual computer network. For example, virtual router device J 270a may be a local router device to computing node A in the configured network topology (e.g., may manage a first sub-network that includes computing node A), and virtual router device L 270b may be a local router device to computing node H in the configured network topology (e.g., may manage a distinct second sub-network that includes computing node H). While computing nodes A and H are illustrated as being separated by two router devices in the configured network topology in this example, it will be appreciated that two such computing nodes may be separated by 0, 1 or more than 2 router devices in other situations, and that other types of networking devices may separate computing nodes in some situations.

In the example of FIG. 2C, the additional information that is shown for computing nodes A and H includes hardware addresses associated with those computing nodes for the virtual computer network, such as virtual hardware addresses that are assigned to the computing nodes by the System Manager module 290 and/or the Communication Manager modules R and S. In particular, in this example, computing node A has been assigned hardware address "00-05-02-0B-27-44," and computing node H has been assigned hardware address "00-00-7D-A2-34-11." In addition, the virtual router devices J and L have also each been assigned virtual hardware addresses, which in this example are "00-01-42-09-88-73" and "00-01-42-CD-11-01," respectively, and have been assigned virtual network addresses, which in this example are "10.0.0.1" and "10.1.5.1," respectively. The various hardware addresses will be used as part of the sending of the communication from computing node A to computing node H, and the providing of corresponding virtual networking functionality for the virtual computer network, as described below.

Thus, in a manner similar to that described with respect to FIG. 2A, computing node A determines to send a communication to computing node H, and accordingly exchanges various messages 222 with Communication Manager module R 210. In particular, in this example, computing node A first sends an ARP message request 222-a for virtual hardware address information. However, unlike the example of FIG. 2A in which computing nodes A and G were part of the same logical sub-network, communications from computing node A to computing node H are expected to first pass through an initial intermediate destination of local router device J before being forwarded to computing node H. Accordingly, since virtual router J is the initial intermediate destination for logically remote computing node H, the ARP message request 222-a includes the virtual network address for virtual router J (i.e., "10.0.0.1") and requests the corresponding hardware address for virtual router J. In other embodiments, computing node A may instead request virtual hardware address information for computing node H directly (e.g., using the virtual network address "10.1.5.3" for computing node H), but be provided with the corresponding hardware address for virtual router J.

Communication Manager module R intercepts the ARP request 222-a, and obtains a hardware address to provide to computing node A as part of spoofed ARP response message 222-*b*. The Communication Manager module R may determine the hardware address for virtual router J, as well as that computing node H is part of a distinct logical sub-network from computing node A, in various manners in various embodiments. For example, as previously discussed, the Communication Manager module R may store various hardware address information as part of mapping information 212*c*, and if so may already have stored hardware address information for virtual router J and/or substrate network address information for computing node H. If not, however, Communication Manager module R performs one or more interactions 227 with the System Manager module 290 to obtain information from the module 290 corresponding to the indicated virtual network address for virtual router J. Rather than obtaining a substrate network address corresponding to the indicated virtual network address, as for computing node G in FIG. 2A, the System Manager module 290 indicates that the virtual network address corresponds to a virtual router device of the configured network topology, and supplies a substrate network address that corresponds to the final destination computing node H, and may also provide the hardware address information for virtual router J (e.g., by using the provisioning information 292 and/or the network topology information 296). In particular, the System Manager module 290 maintains various information 296 related to the configured network topology for the virtual computer networks that it provides or otherwise manages, such as information about specified networking devices, and uses that information and the provisioning information 292 to provide requested information to Communication Manager modules. The information 296 may in some embodiments be generated at least in part by a separate Network Routing Manager module (not shown), as described in greater detail with respect to FIG. 2E and elsewhere. The Communication Manager module R then stores the received information as part of mapping information 212*c* for future use, and in this manner determines that computing node H is part of a distinct sub-network from computing node A in the configured network topology. Furthermore, Communication Manager module R provides computing node A with the hardware address "00-01-42-09-88-73" corresponding to virtual router J as part of response message 222-*b*. While request 222-*a* and response message 222-*b* actually pass between computing node A and Communication Manager module R in the manner discussed, from the standpoint of computing node A, the communications 222-*a* and 222-*b* are part of logical interactions 263 that occur with local router device J.

After receiving the response message 222-*b* from Communication Manager module R, computing node A creates and initiates the sending of a communication to computing node H, shown in FIG. 2C as communication 222-*c*. In particular, the header of communication 222-*c* includes a destination network address for destination computing node H that is "10.1.5.3", a destination hardware address that is the virtual hardware address for virtual router J provided to computing node A in message 222-*b*, a source network address for sending computing node A that is "10.0.0.2", and a source hardware address for sending computing node A that is an actual or dummy hardware address that was previously identified to computing node A. From the standpoint of computing node A, the sent communication will be handled in the manner illustrated for logical communication 265, and will be sent to local virtual router J as communication 265*a* for forwarding based on the destination hardware address in the communication. If virtual router J were physically implemented and received such a communication 265*a*, it would modify the header of the communication 265*a* and forward the modified communication 265*b* to virtual router L, which would similarly modify the header of the communication 265*b* and forward that further modified communication 265*c* to computing node H. The modifications that virtual router J would perform to such a communication 265*a* may include, for example, decrementing a TTL network hop value in the header and changing the destination hardware address to correspond to the next destination, which in this example would be virtual router L. Similarly, the modifications that virtual router L would perform to such a communication 265*b* may include, for example, further decrementing the TTL network hop value in the header and changing the destination hardware address to correspond to the next destination, which in this example would be computing node H. In some embodiments and situations, other similar modifications may be performed by the router devices if they were physically implemented and used for the forwarding of the communication.

While communication 222-*c* from computing node A to computing node H is logically handled in the manner illustrated for communication 265, the communication 222-*c* is actually intercepted and handled by Communication Manager module R. In particular, in a manner similar to that described in FIG. 2A for communication 220-*c*, Communication Manager module R intercepts the communication 222-*c*, modifies the communication as appropriate, and forwards the modified communication over the inter-connection network 250 to computing node H. To determine the substrate network address to be used for forwarding the modified communication over the inter-connection network 250, Communication Manager module R extracts the destination virtual network address and destination virtual hardware address from the header of communication 222-*c*. However, based on the destination virtual hardware address corresponding to virtual router J, Communication Manager module R determines to use the destination virtual network address to identify the destination substrate network address, in a manner different from that of FIG. 2A. Thus, the Communication Manager module R checks the mapping information 212*c* to determine if a substrate network address corresponding to computing node H's virtual network address has been previously determined and stored. If not, Communication Manager module R performs one or more interactions 227 with the System Manager module 290 to determine that information, in a manner similar to the interactions 225 of FIG. 2A. As discussed in greater detail with respect to FIG. 2B, in response to the ARP request message 222-*a* and/or communication 222-*c*, the Communication Manager module R and/or the System Manager module 290 may further perform various optional authentication activities.

After Communication Manager module R determines the IPv6 actual physical substrate network address corresponding to computing node H, it creates a new IPv6 header that includes that actual physical substrate network address as the destination address, and similarly adds a source IPv6 address for computing node A to the new header. In this example, the physical substrate network address corresponding to computing node H is similar to that of computing node G, and in particular is the IPv6 substrate network address "::0B:02:<Z-identifier>:10.1.5.3", where "10.1.5.3" is stored in the last 32 bits of the 128-bit IPv6 address, and where "<Z-identifier>" is a 24-bit entity network identifier for the managed virtual computer network. Thus, as with communications sent to computing node G, a communication sent over the inter-connection network 250 to the substrate network address for computing node H will be routed to Communication Manager module S. The Communication Manager module R next creates a new communication 232-3 by modifying communication 222-c so as to replace the prior IPv4 header with the new IPv6 header (e.g., in accordance with SIIT), including populating the new IPv6 header with other information as appropriate for the new communication (e.g., payload length, traffic class packet priority, etc.), and forwards communication 232-3 over the inter-connection network 250. The inter-connection network then uses the physical IPv6 destination network address of the communication 232-3 to route the communication to Communication Manager module S. When Communication Manager module S receives communication 232-3 via the inter-connection network 250, it performs actions similar to those described in FIG. 2A with respect to communication 230-3, including to optionally perform interactions 242 with the System Manager module 290 to determine if the communication is authorized, to update mapping information 262c to reflect any new information about computing node A, to modify the communication to include an appropriate IPv4 header, and to provide the modified communication as communication 247-e to computing node H.

Furthermore, as noted elsewhere, Communication Manager module R and/or Communication Manager module S take further actions in this example to modify the communication from computing node A to computing node H in such a manner as to provide virtual networking functionality corresponding to the configured network topology for the virtual computer network, including to emulate functionality that would be provided by virtual routers J and L if they were physically implemented for the virtual computer network. For example, as previously discussed, virtual routers J and L would perform various modifications to communication 265 as it is forwarded to computing node H if those routers were physically implemented and used, including to modify TTL network hop values and to perform other header modifications. Accordingly, Communication Manager module R and/or Communication Manager module S may perform similar modifications to the communication 222-c and/or 247-e to emulate such functionality of the virtual routers J and L. Thus, computing node H receives a communication 247-e that appears to be communication 265c forwarded via the specified network topology for the virtual computer network.

In this manner, the CNS system may provide virtual networking functionality corresponding to the configured network topology, without any special configuration of the computing nodes of the managed virtual computer network or of the physical networking devices of the intervening substrate inter-connection network, based on the Communication Manager modules overlaying the virtual computer network on the actual physical inter-connection network in such a manner as to emulate the configured network topology. In addition, multiple modules of the CNS system may operate together in a distributed manner to provide functionality corresponding to a particular virtual networking device, such as with modules 210, 260 and 290 operating together in the previous example to emulate functionality corresponding to each of virtual router devices 270a and 270b.

FIG. 2D illustrates a further example of managing ongoing communications for the virtual computer network described with respect to FIGS. 2A-2C, but with communications being managed to support virtual networking functionality for the managed virtual computer network in accordance with a configured network topology for the virtual computer network that includes one or more computing nodes of the virtual computer network that act as intermediate nodes that facilitate handling at least some inter-node communications. In particular, FIG. 2D illustrates computing nodes A and H, Communication Manager modules R and S, System Manager module 290, and inter-connection network 250 in a manner similar to that shown in FIGS. 2A-2C. However, in the example of FIG. 2D, the virtual computer network is configured to have at least two logical subnets, and computing node H is configured to act as an intermediate computing node through which inter-node communications between the two logical subsets are passed (e.g., as a firewall device between the two logical subnets). One or more specified networking devices may further be configured as part of the network topology, such as illustrated with respect to FIG. 2C, but are not illustrated or explicitly managed in the example of FIG. 2D.

In the example of FIG. 2D, computing node A is sending a communication to computing node C, with computing nodes A and C being configured to belong to distinct logical subnets of the virtual computer network, and with computing node H being configured to act as a firewall device for communications passing between those logical subnets. The actions of the physically implemented modules 210 and 260 and devices of network 250 in actually sending the communication are shown, as well as the actions of computing node H in facilitating the sending of the communication. While only a single intermediate computing node is illustrated in FIG. 2D as being used in the routing path of the virtual computer network for inter-node communications between the two logical subnets, it will be appreciated that such a routing path may instead include 0 such intermediate nodes (e.g., as discussed with respect to FIGS. 2A and 2B) or more than 1 such intermediate nodes in other situations, and that such intermediate nodes may perform other types of actions in some situations.

Thus, in a manner similar to that described with respect to FIG. 2A, computing node A determines to send a communication to computing node C, and accordingly exchanges various messages 224 with Communication Manager module R 210. In particular, in this example, computing node A first sends a message request 224-a for virtual hardware address information for computing node C. However, unlike the example of FIG. 2A in which computing nodes A and G were part of the same logical subnet and did not include any intermediate computing nodes in the routing path between computing nodes A and G for the virtual computer network, communications from computing node A to computing node C are configured to first pass through an initial intermediate computing node H before being forwarded to computing node G. Accordingly, the information maintained by the System Manager module 290 for use in directing communications from computing node A to computing node C reflects that computing node H is an initial intermediate destination for such communications.

Thus, Communication Manager module R intercepts the request 224-a, and obtains a hardware address to provide to computing node A as part of spoofed ARP response message 224-b for use in directing the inter-node communication along the configured routing path, in a manner similar to that previously discussed. The Communication Manager module R may store various hardware address information as part of mapping information 212d, and if so may already have stored hardware address information for use with communications from computing node A to computing node C. If not, however, Communication Manager module R performs one or more interactions 229 with the System Manager module 290 to obtain information from the module 290 corresponding to the indicated virtual network address for computing node C. Rather than providing the substrate network address corresponding to computing node C, however, as performed for computing node G in FIG. 2A, the System Manager module 290 instead indicates that the virtual network address for computing node C (at least for communications sent from computing node A) corresponds to the substrate network address for computing node H as part of the substrate network routing path to computing node C, and may also provide information to the Communication Manager module R that indicates a hardware address to use to represent computing node C (at least for communications sent from computing node A). In particular, as discussed with respect to FIG. 2C, the System Manager module 290 maintains various information 296 related to the configured network topology for the virtual computer networks that it provides or otherwise manages (e.g., as generated at least in part by a separate Network Routing Manager module, not shown, as described in greater detail with respect to FIG. 2E and elsewhere), such as information about intermediate computing nodes along routing paths between particular computing nodes, and uses that information to provide requested information to Communication Manager modules. The Communication Manager module R then stores the received information as part of mapping information 212d for future use, with the hardware address for computing node C being associated with the substrate network address for computing node H (at least for communications sent from computing node A), and provides computing node A with the hardware address corresponding to computing node C as part of response message 224-b.

After receiving the response message 224-b from Communication Manager module R, computing node A creates and initiates the sending of a communication to computing node C, shown in FIG. 2D as communication 224-c. In particular, the header of communication 224-c includes a destination network address for destination computing node C that is "10.0.5.1", a destination hardware address that is the virtual hardware address for computing node C provided to computing node A in message 224-b, a source network address for sending computing node A that is "10.0.0.2", and a source hardware address for sending computing node A that is an actual or dummy hardware address that was previously identified to computing node A.

The outgoing communication 224-c is intercepted and handled by Communication Manager module R in a manner similar to that previously described with respect to FIGS. 2A and 2C. In particular, as with communication 220-c in FIG. 2A, Communication Manager module R intercepts the communication 224-c, modifies the communication as appropriate, and forwards the modified communication over the inter-connection network 250 to computing node H. To determine the substrate network address to be used for forwarding the modified communication over the inter-connection network 250, Communication Manager module R extracts the destination virtual network address and destination virtual hardware address from the header of communication 224-c. After Communication Manager module R determines the IPv6 actual physical substrate network address corresponding to computing node H, it creates a new IPv6 header that includes that actual physical substrate network address as the destination address, and similarly adds a source IPv6 address for computing node A to the new header. The Communication Manager module R next creates a new communication 234-3 by modifying communication 224-c so as to replace the prior IPv4 header with the new IPv6 header (e.g., in accordance with SIIT), including populating the new IPv6 header with other information as appropriate for the new communication (e.g., payload length, traffic class packet priority, etc.), and forwards communication 234-3 over the inter-connection network 250. As discussed in greater detail with respect to FIG. 2B, in response to the request message 224-a and/or communication 224-c, the Communication Manager module R and/or the System Manager module 290 may further perform various optional authentication activities.

The inter-connection network then uses the physical IPv6 destination network address of the communication 234-3 to route the communication to Communication Manager module S. When Communication Manager module S receives communication 234-3 via the inter-connection network 250, it performs actions similar to those described in FIG. 2A with respect to communication 230-3, including to optionally perform interactions 244 with the System Manager module 290 to determine if the communication is authorized, to update mapping information 262d to reflect any new information about computing node A, to modify the communication to include an appropriate IPv4 header, and to provide the modified communication as communication 248-e to computing node H. However, the communication 248-e provided to computing node H includes information that indicates that computing node C is the final destination for the communication, such as for use by computing node H in performing its firewall analysis. In particular, in this example, the communication 248-e includes a destination hardware address that corresponds to computing node H, but the destination network address is the virtual network address for computing node C, in a manner similar to communication 222-c/265a of FIG. 2C.

When computing node H receives communication 248-e, it optionally performs various firewall-related activities for the communication, based on its configuration, and in this example determines to forward the communication on to its final destination of computing node C. As discussed in greater detail elsewhere, such intermediate computing nodes via which some inter-node communications may be directed may provide a variety of other types of capabilities in other embodiments and situations. Furthermore, as noted elsewhere, computing node H may in some such situations determine to modify the communication in one or more manners based on its firewall policies. In order to forward the communication on to computing node C, computing node H updates the received communication 248-e so that it has a new destination hardware address that corresponds to computing node C (optionally after performing interactions with Communication Manager module S to obtain the hardware address for computing node C's virtual network address, not shown, in a manner similar to that of communications 224-a and 224-b). The computing node H then sends the modified communication as outgoing communication 248-f.

In a manner similar to that previously discussed elsewhere, the outgoing communication 248-f is intercepted and handled by Communication Manager module S. In particular, Communication Manager module S intercepts the communication 248-f, modifies the communication as appropriate, and forwards the modified communication over the inter-connection network 250 to computing node C. To determine the substrate network address to be used for forwarding the modified communication over the inter-connection network 250, Communication Manager module S extracts the destination virtual network address and destination virtual hardware address from the header of communication 248-f. After Communication Manager module S determines the IPv6 actual physical substrate network address corresponding to computing node C, it creates a new IPv6 header that includes that actual physical substrate network address as the destination address, and similarly adds a source IPv6 address for computing node A to the new header. The Communication Manager module S next creates a new communication 234-6 by modifying communication 248-f so as to replace the prior IPv4 header with the new IPv6 header (e.g., in accordance with SIIT), including populating the new IPv6 header with other information as appropriate for the new communication (e.g., payload length, traffic class packet priority, etc.), and forwards communication 234-6 over the inter-connection network 250.

The inter-connection network then uses the physical IPv6 destination network address of the communication 234-6 to route the communication to Communication Manager module R. When Communication Manager module R receives communication 234-6 via the inter-connection network 250, it performs actions similar to those previously described, including to optionally determine if the communication is authorized, to modify the communication to include an appropriate IPv4 header, and to provide the modified communication as communication 224-h to computing node C. As discussed in greater detail elsewhere, in other embodiments the substrate network that is used may instead use the same network addressing scheme as the overlay virtual computer network, such as to both use IPv4.

In this manner, the CNS system may provide virtual networking functionality corresponding to the configured network topology, including to support intermediate computing nodes along routing paths between particular computing nodes, and again without any special configuration of the computing nodes of the managed virtual computer network or of the physical networking devices of the intervening substrate inter-connection network, based on the Communication Manager modules overlaying the virtual computer network on the actual physical inter-connection network in such a manner as to emulate the configured network topology.

FIG. 2E continues the example of FIG. 2D, in which computing node H acted as an intermediate computing node for at least some inter-node communications of a managed virtual computer network by facilitating handling of those communications, and in particular performed firewall-related functionality for such communications as part of the example of FIG. 2D. In the example of FIG. 2E, computing node H continues to act as such an intermediate computing node for at least some inter-node communications, and is further configured to participate in one or more defined routing protocols for the managed virtual computer network, such as to exchange routing-related communications with other specified networking devices of the managed virtual computer network that include routing information for the managed virtual computer network. Such other specified networking devices of the managed virtual computer network may include, for example, virtual router devices 270a and 270b, as discussed in greater detail with respect to FIG. 2C.

Accordingly, in the example of FIG. 2E, computing node H has determined to send a routing-related communication to virtual router L 270b (e.g., based on virtual router L being configured in the network topology for the managed virtual computer network as being a nearby neighbor router, or instead in other manners), such as to include various routing information for the managed virtual computer network that is locally stored by or otherwise accessible to computing node H. Thus, in this example, computing node H creates the routing-related communication, and initiates sending of the routing-related communication 269-j, which computing node H intends to send directly to virtual router L as shown with respect to logical communication 266. In particular, the routing-related communication has a destination network address and destination hardware address that are the virtual network address and virtual hardware address assigned to virtual router L (in this example, "10.1.5.1" and "00-01-42-CD-11-01," respectively), and source network address and source hardware address corresponding to computing node H. While not illustrated here, in order to obtain the destination network address and/or the destination hardware address for virtual router L, computing node H may perform one or more other prior communications (not shown) to obtain such information, such as via an ARP message request.

In a manner similar to that described previously, Communication Manager module S intercepts the routing-related communication 269-j, and determines that the routing-related communication is intended for a virtual networking device that is part of the configured network topology of the managed virtual computer network, such as based on the indicated destination virtual network address and/or destination hardware address of the routing-related communication, or instead in other manners (e.g., based at least in part on the routing protocol used for the communication). As previously discussed, the Communication Manager module S may store various hardware address information and virtual network address information as part of mapping information 262e, and if so may already have stored information for use with communications directed to virtual router L. If not, however, Communication Manager module S may perform one or more interactions (not shown) with the System Manager module 290 to obtain information from the module 290 corresponding to the virtual router L, in a manner similar to that discussed previously.

However, in a manner different from that of FIGS. 2A-2D, rather than forwarding the received communication 269-j over the substrate network to its intended destination, Communication Manager module S determines to provide the received routing-related communication 269-j (or routing information from the communication) to the Network Routing Manager module 295, such as via one or more interactions 243e. While the module 295 is not explicitly illustrated as being physically connected to the inter-connection network 250 in this example, such physical connections may exist in at least some embodiments, in a manner similar to that for System Manager module 290 and the various Communication Manager modules. Accordingly, while the interactions 243e with the module 295 are not illustrated in this example as explicitly traveling over the inter-connection network 250, it will be appreciated that such interactions may include one or more communications that do travel over the inter-connection network 250 in at least some embodiments. In addition, as discussed in greater detail elsewhere, in some embodiments, the Communication Manager module S and/or the Network Routing Manager module 295 may filter or restrict at least some types of routing-related communications, such as by discarding or otherwise not using such communications, and thus the Communication Manager module S and/or the Network Routing Manager module 295 may further perform various optional activities in determining whether to use the routing information in the received communication 269-j.

As discussed in greater detail elsewhere, the Network Routing Manager module 295 may use the routing information from the routing-related communication in various manners, including to determine whether the routing information indicates any changes in the configured network topology for the managed virtual computer network. As previously noted, the System Manager module 290 maintains various information 296 related to the configured network topology for the virtual computer networks that it provides or otherwise manages (e.g., as generated at least in part by the Network Routing Manager module 295), such as information about intermediate computing nodes along routing paths between particular computing nodes, and uses that information to provide requested information to Communication Manager modules. Accordingly, the Network Routing Manager module 295 may analyze the received routing information to determine if it reflects any relevant changes to the configured network topology information for the managed virtual computer network (e.g., any changes regarding intermediate computing nodes along particular inter-node communication routing paths). If the Network Routing Manager module 295 identifies any such relevant changes to the configured network topology information for the managed virtual computer network, the Network Routing Manager module 295 performs one or more interactions 297e (optionally by sending one or more communications, not shown, over the inter-connection network 250) with the System Manager module 290 to cause the network topology information 296 to be updated in a corresponding manner.

In a similar manner, after the managed virtual computer network is in the use, the entity Z client 285 associated with the managed virtual computer network may optionally in some embodiments perform additional interactions with the System Manager module 290 to provide updates or other new configured network topology information for the managed virtual computer network. If so, the System Manager module 290 may provide the new network topology information to the Network Routing Manager module 295 (e.g., via one or more interactions 297e). If so, the Network Routing Manager module 295 may proceed to perform actions similar to those performed for the received routing information from routing-related communication 269-j, including to analyze the received new network topology information to determine if it reflects any relevant changes to the configured network topology information for the managed virtual computer network. If the Network Routing Manager module 295 identifies any such relevant changes to the configured network topology information for the managed virtual computer network, the Network Routing Manager module 295 similarly performs one or more interactions 297e with the System Manager module 290 to cause the network topology information 296 to be updated in a corresponding manner.

In addition to updating the stored network topology information 296 as appropriate, the Network Routing Manager module 295 may further take other actions in some embodiments. For example, if changes to the network topology are detected that reflect changes to one or more intermediate computing nodes for use in inter-node communications between at least some computing nodes, the Network Routing Manager module 295 may optionally perform interactions 246 to supply corresponding update information to one or more Communication Manager modules that manage computing nodes affected by the network topology changes. If such updated information is supplied to Communication Manager modules R and/or S, for example, they may use that updated information to update their stored mapping information 212e and 262e, respectively, in a corresponding manner for use with future inter-node communications that are affected by the network topology change. In other embodiments, the Communication Manager modules may instead obtain such updated network topology information directly from the System Manager module 290, such as if the Communication Manager modules periodically contact the System Manager module 290 for current information (e.g., if the stored mapping information 212e and 262e expires periodically or instead based on other criteria, such as based on a communication from the System Manager module 290 and/or the Network Routing Manager module 295 that some or all of the stored mapping information is no longer valid).

Furthermore, while not illustrated in FIG. 2E, the Network Routing Manager module 295 may take other actions in at least some embodiments and situations, such as to initiate the sending of routing-related communications to computing nodes such as computing node H that participate in the predefined routing protocol for the managed virtual computer network. Such sending of a routing-related communication to computing node H or other similar computing node may be initiated by the Network Routing Manager module 295 in various manners in various embodiments, such as by generating a particular routing-related communication and forwarding it over the inter-connection network 250 to the destination computing node in a manner similar to that of other inter-node communications (optionally with the sent communication including sender information corresponding to a virtual networking device for the managed virtual computer network, such as virtual router L or virtual router J). Alternatively, the Network Routing Manager module 295 may in some embodiments and situations instead provide the routing information intended for such a computing node to the computing node's associated Communication Manager module (e.g., to Communication Manager module S for computing node H), and have that associated Communication Manager module generate and provide an appropriate routing-related communication to the associated computing node. As discussed in greater detail elsewhere, such routing information provided to computing nodes may have various forms, including the following: routing information received from other computing nodes or other sources (e.g., a remote networking device at a client's remote network that interacts with the managed virtual computer network) that is being forwarded to additional computing nodes; routing information that reflects changes made by the client to the configured network topology for the managed virtual computer network, such as via interactions with the System Manager module; routing information that is generated by the Network Routing Manager module to provide globally consistent routing information for all computing nodes of the managed virtual computer network, or that otherwise satisfies a centralized goal for operation of the managed virtual computer network; etc.

In this manner, the CNS system may further provide virtual networking functionality corresponding to the configured network topology, including to support intermediate computing nodes along routing paths between particular computing nodes, and again without any special configuration of the computing nodes of the managed virtual computer network or of the physical networking devices of the intervening substrate inter-connection network. Such techniques may be based at least in part on the Communication Manager modules managing at least some routing-related communications (e.g., routing-related communications directed to virtual networking devices) in appropriate manners, and/or on a Network Routing Manager module using configured network topology information and/or dynamically supplied routing information to manage inter-node communications for a managed virtual computer network.

FIG. 2F continues the examples of FIGS. 2A-2E, and further illustrates additional details regarding supporting connections between multiple managed computer networks. In particular, FIG. 2F illustrates computing node A 205a, the logical representation 270a of virtual router J, Communication Manager modules R and S 210 and 260, System Manager module 290, Network Routing Manager module 295, and inter-connection network 250 in a manner similar to that shown in various of FIGS. 2A-2E. However, FIG. 2F further illustrates additional components, including computing node 1255c that is associated with Communication Manager module S and is part of a second managed virtual computer network provided to client entity Y (along with other computing nodes, such as computing node B 205b illustrated in FIG. 2A), as well as a logical representation 270d of virtual router device M that is also part of the configured network topology for the second virtual computer network provided to client entity Y (but that is not actually physically implemented as part of providing the managed second virtual computer network). In addition, a logical representation 215 of a virtual peering router device is also illustrated, such as to provide a logical connection between the virtual router J of the first virtual computer network for entity Z and the virtual router M of the second virtual computer network for entity Y, as described below, although in other embodiments the two (or more) virtual computer networks may instead be interconnected in other manners (e.g., via multiple connected virtual peering routers). In this example, the single virtual peering router has interfaces (not shown) for each of the two virtual computer networks, such as by being assigned the network address of "10.0.0.9" for a first interface for the first virtual computer network for entity. Z, and the network address of "20.0.7.9" for a second interface for the second virtual computer network for entity Y. As discussed in greater detail elsewhere, the virtual peering router is not actually physically implemented, in a manner similar to virtual routers J and M of the first and second managed virtual computer networks, but various modules of the configurable network service operate together to emulate functionality corresponding to the virtual peering router.

In particular, in this example, entities Z and Y have previously each configured their virtual computer network to connect to the virtual peering router 215, so as to enable communications to pass at least from the first virtual computer network for entity Z to the second virtual computer network for entity Y (and optionally from the second virtual computer network to the first virtual computer network as well). In addition, while not illustrated here, one or more routing communications may have optionally been directed to the virtual peering router 215 from each of the two virtual computer networks, in a manner similar to that previously discussed with respect to FIG. 2E. Once the two virtual computer networks are connected to the virtual peering router 215 and configured to enable communications from at least the first virtual computer network to the second virtual computer network, the Network Routing Manager module 295 updates the network topology information 296 that is accessible to the System Manager module 290 to reflect that configuration, as well as in light of any peering configuration information specified by entities Y and/or Z. For example, the updated network topology information 296 may include information to indicate that the computing nodes of the second virtual computer network (such as computing nodes B and I) are accessible from the computing nodes of the first virtual computer network (such as computing nodes A, C, G, H, etc.). In addition, the Network Routing Manager module 295 and/or the System Manager module 290 may further take actions in some embodiments to update corresponding mapping information stored by Communication Manager modules associated with computing nodes of the first virtual computer network, such as to update mapping information 212f used by Communication Manager module R.

In the example of FIG. 2F, computing node A of the first virtual computer network is sending a communication to computing node I of the second virtual computer network, and the actions of the physically implemented modules 210 and 260 and devices of network 250 in actually sending the communication are shown, as well as emulated actions of the virtual routers 270a, 270d and 215 in logically sending the communication. As discussed previously with respect to FIG. 2C, virtual router device J 270a may be a local router device to computing node A in the configured network topology for the first virtual computer network (e.g., may manage a first sub-network that includes computing node A), and virtual router device M 270d may similarly be a local router device to computing node I in the configured network topology of the second virtual computer network. While computing nodes A and I are illustrated as being separated by two router devices of the two managed virtual computer networks in the configured network topology in this example, it will be appreciated that two such computing nodes may be separated by other numbers of logical router devices in other situations, and that other types of networking devices may separate computing nodes in some situations. In addition, while FIG. 2C includes details regarding how hardware addresses may be assigned to computing nodes and virtual routers, and used to direct communications, such details are not included in FIG. 2F for the sake of brevity.

In a manner similar to that described with respect to other figures, such as

FIGS. 2A and 2C, computing node A determines to send a communication to computing node I, and accordingly exchanges various messages 226 with Communication Manager module R 210. In particular, in this example, computing node A first sends a message request 226-a for virtual hardware address information of computing node I. In a manner similar to that of FIG. 2C, communications from computing node A to computing node I are expected to first pass through an initial intermediate destination of local router device J before being eventually forwarded to computing node I. Accordingly, since virtual router J is the initial intermediate destination for logically remote computing node I, the message request 226-a includes the virtual network address for virtual router J (i.e., "10.0.0.1") and requests the corresponding hardware address for virtual router J. In other embodiments, computing node A may instead request virtual hardware address information for computing node I directly (e.g., using the virtual network address "20.0.0.3" for computing node I), but be provided with the corresponding hardware address for virtual router J.

Communication Manager module R intercepts the request 226-a, and obtains a hardware address to provide to computing node A as part of spoofed response message 226-b. The Communication Manager module R may determine the hardware address for virtual router J, as well as that computing node I is part of a distinct virtual computer network from computing node A, in various manners in various embodiments. For example, as previously discussed, the Communication Manager module R may store various address information as part of mapping information 212f, and if so may already have stored hardware address information for virtual router J and/or a substrate network address that corresponds to computing node I. If not, however, Communication Manager module R performs one or more interactions 228 with the System Manager module 290 to obtain information from the module 290 corresponding to the indicated virtual network address for virtual router J. Rather than obtaining a substrate network address corresponding to the indicated virtual network address, as for computing node G in FIG. 2A, the System Manager module 290 indicates that the virtual network address corresponds to a virtual router device of the configured network topology for the first virtual computer network, and supplies a substrate network address that corresponds to the final destination computing node I, and may also provide the hardware address information for virtual router J (e.g., by using the network topology information 296 and/or the provisioning information 292). The Communication Manager module R then stores the received information as part of mapping information 212f for future use, and in this manner determines that computing node I is part of a distinct virtual computer network from computing node A. Furthermore, Communication Manager module R provides computing node A with a hardware address corresponding to virtual router J as part of response message 226-b. While request 226-a and response message 226-b actually pass between computing node A and Communication Manager module R in the manner discussed, from the standpoint of computing node A, the communications 226-a and 226-b are part of logical interactions 264 that occur with local router device J.

After receiving the response message 226-b from Communication Manager module R, computing node A creates and initiates the sending of a communication to computing node I, shown in FIG. 2F as communication 226-c. In particular, the header of communication 226-c includes a destination network address for destination computing node I that is "20.0.0.3", a destination hardware address that is the virtual hardware address for virtual router J provided to computing node A in message 226-b, a source network address for sending computing node A that is "10.0.0.2", and a source hardware address for sending computing node A that is an actual or dummy hardware address that was previously identified to computing node A. From the standpoint of computing node A, the sent communication will be handled in the manner illustrated for logical communication 267, and will be sent to local virtual router J as communication 267a for forwarding based on the destination hardware address in the communication. If virtual router J were physically implemented and received such a communication 267a, it would modify the header of the communication 267a (as discussed in greater detail with respect to FIG. 2C) and forward the modified communication 267b to virtual peering router 215 using its assigned network address of "10.0.0.9" for the first virtual computer network, which would similarly modify the header of the communication 267b and forward that further modified communication 267c to virtual router M, which would similarly modify the header of the communication 267c and forward that further modified communication 267d to computing node I.

While communication 226-c from computing node A to computing node I is logically handled in the manner illustrated for communication 267, the communication 226-c is actually intercepted and handled by Communication Manager module R. In particular, in a manner similar to that described in FIG. 2C for communication 222-c, Communication Manager module R intercepts the communication 226-c, modifies the communication as appropriate, and forwards the modified communication over the inter-connection network 250 to computing node I. To determine the substrate network address to be used for forwarding the modified communication over the inter-connection network 250, Communication Manager module R extracts the destination virtual network address and destination virtual hardware address from the header of communication 226-c. Based on the destination virtual hardware address corresponding to virtual router J, Communication Manager module R determines to use the destination virtual network address to identify the destination substrate network address. Thus, the Communication Manager module R checks the mapping information 212f to determine if a substrate network address corresponding to computing node I's virtual network address has been previously determined and stored. If not, Communication Manager module R performs one or more interactions 228 with the System Manager module 290 to determine that information, in a manner similar to the interactions 227 of FIG. 2C. As discussed in greater detail previously, in response to the request message 226-a and/or communication 226-c, the Communication Manager module R and/or the System Manager module 290 may further perform various optional authentication activities before forwarding the communication to the final destination of computing node I, including to verify that peering configuration information specified by entity Z (if any) and by entity Y (if any) authorizes computing node A to send communications to computing node I.

After Communication Manager module R determines the IPv6 actual physical substrate network address corresponding to computing node I, it creates a new IPv6 header that includes that actual physical substrate network address as the destination address, and similarly adds a source IPv6 address for computing node A to the new header. In this example, the physical substrate network address corresponding to computing node I is similar to that of computing nodes G and H, and in particular is the IPv6 substrate network address "::0B:02:<Y-identifier>:20.0.0.3", where "20.0.0.3" is stored in the last 32 bits of the 128-bit IPv6 address, and where "<Y-identifier>" is a 24-bit entity network identifier for the second managed virtual computer network for entity Y. The Communication Manager module R next creates a new communication 237-3 by modifying communication 226-c so as to replace the prior IPv4 header with the new IPv6 header (e.g., in accordance with SIIT), including populating the new IPv6 header with other information as appropriate for the new communication (e.g., payload length, traffic class packet priority, etc.), and forwards communication 237-3 over the inter-connection network 250. The inter-connection network then uses the physical IPv6 destination network address of the communication 237-3 to route the communication to Communication Manager module S. When Communication Manager module S receives communication 237-3 via the inter-connection network 250, it performs actions similar to those described in FIG. 2C with respect to communication 232-3, including to optionally perform interactions 241 with the System Manager module 290 to determine if the communication is authorized, to update mapping information 262f to reflect any new information about computing node A, to modify the communication to include an appropriate IPv4 header, and to provide the modified communication as communication 249-e to computing node I.

Furthermore, as noted elsewhere, Communication Manager module R and/or Communication Manager module S take further actions in this example to modify the communication from computing node A to computing node I in such a manner as to provide virtual networking functionality corresponding to the managed virtual computer networks, including to emulate functionality that would be provided by virtual routers J and M and virtual peering router 215 if they were physically implemented. For example, as previously discussed, virtual routers J and M would perform various modifications to communication 267 as it is forwarded to computing node I if those routers were physically implemented and used, including to modify TTL network hop values and to perform other header modifications. Accordingly, Communication Manager module R and/or Communication Manager module S may perform similar modifications to the communication 226-c and/or 249-e to emulate such functionality of the virtual routers J and M. Thus, computing node I receives a communication 249-e that appears to be communication 267d forwarded via the virtual peering router and the specified network topology for the second virtual computer network.

In addition, in some embodiments, additional actions may be taken to support inter-connections between multiple managed virtual computer networks. For example, if the second virtual computer network for entity Y had instead been configured to have overlapping network addresses with those of the first virtual computer network for entity Z, the various modules of the configurable network service may in some embodiments be configured to perform additional actions to support inter-operability of the two managed virtual computer networks. For example, if computing node I had instead been configured to use the virtual network address of "10.0.0.3" for the second virtual computer network, it would share that virtual network address with computing node G of the first virtual computer network—accordingly, if computing node A had directed its outgoing communication to that virtual network address, the communication would have been routed to computing node G rather than to computing node I. Thus, in some embodiments, the configurable network service may take actions to prevent such overlaps in virtual network addresses between connected managed virtual computer networks, such as to provide functionality analogous to that of network address translation ("NAT"). If computing node I of the second virtual computer network had been configured to share the virtual network address of "10.0.0.3" with existing computing node G of the first virtual computer network, for example, the configurable network service may select a new virtual network address to represent computing node I that does not overlap with the virtual network addresses of the first virtual computer network (e.g., to use the new virtual network address of "210.0.0.3". Accordingly, the information that is provided to the first virtual computer network for the second virtual computer network would include any such representative network addresses, and computing node A would instead direct its outgoing communication 226-c to the destination virtual network address of "210.0.0.3". In other embodiments, the configurable network service may instead handle overlapping network addresses between inter-connected managed virtual computer networks in other manners, such as to not allow such managed virtual computer networks to be inter-connected, and may further optionally notify the clients associated with one or more such managed virtual computer networks of the overlap that prevents the inter-connection (e.g., optionally with a new suggested virtual network address range to be used for at least one of the managed virtual computer networks that will not overlap with the virtual network addresses used by the other managed virtual computer network(s)).

In addition, while the previous example of FIG. 2F involved a communication that was sent from the first virtual computer network to the second virtual computer network, it will be appreciated that the second virtual computer network may be configured in at least some embodiments to similarly send communications to the first virtual computer network (e.g., any communication; only responses to communications from the first virtual computer network, such as to enable computing node I to respond to computing node A but not to send a new communication to computing node G; etc.). Such authorized communications from a computing node of the second virtual computer network to one or more computing nodes of the first virtual computer network will similarly be logically directed through the virtual peering router 215, but in actuality will be passed directly to the destination computing node via the substrate inter-connection network 250. Furthermore, as discussed in greater detail elsewhere, in some embodiments a client may configure one or more computing nodes of their managed virtual computer network to operate as a network appliance, such as to provide one or more types of functionality for communications that are routed through those computing nodes (e.g., for software firewall computing node H of FIG. 2D). In some embodiments, one or more clients who configure their managed virtual computer network to connect to a virtual peering router may configure one or more such network appliance computing nodes to be used to manage communications that are received from and/or sent to the virtual peering router. Thus, if entity Y had configured computing node B to act as a firewall for any incoming communications to the second virtual computer network from the first virtual computer network, for example, the communication from computing node A to computing node I would have first been routed to computing node B for handling, before optionally being forwarded to computing node I, in a manner similar to that described for software firewall computing node H of FIG. 2D. Alternatively, the configurable network service may enable a client to specify one or more filters or other communication constraints that the virtual peering router is to enforce for computing node communications and/or routing communications sent via the connection between the client's managed virtual computer network and the virtual peering router, and the various modules of the configurable network service may enforce such constraints as part of authorizing whether to forward communications between computing nodes.

Furthermore, while not illustrated with respect to FIG. 2F, in some embodiments routing communications may be directed to the virtual peering router 215 from one or both of the managed virtual computer networks provided to entities Z and Y, such as from computing nodes of those managed computer networks that participate in the routing protocols used by those managed virtual computer networks. Furthermore, the various managed computer networks that are connected to a virtual peering router may in some embodiments and situations use multiple distinct routing protocols. When such routing communications are received, they may be handled in a manner similar to that illustrated with respect to FIG. 2E, such as for a communication manager module that receives such a routing communication to forward it to the Network Routing Manager module 295 for further processing. Similarly, while also not illustrated with respect to FIG. 2F, the Network Routing Manager module 295 (or other CNS modules) may send one or more such routing communications to the other of the managed virtual computer networks provided to entities Z and Y, if any specified peering configuration information for the virtual peering router 215 authorizes such forwarding, such as to provide that other managed virtual computer network with information about computing nodes of the other managed virtual computer network that are accessible via the virtual peering router 215 (e.g., for computing nodes of those managed virtual computer networks that participate in the routing protocol for that managed virtual computer network).

In addition, while the example of FIG. 2F involved a communication that was sent from a first computing node associated with a first communication manager module (i.e., from computing node A associated with Communication Manager module R) to a second computing node associated with a distinct second communication manager module (i.e., to computing node I associated with Communication Manager module S), in other situations a communication may be sent between two computing nodes of two distinct virtual computer networks that are associated with a single communication manager module. For example, computing node A of the first virtual computer network may instead send a communication to computing node B 205b of the second virtual computer network, with both computing nodes A and B being associated with Communication Manager module R (as discussed in greater detail with respect to FIG. 2A). In such situations, the communication will be handled in a manner similar to that described in FIG. 2F, but that single associated communication manager module may manage the forwarding of the communication between the computing nodes without forwarding a copy of the communication over the inter-connection network 250, in a manner similar to that discussed previously.

In this manner, the CNS system may provide virtual networking functionality corresponding to the configured network topology, without any special configuration of the computing nodes of the managed virtual computer network or of the physical networking devices of the intervening substrate inter-connection network, based on the Communication Manager modules overlaying the virtual computer network on the actual physical inter-connection network in such a manner as to emulate the configured network topology. In addition, multiple modules of the CNS system may operate together in a distributed manner to provide functionality corresponding to a particular virtual networking device, such as with modules 210, 260 and 290 operating together in the previous example to emulate functionality corresponding to each of virtual router devices 270a and 270b.

In addition, while the example of FIG. 2F involves an inter-connection between two managed computer networks that are provided to clients, in other embodiments the configurable network service may provide other types of inter-connections for managed computer networks. As one example, the configurable network service may provide one or more specialized managed computer networks that each provides one or more particular types of functionality that may be of use to managed computer networks provided to clients, and the configurable network service may enable particular clients to elect to connect their managed computer networks to one or more such specialized computer networks in order to receive the type(s) of functionality provided by those specialized computer network(s). For example, the configurable network service may provide a specialized managed computer network that provides access to the Internet or other computer systems external to the configurable network service, optionally with various functionality to analyze communications that are received and/or sent (e.g., firewall capabilities; intrusion detection system capabilities; intrusion prevention system capabilities; WAN acceleration capabilities; spam filtering capabilities; etc). Accordingly, if a particular client would like their managed virtual computer network to have interconnectivity with such external computer systems, but does not want to manage the various functionality to analyze incoming and/or outgoing communications, the client may configure their managed virtual computer network to be connected to such a specialized managed virtual computer network, such as by connecting to a virtual peering router created by the specialized managed virtual computer network. It will be appreciated that a variety of other types of functionality may similarly be provided by other such specialized managed computer networks.

Furthermore, as previously noted, the configurable network service may in some embodiments operate as a fee-based service, such that clients are customers that pay fees to the configurable network service. In such embodiments, the configurable network service may charge clients using various metrics and for various types of functionality that is provided. As one example, in embodiments in which the configurable network service provides specialized managed computer networks, the configurable network service may charge clients one or more fees for connecting to and/or otherwise using such a specialized managed computer network. More generally, clients may be charged for connecting to and/or using any virtual peering router, including virtual peering routers that connect two or more managed computer networks provided to clients. Other metrics on which fees may be based in at least some embodiments include, for example, one or more of the following: connecting to a virtual peering router; based on an amount of traffic sent and/or received via a virtual peering router; based on an amount of time that a virtual peering router is connected to or otherwise used; based on a quantity or rate of routing changes or other routing-related communications that are sent to or via a virtual peering router; based on a quantity or rate of routing changes or other routing-related communications that are received from or via a virtual peering router; based on the types of communications that are sent via a virtual peering router, including for various types of announcements or specialized types of communications (e.g., anycast communications, broadcast communications, etc.); for a virtual peering router to enforce client-specified routing filters or other specified restrictions on types of communications that are allowed or disallowed; for a virtual peering router to provide NAT functionality to manage inter-connections between two or more managed computer networks; etc. Furthermore, fees that are charged may have various forms, including one-time fees, ongoing subscription fees (e.g., with a certain fee for a specified period of time), usage-based fees (e.g., to vary with an amount of use of a particular type), etc.

In addition, the configurable network service may in some embodiments specify or enforce other types of restrictions on the use of virtual peering routers, whether instead of or in addition to fee-based restrictions. For example, a first client that initiates the creation or other providing of a virtual peering router for a managed computer network of the client, such as to enable other managed computer networks to inter-communicate with the first client's managed computer network, may specify various restrictions on the use that virtual peering router. Such restrictions may have various forms, including, for example, one or more of the following: restrictions on times when the virtual peering router is available; restrictions on an amount of time that a managed computer network may be connected to the virtual peering router; restrictions on particular clients or managed computer networks that may connect to the virtual peering router; etc. In other embodiments, each client who has a managed computer network connected to a virtual peering router may specify at least some types of restrictions regarding use of the virtual peering router (e.g., with respect to how/when/whether other managed computer networks may communicate with the client's managed computer network), and/or the configurable network service may specify at least some types of restrictions for at least some virtual peering routers (e.g., based on fees paid by the client(s) whose managed computer networks are connected to the virtual peering router, such as if the configurable network service provides different types of virtual peering routers or different types of capabilities for different fees; based on policies specified by the configurable network service for some or all virtual peering routers; etc.).

Thus, in this manner, the CNS system may further provide virtual networking functionality corresponding to configured network topologies and inter-connections, including in the manners discussed with respect to FIG. 2F to support connections between multiple managed computer networks via virtual peering router functionality provided by the CNS system. As previously noted, such virtual networking functionality may be provided without any special configuration of the computing nodes of the managed virtual computer networks or of the physical networking devices of the intervening substrate inter-connection network, such as based at least in part on the Communication Manager modules managing communications in appropriate manners, and/or on a Network Routing Manager module using configured network topology information and/or dynamically supplied routing information to handle communications for a managed virtual computer network.

In addition, as previously noted, various computing nodes may be selected for a managed virtual computer network and configured in accordance with a configured network topology of that managed virtual computer network in various manners. For example, in some embodiments, the selection of a computing node to be used in a managed virtual computer network and/or to be assigned a particular role in a configured network topology may be based at least in part on a geographical and/or network location of the computing node, such as an absolute location, or instead a location relative to one or more other computing resources of interest (e.g., other computing nodes of the same managed virtual computer network, storage resources to be used by the computing node, etc.), such as within a minimum and/or maximum specified geographical distance or other degree of proximity to an indicated other computing resource or other location. In addition, in some embodiments, factors used when selecting a computing node may be based in part or in whole on factors other than location, such as to include one or more of the following: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; etc.

As previously noted, in some embodiments, a program execution service executes third-party customers' programs using multiple physical computing systems (e.g., in one or more data centers) that each host multiple virtual machines, with each virtual machine being able to execute one or more programs for a customer. In some such embodiments, customers may provide programs to be executed to the program execution service, and may reserve execution time and other resources on physical or virtual hardware facilities provided by the program execution service. In addition, customers and/or the program execution service may define virtual computer networks that will be used by the program execution service for computing nodes of the customer, so as to transparently provide computing nodes of a virtual computer network with the appearance of operating on a dedicated physical network.

In addition, in some situations, a communication manager module may track or otherwise determine the virtual computer networks to which the module's associated computing nodes belong as part of managing the communications for the virtual computer networks. The determination by a communication manager module of a corresponding virtual computer network for a computing node may be performed in various ways in various embodiments, such as by interacting with a system manager module that provides that information, by tracking software programs executing on such computing nodes, by tracking entities associated with such computing nodes, etc. For example, when a particular computing node begins to execute one or more software programs on behalf of a user, and that user also has other software programs executing on other computing nodes, the new computing node executing the user's program(s) may be selected to be associated with a virtual computer network for the user that includes those other computing nodes. Alternatively, a user or other entity may specify a particular managed computer network to which a computing node belongs, such as if the entity maintains multiple distinct managed computer networks between different groups of computing nodes.

Various other types of actions than those discussed with respect to FIGS. 2A-2F may be performed in other embodiments, including for types of network addressing protocols other than IPv4 and IPv6.

Figure 3:
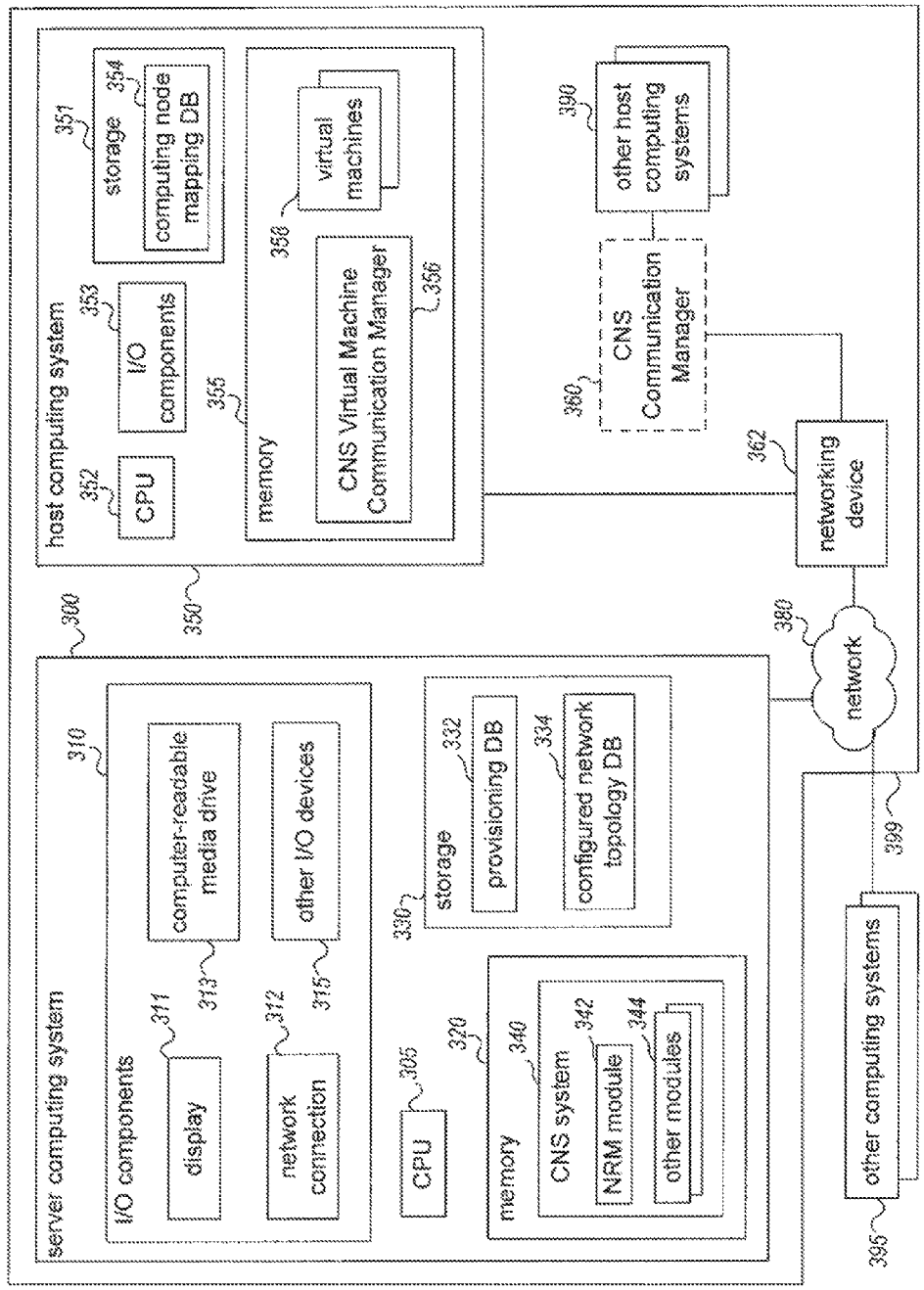
FIG. 3 is a block diagram illustrating example computing systems suitable for executing an embodiment of a system for managing communications between computing nodes.

FIG. 3 is a block diagram illustrating example computing systems suitable for executing an embodiment of a system for managing communications between computing nodes. In particular, FIG. 3 illustrates a group 399 of computing systems and inter-network(s), such as a data center or other group of co-located computing nodes. In some embodiments, some or all of the computing systems of the group 399 may be used by an embodiment of the CNS system to provide managed virtual computer networks to users or other entities. The group 399 includes a server computing system 300, a host computing system 350 capable of executing one or more virtual machines, other host computing systems 390 that are similar to host computing system 350, and an optional Communication Manager module 360 that manages host computing systems 390 and that executes on one of the computing systems 390 or on another computing system (not shown). The server computing system 300 and host computing systems 350 and 390 are connected to one another via an internal network 380, which includes a physical networking device 362 and other networking devices (not shown). The network 380 may be an inter-connection network that joins multiple disparate physical networks (not shown) for the group 399 and possibly provides access to external networks (not shown) and/or systems, such as other computing systems 395. In the illustrated example, the networking device 362 provides a gateway from the network 380 to the host computing systems 350 and 390. In some embodiments, networking device 362 may, for example, be a router or a bridge.

The computing system 300 operates to configure and manage virtual computer networks within the group 399, as well as to provide other functions (e.g., the provisioning, initialization, and execution of programs on computing nodes), including the managing of functionality corresponding to virtual peering routers. The computing system 300 includes a CPU 305, various I/O components 310, storage 330, and memory 320. The I/O components include a display 311, network connection 312, computer-readable media drive 313, and other I/O devices 315 (e.g., a mouse, keyboard, speakers, etc.).

The host computing system 350 operates to host one or more virtual machines, such as for use as computing nodes in managed virtual computer networks (e.g., computing nodes that execute programs on behalf of various users). The host computing system 350 includes a CPU 352, various I/O components 353, storage 351, and memory 355. While not illustrated here, the I/O components 353 may include similar components to those of I/O components 310. A virtual machine Communication Manager module 356 and one or more virtual machines 358 are executing in the memory 355 (and may each have an associated amount of storage 351 and/or other local computing resources), with the module 356 managing communications for the associated virtual machine computing nodes 358. The Communication Manager module 356 maintains various mapping information 354 on storage related to the computing nodes 358 and other computing nodes, such as in a manner similar to mapping information 212 and 262 of FIGS. 2A-2F. The structure of the other host computing systems 390 may be similar to that of host computing system 350, or instead some or all of the host computing systems 350 and 390 may act directly as computing nodes by executing programs without using hosted virtual machines. In a typical arrangement, the group 399 may include hundreds or thousands of host computing systems such as those illustrated here, organized into a large number of distinct physical sub-networks and/or networks.

An embodiment of a CNS system 340 is executing in memory 320 of the computing system 300. In some embodiments, the system 340 may receive an indication of multiple computing nodes to be used as part of a managed virtual computer network (e.g., one or more virtual machine computing nodes on host computing system 350 or one or more computing nodes using one of the host computing systems 390), and in some situations may select the particular computing node(s) for the managed virtual computer network. In some cases, information about the structure and/or membership of various managed virtual computer networks may be stored in the provisioning database 332 on storage 330 by the system 340, such as in a manner similar to information 292 of FIGS. 2A-2D and 2F, and provided to the Communication Manager modules at various times. Similarly, in some cases, information about the configured network topology of various managed computer networks (e.g., information about logical subnets, virtual networking devices, intermediate computing nodes along routing paths for communications between particular computing nodes, connections to other managed computer networks via one or more virtual peering routers, etc.) may be stored in the database 334 on storage 330 by the system 340, such as in a manner similar to information 296 of FIGS. 2C-2F, and provided to the Communication Manager modules at various times. In this example, the system 340 in memory 320 includes a Network Routing Manager ("NRM") module 342 and optionally other modules 344 (e.g., a system manager module, a payment module to obtain fees from clients if the system manager module does not include such payment-related functionality, etc.), with the communication manager modules 356 and 360 being a further part of the distributed CNS system. The NRM module 342 performs operations to facilitate the configuration and use of specified network topology for managed computer networks, such as in response to requests from clients and/or dynamically received routing information, as discussed elsewhere. In at least some embodiments, the NRM module 342, other modules 344, and/or various communication manager modules may each include software instructions that may be stored on long-term non-volatile storage (e.g., storage 330, storage 351, etc.) and may be loaded into memory (e.g., memory 320, memory 355, etc.) for execution by at least one of one or more processors (e.g., CPU 305, CPU 352, etc.), so as to program or otherwise configure those processors and the corresponding computing systems/devices to perform the described techniques.

As discussed in greater detail elsewhere, the Communication Manager modules 356 and 360 (and other Communication Manager modules, not shown, that manage other associated computing nodes, not shown) and the various modules 342 and 344 of the system 340 may interact in various ways to manage communications between computing nodes, including to provide virtual networking functionality corresponding to configured network topologies for provided virtual computer networks, including with respect to virtual peering routers. Such interactions may, for example, enable the computing nodes 358 and/or other computing nodes to inter-communicate over managed virtual computer networks without any special configuration of the computing nodes, by overlaying the virtual computer networks over network 380 and optionally one or more external networks (not shown) without any special configuration of networking device 362 or other networking devices (not shown), and optionally without encapsulation of communications.

It will be appreciated that computing systems 300, 350, 390, and 395, and networking device 362, are merely illustrative and are not intended to limit the scope of the present invention. For example, computing systems 300 and/or 350 may be connected to other devices that are not illustrated, including through one or more networks external to the group 399, such as the Internet or via the World Wide Web ("Web"). More generally, a computing node or other computing system may comprise any combination of hardware or software that can interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules, such as if the functionality of a system manager module and a network routing manager module are instead combined into a single module. Similarly, in some embodiments the functionality of some of the illustrated modules may not be provided and/or other additional functionality may be available. Furthermore, in some embodiments the functionality of a single illustrated module may be distributed across multiple related modules that provide the described functionality in an aggregate manner.

It will also be appreciated that, while various items are illustrated as being stored in memory or on storage while being used, these items or portions of them may be transferred between memory and other storage devices for purposes of memory management and data integrity. Alternatively, in other embodiments some or all of the modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 4 is a flowchart of an example embodiment of a CNS System Manager routine 400. The routine may be provided by, for example, execution of the system manager module 110 of FIG. 1B, the manager module 110 of FIG. 1A, the system manager module 290 of FIGS. 2A-2F, and/or a system manager module (not shown) of CNS system 340 of FIG. 3, such as to assist in managing communications between multiple computing nodes across one or more intermediate networks, including to manage communications so as to provide virtual networking functionality corresponding to configured network topologies of managed computer networks, including based on connections to virtual peering routers, as well as to perform other types of management operations in some situations. In at least some embodiments, the routine may be provided as part of a system that manages communications for multiple different entities across a common intermediate network, with the communications configured so as to enable each computing node to transparently communicate with other associated computing nodes using a private virtual computer network that is specific to that entity. Furthermore, the routine may facilitate preventing unauthorized communications from being provided to destination computing nodes, such as by assisting Communication Manager modules with determinations of whether communications are authorized.

In the illustrated embodiment, the routine begins at block 405, where a request is received. The routine continues to block 410 to determine the type of request. If it is determined that the type of request is to associate one or more computing nodes with a particular managed virtual computer network provided for an indicated entity, such as if those computing nodes are executing or are to execute one or more programs on behalf of that entity, the routine continues to block 415 to associate those computing nodes with that indicated entity and virtual computer network. In some embodiments, the routine may further determine the one or more computing nodes to be associated with the indicated entity and virtual computer network, such as based on information provided by the indicated entity, while in other embodiments the selection of such computing nodes and/or execution of appropriate programs on those computing nodes may be performed in other ways. In addition, as discussed in greater detail elsewhere, in some embodiments one or more of the computing nodes may each be a virtual machine that is hosted by one or more physical computing systems. The routine then continues to block 420 to store mapping information for the computing nodes and the managed virtual computer network. In particular, in the illustrated embodiment the routine stores for each computing node an indication of a physical substrate network address corresponding to the computing node, a virtual network address used by the entity for the computing node as part of the virtual computer network, optionally a virtual hardware address assigned to the computing node, and an indication of the associated entity. As discussed in greater detail elsewhere, the physical substrate network address corresponding to the computing node may in some embodiments be a substrate network address specific to that single computing node, while in other embodiments may instead refer to a sub-network or other group of multiple computing nodes, such as may be managed by an associated Communication Manager module. In addition, the specification of various network topology information for computing nodes and virtual networking devices is discussed in greater detail with respect to block 480 and FIGS. 6A-6B, such as to be further included in the stored mapping information as discussed in greater detail previously, although in other embodiments such information could further be received and stored with respect to block 420. After block 420, the routine continues to block 422 to optionally provide information about the computing nodes and their configuration to one or more communication manager modules associated with those computing nodes, although in other embodiments instead provides such information upon request from the communication manager modules.

If it is instead determined in block 410 that the type of received request is a request for address resolution for a virtual network address of a target computing node or other network device of interest, such as from a communication manager module on behalf of a managed computing node, the routine continues instead to block 425, where it determines whether the request is authorized in one or more ways, such as based on whether the managed computing node on whose behalf the request is made is authorized to send communications to a computing node whose virtual network address resolution is requested (e.g., based on the virtual computer network(s) to which the two computing nodes belong, and optionally any inter-connections between multiple such virtual computer networks via one or more virtual peering routers), based on whether the managed computing node on whose behalf the request is made is a valid computing node that is currently part of a configured virtual computer network, and/or based on whether the request is received from the communication manager module that actually manages the indicated computing node on whose behalf the request is made. If the request is determined to be authorized, the routine continues to block 430, where it obtains a virtual network address of interest for a particular virtual computer network, such as may be included with the request received in block 405, or previously stored and currently identifiable for the target computing node of interest based on other received information. The routine then continues to block 435 to retrieve stored information for the computing node that is associated with the virtual network address for the virtual computer network, and in particular information that associates that virtual network address to a physical substrate network address for a network location that corresponds to the computing node, such as may be previously stored with respect to block 420, and optionally to other information for the virtual network address (e.g., an associated virtual hardware address, an indication regarding whether the virtual network address corresponds to a physically implemented computing node with an actual substrate network address or instead to a virtual networking device that does not have an actual substrate network address, information about a role or status of the device corresponding to the virtual network address with respect to configured network topology information, information about whether the virtual network address corresponds to a distinct remote managed computer network that is reachable via connections ton one or more virtual peering routers, etc.). Furthermore, in situations in which the destination virtual network address corresponds to a distinct remote managed computer network that is accessible via a virtual peering router, and the virtual peering router is configured to provide NAT functionality with respect to communications between the two managed computer networks, the routine may further translate between the indicated virtual network address and a distinct actual virtual network address that is used for the destination computing node by the destination managed computer network. If communications from the computing node on whose behalf the request is made to the indicated computing node are to be routed via one or more intermediate computing nodes, the information that is provided may in part correspond to a first of those intermediate computing nodes, such as to include the actual substrate network address of that first intermediate computing node (whether instead of or in addition to the actual substrate network address for the indicated computing node). After block 435, the routine continues to 440 to provide an indication of the retrieved information to the requester. While not illustrated here, if the determination in block 425 determines that the request is not authorized, the routine may instead not perform blocks 430-440 for that request, such as by responding with an error message to the request received in block 405 or not responding to that received request. In addition, in other embodiments the routine may perform one or more other tests to validate a received request before responding with the requested information, such as to verify that the computing node that initiated the request is authorized to receive that information.

If it is instead determined in block 410 that the received request is to configure information regarding a specified network topology for an indicated managed virtual computer network and/or inter-connections between two or more managed virtual computer networks via one or more virtual peering routers, such as from a user associated with that virtual computer network (e.g., a user representative of the client on whose behalf the virtual computer network is provided), the routine continues to block 480 to perform a Network Routing Manager routine to manage the configuration. One example embodiment of such a Network Routing Manager routine is described in further detail with respect to FIGS. 6A-6B. In this illustrated embodiment, the Network Routing Manager routine manages the interaction with the user to obtain the configured network topology information (e.g., via an API and/or GUI of the configurable network service), and stores relevant configured network topology information in a manner that is accessible by the System Manager routine for later use (e.g., with respect to block 435), while in other embodiments the System Manager routine may instead manage those user interactions and/or that network topology information storage (e.g., by providing received configured network topology information to the Network Routing Manager routine for analysis after it is received by the System Manager routine, and by storing updated network topology information if it is received from the Network Routing Manager routine).

If it is instead determined in block 410 that the received request is of another type, the routine continues instead to block 490 to perform another indicated operation as appropriate. For example, in some embodiments, the routine may receive requests to update stored information about particular computing nodes, such as if a particular computing node was previously associated with a particular entity and/or virtual computer network (or portion of a virtual computer network, such as a specified logical subnet) but that association ends (e.g., one or more programs being executed for that entity on that computing node are terminated, the computing node fails or otherwise becomes unavailable, an associated user or other client changes specified configuration information for the computing node, etc.). The routine may also perform a variety of other actions related to managing a system of multiple computing nodes (e.g., charging fees to clients for particular functionality provided to those clients, obtaining payment from clients for such charged fees, etc.), as discussed in greater detail elsewhere, and may at times perform actions of other types, such as to perform occasional housekeeping operations to review and update stored information as appropriate (e.g., after predefined periods of time have expired). In addition, if possible validation problems are detected, such as with respect to received address resolution requests for virtual network addresses, the routine may take various actions to signal an error and/or perform other corresponding actions as appropriate. Furthermore, if the routine receives updated network topology information for a managed virtual computer network, such as from the client and/or from the Network Routing Manager module, the routine may proceed to store that information for later use as appropriate.

After blocks 422, 440, 480 or 490, the routine continues to block 495 to determine whether to continue, such as until an explicit indication to terminate is received. If it is determined to continue, the routine returns to block 405, and if not continues to block 499 and ends.

FIGS. 5A-5B are a flow diagram of an example embodiment of a CNS Communication Manager routine 500. The routine may be provided by, for example, execution of the Communication Manager modules 109a-109d, 108 and/or 150 of FIG. 1B, the Communication Manager modules 210 and/or 260 of FIGS. 2A-2F, the Communication Manager modules 356 and/or 360 of FIG. 3, and/or a communication manager module (not shown) of the CNS service 105 of FIG. 1A, such as to manage communications to and from an associated group of one or more computing nodes in order to provide a private virtual computer network over one or more shared intermediate networks, including to determine whether to authorize communications to and/or from the managed computing nodes, and to support providing virtual networking functionality corresponding to configured network topologies for managed virtual computer networks.

The routine begins at block 505, where an indication is received of a node communication or other message. The routine continues to block 510 to determine the type of communication or other message and proceed accordingly. If it is determined in block 510 that the message is a request from an associated managed computing node for network address resolution, such as an ARP request, the routine continues to block 515 to identify the virtual network address of interest indicated in the request. The routine then continues to block 520 to send a request to a system manager module for virtual network address resolution for the indicated virtual network address for the virtual computer network that is associated with the computing node that provided the request, such as discussed with respect to blocks 425-440 of FIG. 4. As discussed in greater detail elsewhere, the routine may in some embodiments track information about virtual computer networks and/or entities associated with each managed computing node, while in other embodiments at least some such information may instead be provided to the routine by the computing nodes, by the system manager module and/or by the network routing manager module, or instead the system manager module may track and store that information without it being provided to and tracked by the current routine. While not illustrated here, in other embodiments and situations such address resolution requests may be handled in other manners. For example, if a computing node being managed by a particular communication manager module provides an address resolution request for another computing node that is also managed by that communication manager module, the routine may instead respond to the request without interaction with the system manager module, such as based on locally stored information. In addition, while in the illustrated embodiment the received request is a request to provide a computing node's link-layer hardware address that corresponds to an indicated networking layer address, in other embodiments the address resolution request may have other forms, or computing nodes may request other types of information about indicated computing nodes.

In the illustrated embodiment, the routine next continues to block 525 to receive a response from the system manager module that includes a physical substrate network address and/or other information corresponding to the identified virtual network address, and stores information locally that maps that physical substrate network address and/or other information to a unique hardware address for later use by the routine (e.g., based on a dummy virtual hardware address generated by the routine or provided in the response), along with other information about the computing node as discussed in greater detail elsewhere. The routine then provides the hardware address to the requesting computing node, which it may use as part of one or more later communications that it sends to the computing node with the indicated virtual network address. As discussed in greater detail elsewhere, the physical substrate network address response that is provided may in some embodiments include a physical substrate network address that is specific to the indicated computing node of interest, while in other embodiments the physical substrate network address may correspond to another intermediate computing node via which communications to the indicated computing node of interest will be passed for some or all sending computing nodes, or may instead correspond to a sub-network or other group of multiple computing nodes to which the indicated computing node belongs, such as to correspond to another communication manager module that manages those other computing nodes. If only some inter-node communications to an indicated computing node of interest will be passed through a particular intermediate computing node, such as for only some sending computing nodes, it will be appreciated that the routine may obtain and store multiple entries for the indicated computing node of interest, such as to include different information to use for different sending computing nodes that initiate inter-node communications to the indicated computing node of interest. The routine next continues to block 530 to determine if blocks 515-525 were performed as part of the handling of an outgoing node communication, as discussed with respect to blocks 540-560, and if so, continues to block 547, or otherwise continues to block 595. While not illustrated here, in some embodiments the routine may instead receive an error response from the system manager module (e.g., based on the requesting computing node not being authorized to communicate with the indicated destination computing node) or no response, and if so may not send any response or a corresponding error message to the requesting computing node.

If it is instead determined in block 510 that the type of communication or other message is an outgoing communication from a computing node managed by the routine, such to another indicated remote destination computing node that is not managed by the routine and/or to an indicated virtual networking device, the routine continues to block 540. If the routine is being performed for a communication manager module that operates as an edge module to manage connections between a group of computing nodes connected by a substrate network (e.g., at a data center) and external computing systems, such outgoing communications correspond to communications entering the group of inter-connected computing nodes from external computing systems, and the routine proceeds to block 547 without performing blocks 540-545. In block 540, the routine identifies the indicated hardware address for the destination from the communication header for the outgoing communication. In block 545, the routine then determines whether that destination hardware address is a hardware address previously mapped to a physical substrate network address corresponding to the destination, such as previously discussed with respect to block 525. If not, in some embodiments the routine continues to block 515 to perform blocks 515-525 to determine such a corresponding physical network address for the outgoing node communication, while in other embodiments such actions are not performed (e.g., if the indicated hardware address is not a mapped address, the routine may cause the outgoing node communication to fail, such as with an error message back to the sending node).

If the indicated hardware address is a mapped address, or the check is not performed, the routine continues to block 547 to determine if the received communication is a routing-related communication, such as a communication intended for a virtual networking device or for a virtual peering router. If so, the routine continues to block 581, and otherwise continues to block 550 to retrieve the physical substrate network address that is mapped to the hardware address for the destination computing node to which the communication is directed (or to the destination network address for incoming communications from external computing systems). As discussed in greater detail elsewhere, if the communication is to be directed to one or more intermediate computing nodes along a routing path to the final destination computing node, the substrate network address that is used may correspond to a first such intermediate computing node as an initial destination. In addition, if the communication is sent from a first computing node of a first managed computer network and is directed to a second computing node of a distinct second managed computer network, and the first computing node is authorized to send the communication to the second computing node (e.g., based on the first and second managed computer networks each being connected to one or more inter-connected virtual peering routers, and based on corresponding peering configuration information specified for those one or more virtual peering routers), the substrate network address that is used corresponds to the second computing node, despite the second computing node being part of a different virtual computer network. After block 550, the routine in block 555 then rewrites the communication header in accordance with a networking address protocol for one or more intermediate networks between the communication manager module and the destination computing node using the physical substrate network address retrieved in block 550. The header re-writing may further include changing other information in the new header, including changing a virtual network address for the sending computing node to be a corresponding physical substrate network address so as to direct responses to a communication manager module associated with the sending computing node (e.g., to an edge communication manager module for an external computing system that sent the communication), and in at least some embodiments includes modifying the received communication without encapsulation as part of an overlay of the virtual computer network over the substrate one or more intermediate physical networks. Furthermore, for a communication whose destination hardware address does correspond to a virtual networking device, the routine in block 555 may further perform other modifications that correspond to providing virtual networking functionality to emulate the actions and functionality that would be performed by the one or more virtual networking devices that would be used to forward the communication to the destination computing node in accordance with the configured network topology for the virtual computer network. Similarly, for a communication that is directed to a computing node of a different managed computer network via one or more intermediate virtual peering routers, the routine in block 555 may further perform other modifications that correspond to providing virtual networking functionality to emulate the actions and functionality that would be performed by the one or more virtual peering routers that would be used to forward the communication to the destination computing node in accordance with the configured network topology for the virtual computer network. Moreover, in situations in which the one or more such virtual peering routers are configured to provide NAT functionality, the rewriting of the header may further include replacing the indicated virtual network address for the destination computing node with a distinct actual virtual network address for the destination computing node that is used by the destination managed computer network, although in other embodiments such NAT functionality may instead be performed in other manners (e.g., by a distinct communication manager module that receives the forwarded communication on behalf of the destination computing node).

In block 560, the routine then facilitates providing of the modified outgoing communication along the routing path to the destination computing node, such as by initiating forwarding of the modified outgoing communication over the substrate intermediate network(s) to the destination computing node. While not illustrated here, in other embodiments various additional types of processing may be performed for outgoing node communications, such as to verify that the communications are valid or otherwise authorized in various ways (e.g., to verify that the sending computing node is authorized to send communications to the destination computing node, such as based on being associated with the same entity or part of the same virtual computer network, based on the sending and destination computing nodes being associated with different entities that are authorized to inter-communicate, based on the sending and destination computing nodes being part of distinct managed computer networks that are inter-connected via one or more virtual peering routers, based on the type of communication or other information specific to the communication, etc.), to add and/or remove a VLAN identifier or other information about a VLAN configured for the network topology and associated with the communication (e.g., based on the type of VLAN communication links associated with the sending and destination computing nodes, such as if the communication manager module for an outgoing communication performs such a modification rather than the communication manager module for an incoming communication), etc.

Figure 6B:
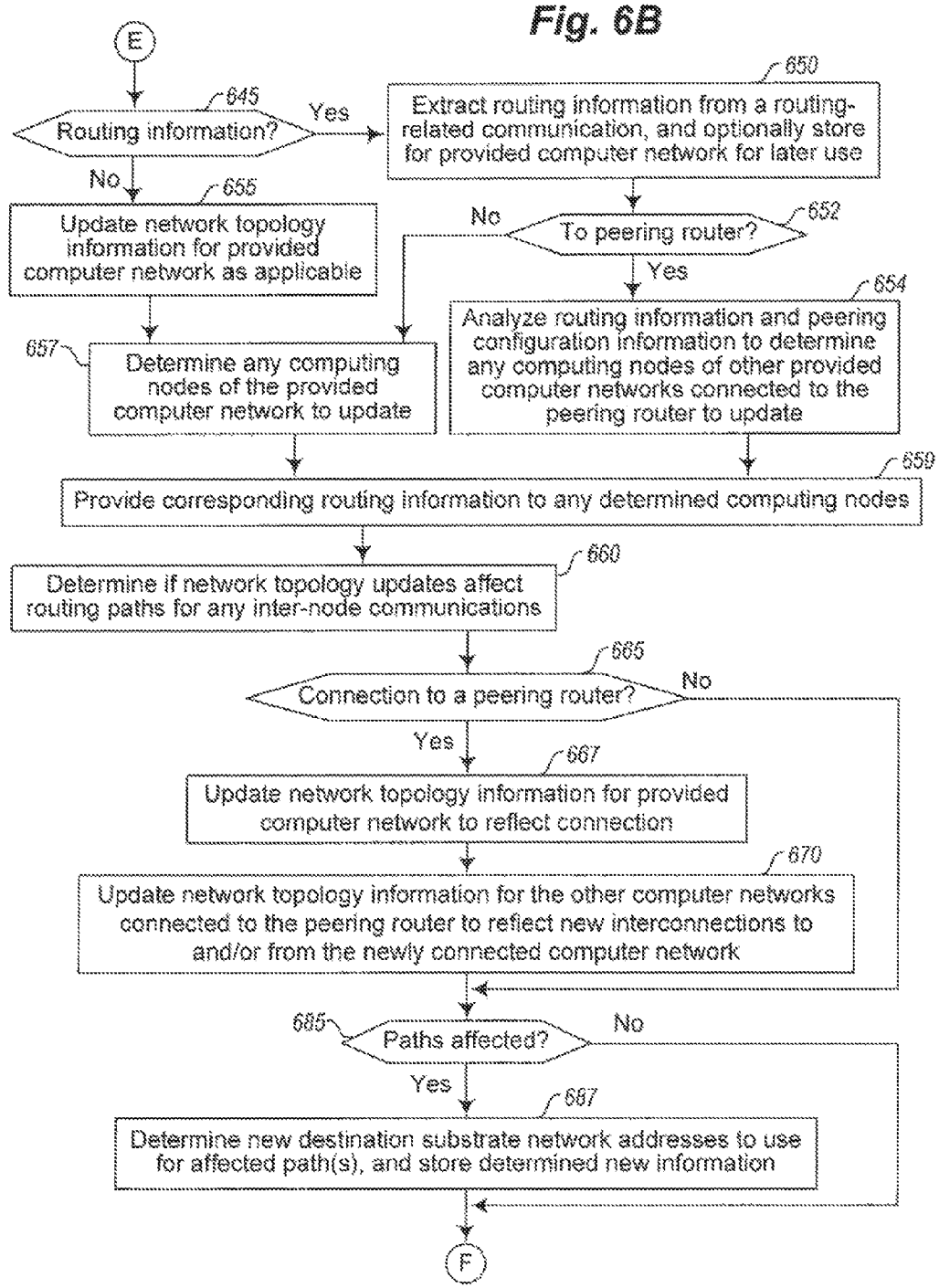

If it is instead determined in block 547 that the received communication is a routing-related communication intended for a virtual peering router or other virtual networking device, the routine continues instead to block 581 to forward the received routing-related communication to the Network Routing Manager routine for analysis, as discussed in greater detail with respect to FIGS. 6A-6B. The communication may be forwarded to the Network Routing Manager routine in various manners, including by re-headering the communication and forwarding it over the intermediate substrate network to a location of the Network Routing Manager module that performs the Network Routing Manager routine, in a manner similar to that discussed in greater detail elsewhere. In other embodiments, the routine may instead extract particular routing information from the communication and instead forward the extracted routing information to the Network Routing Manager routine as part of such a communication or instead in another manner (e.g., via a defined API of the Network Routing Manager). After block 581, the routine continues to block 583 to optionally generate a response communication to the computing node or external device from which the routing-related communication was received (e.g., to acknowledge receipt), such as if the predefined routing protocol in use includes such response communications, and forwards the generated response communication to that sender computing node or external device. After block 583, the routine continues to block 595.

If it is instead determined in block 510 that the received message is an incoming node communication for one of the managed computing nodes, such as an inter-node communication from an external computing node that is not managed by the communication manager module and/or a routing-related communication from the Network Routing Manager routine (e.g., a routing-related communication that is spoofed to include sender information corresponding to a virtual peering router or other virtual networking device), the routine continues to block 565. If the routine is being performed for a communication manager module that operates as an edge module to manage connections between a group of computing nodes connected by a substrate network (e.g., at a data center) and external computing systems, such incoming communications correspond to communications exiting the group of inter-connected computing nodes to external computing systems. In block 565, the routine identifies the physical substrate network addresses for the sender and for the destination computing node from the communication header. After block 565, the routine continues to block 570 to optionally verify that the incoming communication is valid in one or more ways. For example, the routine may determine whether the physical substrate network address for the sender is actually mapped to a sending computing node that corresponds to the source physical substrate network address location, such as based on interactions with a system manager module and/or based on other information previously obtained and stored by the routine. In addition, the routine may determine whether the physical substrate network address for the destination computing node corresponds to an actual managed computing node, or to an external computing system or device with which communications are authorized. While not illustrated here, if an incoming communication is determined to not be valid, the routine may take various actions not shown, such as to generate one or more errors and perform associated processing and/or drop the incoming communication without forwarding it to the indicated destination node. For example, if the incoming communication indicates a destination network address that does not correspond to a current managed computing node or authorized external device, the routine may drop the incoming communication and/or initiate an error message, although in some embodiments such error messages are not sent to the sending computing node.

In the illustrated embodiment, after block 570, the routine continues to block 575 to retrieve the hardware address and the network address that are mapped to the physical destination substrate network address, and to rewrite the communication header in a manner corresponding to the virtual computer network, so that it includes information directed to the destination computing node. For example, in some embodiments the destination network address may be obtained from the destination physical substrate network address itself, such as from a subset of the bits of the destination physical substrate network address, while in other embodiments the destination network address may be indicated in other manners (e.g., stored in one or more header fields of the communication). In addition, the destination hardware address may have previously been mapped to information about the location of the destination computing node, such as previously discussed with respect to block 525. In situations in which such prior mapping has not occurred, the routine may instead perform blocks 515-525 to obtain such information, although those actions are not illustrated here. The routine may similarly rewrite the communication header for the virtual computer network so that it appears to be sent from a sender with a source virtual network address and source hardware address corresponding to the sender. In addition, in at least some embodiments, the routine in block 575 may further perform other modifications to the incoming communication that correspond to providing virtual networking functionality to emulate the actions and functionality that would be performed if the communication was forwarded in a manner associated with a configured VLAN for the managed virtual computer network, such as to add and/or remove a VLAN identifier or other VLAN information, although in other embodiments such a modification is not performed for an incoming communication if it was instead performed for the communication when outgoing for another communication manager module, or if no modification is needed based on the configured VLAN communication links associated with the sending and destination computing nodes. Furthermore, in at least some embodiments, the routine in block 575 may further perform other modifications to the incoming communication that correspond to providing virtual networking functionality to emulate the actions and functionality that would be performed by one or more virtual peering routers and/or other virtual networking devices that would have been used to forward the communication to the destination computing node in accordance with the configured network topology for the virtual computer network. Moreover, in situations in which the communication was received from a computing node in another managed virtual computer network that is connected to the destination computing node's managed virtual computer network via one or more virtual peering routers, and in which one or more virtual peering routers are configured to provide NAT functionality, the rewriting of the header may further include replacing an initially indicated virtual network address for the destination computing node with a distinct actual virtual network address for the destination computing node that is used by the destination managed computer network, although in other embodiments such NAT functionality may instead be performed in other manners (e.g., by a distinct communication manager module that forwarded the communication on behalf of the sending computing node). After block 575, the routine continues to block 580 to facilitate providing of the modified incoming communication to the destination computing node, such as by initiating forwarding of the modified incoming communication to the destination node. While the incoming communication may be a routing communication that is directed to a managed computing node of the communication manager module by the Network Routing Manager, such routing communications may in other embodiments instead be generated by the communication manager module that manages that computing node (e.g., as instructed by the Network Routing Manager, and such as to include routing information supplied by the Network Routing Manager), and provided to the destination computing node.

If it is instead determined in block 510 that a message of another type is received, the routine continues to block 590 to perform another indicated operation as appropriate, such as to store information about entities associated with particular computing nodes, store information about configured network topologies for particular virtual computer networks (including connections to any virtual peering routers), respond to requests and other messages from computing nodes in a manner to provide virtual networking functionality corresponding to configured network topologies for virtual computer networks (e.g., by emulating actions and other functionalities that would be performed by specified virtual networking devices if they were physically implemented), update previously mapped or stored information to reflect changes with respect to computing nodes that are being managed or to remote computing nodes, etc. The storing and/or updating of stored information may be initiated in various manners, such as by receiving information in response to previous requests, receiving information that is proactively pushed to the routine without a corresponding request, etc. In addition, in embodiments in which clients pay fees for various types of functionality provided to them, such as usage-based fees, the routine may further track corresponding usage and provide such information to the system manager module (e.g., periodically, as soon as usage occurs, etc.).

After blocks 560, 580, 583, or 590, or if it is instead determined in block 530 that the processing is not being performed with respect to an outgoing communication, the routine continues to block 595 to determine whether to continue, such as until an explicit indication to terminate is received. If it is determined to continue, the routine returns to block 505, and if not continues to block 599 and ends.

FIGS. 6A-6B are a flow diagram of an example embodiment of a CNS Network Routing Manager routine 600. The routine may be provided by, for example, execution of the NRM module 342 of FIG. 3, the NRM module 295 of FIGS. 2E and 2F, the Network Routing Manager module 170 of FIG. 1B, a Network Routing Manager module (not shown) of the CNS service 105 of FIG. 1A, and/or a Network Routing manager module (not shown) that operates in conjunction with the System Manager module 290 of FIGS. 2A-2D and/or to support the virtual computer networks 175 of FIG. 1C, such as to manage the configuration of specified network topology information for managed computer networks, including interconnections between managed computer networks via one or more virtual peering routers. In the illustrated embodiment, the routine may be invoked by, for example, execution of block 480 of FIG. 4 and/or directly in response to a request initiated by a client of the CNS system, and may receive information forwarded by block 581 of FIGS. 5A-5B. In addition, in the illustrated embodiment of the routine, a Network Routing manager module facilitates the configuration of specified network topology information for managed virtual computer networks, and provides corresponding information to a system manager module that further interacts with communication manager modules based on the specified network topology information—in other embodiments, however, various functionality may be distributed in other manners, such as to combine some or all functionality of a Network Routing manager module, a system manager module, and/or one or more communication manager modules.

The routine begins at block 605, where an indication is received of information related to the configuration of a managed computer network. The routine continues to block 610 to determine whether the indication is related to the initial configuration of network topology information for a managed virtual computer network, such as part of initially creating the managed virtual computer network. If so, the routine continues to block 615 to obtain various information about the configured network topology, such as information previously received in block 605, or by interacting with a user or other entity for a client providing the configuration information. The obtained information may include, for example, information regarding logical subnets of the managed computer network and optionally corresponding computing nodes and/or virtual networking devices: information about any computing nodes that are configured to act as intermediate computing nodes for at least some inter-node communications for at least some computing nodes, information about any special-purpose handling of at least some inter-node communications for at least some computing nodes, etc.

The routine next continues to blocks 620-635 to analyze the received configuration information to determine particular information to use in routing communications between computing nodes. In particular, in block 620, the routine selects the next computing node of the managed computer network, beginning with the first. In block 625, the routine then, for each other computing node of the managed computer network, determines if inter-node communications from the selected computing node to the other computing node are configured to pass through one or more intermediate computing nodes based on the configured network topology. If so, the routine selects the substrate network address for a first such intermediate computing node to use for communications directed from the selected computing node to the other computing node, and otherwise selects the substrate network address for the other computing node to use for such inter-node communications. In block 630, the routine then stores such received information (e.g., in a manner accessible to a system manager module, such as by providing the received information to the system manager module), and optionally provides the configuration information (e.g., in a push manner) to one or more communication manager modules, including the communication manager module that manages the selected computing node. In block 635, the routine then determines if there are more computing nodes to analyze, and if so returns to block 620, and otherwise continues to block 695. While illustrated here as performing the analysis in a serial manner for individual computing nodes, in other embodiments and situations such analysis may be performed in other manners.

If it is instead determined in block 610 that the received indication is related to a possible update of network topology information for a managed virtual computer network, such as based on a routing-related communication received via a communication manager module and/or based on an update to network topology information specified by the associated client, the routine continues to block 645. In block 645, the routine determines whether routing information has been received in a routing communication for a managed computer network, and if so continues to block 650 to extract the routing information from the communication and optionally store it for later use (e.g., as discussed with respect to block 690). After block 650, the routine continues to block 652 to determine whether the routing communication was directed to a virtual peering router from the managed computer network. If so, the routine continues to block 654, and otherwise continues to block 657 to handle the routing communication sent within the managed computer network. In block 657, the routine determines if there are any computing nodes of the managed computer network to update with the received routing information, such as based on the configured network topology of the managed computer network. In particular, if the received routing information was directed to a particular virtual networking device of the managed computer network, the routine may identify other computing nodes of the managed computer network to which that networking device would forward routing information if that networking device were physically provided, such as based on the network topology of the managed computer network. For example, if the routing-related communication was sent by a first computing node of the managed computer network that participates in one or more routing-related protocols, and was directed to a specified virtual networking device of the managed computer network that connects the first computing node to one or more other second computing nodes of the managed computer network that also participate in one or more routing-related protocols for the managed computer network, the routine may select at least one (e.g., all) of the second computing nodes to receive corresponding routing information. The routine may determine such computing nodes of the managed computer network that participate in one or more routing protocols for the managed computer network in various manners, such as based on configuration information supplied by a client for whom the managed computer network is provided, and/or based on tracking which computing nodes issue routing-related communications.

If the routine instead continues to block 654 to handle a routing communication directed to a virtual peering router from a managed computer network, the routine in block 654 analyzes the routing information in the routing communication, as well as any peering configuration information previously specified for the managed computer network and for any other managed computer networks connected to the virtual peering router (whether directly connected to that virtual peering router, or indirectly via one or more other virtual peering routers that are connected to that virtual peering router). As part of the analysis, the routine identifies any other managed computer networks that are connected to the virtual peering router to which the received routing information should be forwarded, and determines particular computing nodes of those identified managed computer network(s) to update with the received routing information.

After blocks 654 or 657, the routine then continues to block 659 to provide routing information that corresponds to the routing information obtained in block 650 to the computing nodes determined in block 654 or 657, such as by sending a routing communication with such corresponding routing information to each of the determined computing nodes. If the routing information obtained in block 650 was directed to a particular virtual networking device of the managed computer network, the routine may determine particular routing information that the particular virtual networking device would forward on if that networking device were physically provided, such as in a manner relative to a position of that virtual networking device based on the network topology of the managed computer network. For example, if the virtual networking device is configured to select shortest paths to destinations by using distance-based cost information, the routine may use its available information for the entire managed computer network to determine the various shortest paths from the location of the virtual networking device to the various possible destinations, including based on the routing information received in block 650. Alternatively, if the routing information obtained in block 650 was directed to a particular virtual peering router, the routine may determine particular routing information that the virtual peering router would forward on if that peering router were physically provided, such as in a manner relative to connections of that virtual peering router to virtual networking devices and/or computing nodes of managed computer networks that are connected to that virtual peering router. It will be appreciated that the routine may operate in other manners in other embodiments, such as by determining best path information in manners other than using distance-based cost information, by determining best path information for a particular virtual networking device in a localized manner for that virtual networking device rather than using globally available information for the entire managed virtual computer network, etc. In addition, it will be appreciated that peering configuration information may be specified in various manners, including by indicating policies at varying degrees of specificity and abstractness, and may be analyzed in various manners to determine how to handle routing communications and computing node communications directed to the virtual peering router.

If it is instead determined in block 645 that the network topology information is received from the client, the routine continues to block 655 to update the stored network topology information for the managed virtual computer network in accordance with the received information. After block 655, the routine continues to block 657 and 659 to determine whether to send any routing information to any computing nodes of the managed computer network, as discussed above. After block 659, the routine continues to block 660 to determine if the updates corresponding to the received information affect the routing paths for any inter-node communications, such as in a manner similar to that previously discussed with respect to blocks 620-635.

After block 660, the routine continues to block 665 to determine if the indication received in block 605 is an indication to connect an indicated managed virtual computer network to a virtual peering router, such as from the client to whom that managed virtual computer network is provided. If not, the routine continues to block 685, but otherwise continues to block 667 to update the network topology information for the indicated managed computer network to reflect the connection to the virtual peering router. A received indication to connect an indicated managed virtual computer network to a virtual peering router may be specified in various manners (e.g., by a client associated with the managed virtual computer network, such as via a GUI or API provided by the configurable network service; by the managed virtual computer network, such as based on a communication or other message that is directed to the virtual peering router or that otherwise indicates a request to communicate with the virtual peering router; etc.), and may in some embodiments and situations include various peering configuration information for the indicated managed virtual computer network. Depending on the existing configuration (if any) of the virtual peering router, including any other managed computer networks that are already connected to the virtual peering router, the update of the network topology information for the indicated managed computer network may include an indication that some or all of the computing nodes of one or more such other managed computer networks are now accessible to the indicated managed computer network. In addition, if the indication in block 605 is further to create or otherwise provide a new virtual peering router to which the indicated managed computer network is to be connected, the routine in block 667 may further perform various operations to create that virtual peering router, including to store any peering configuration information specified by the client for the virtual peering router (e.g., information regarding how/when/whether other managed computer networks may connect to the virtual peering router and/or may send or receive communications via the virtual peering router). After block 667, the routine continues to block 670 to update network topology information for any other managed computer networks that were previously connected to the virtual peering router, in order to reflect the new connection of the indicated managed computer network to the virtual peering router. In a manner similar to that for the newly connected indicated managed computer network, and depending on the existing peering configuration (if any) of the virtual peering router and/or new peering configuration (if any) by the client for the indicated managed computer network of the virtual peering router, the update of the network topology information for the other managed computer networks may include an indication that some or all of the computing nodes of the indicated managed computer network are now accessible to one or more of the other managed computer networks. While not illustrated in blocks 667-670, the routine may in some embodiments take further actions when a request to connect an indicated managed computer network to an indicated virtual peering router is received, including to determine whether the establishment of that new connection is authorized. Such a determination of authorization may be made in various manners (e.g., based on previously specified peering configuration for the virtual peering router, such as from a creator of the virtual peering router and/or from one or more other managed computer networks that are already connected to the virtual peering router and/or from the configurable network service; based on querying the other managed computer networks that are already connected to the virtual peering router or the clients to whom those other managed computer networks are provided, or otherwise receiving an indication that those other managed computer networks do not reject the new connection; etc.), and if a connection request is determined not to be authorized, the routine continues instead to block 685 without performing blocks 667-670. In addition, as part of performing blocks 667 and/or 670, the routine may in some embodiments determine to send one or more routing communications to the newly connected managed computer network and/or to one or more previously connected managed computer networks (e.g., to provide information about other connected managed computer networks, such as in accordance with peering configuration information specified for the virtual peering router), such as in a manner similar to that previously discussed with respect to blocks 654, 657 and 659, while in other embodiments the routine will instead wait until routing communications directed to the virtual peering router are received from connected managed computer networks, and handle such received routing communications accordingly (as discussed with respect to blocks 654, 657 and 659).

After block 670, the routine continues to block 685 to determine if any routing paths for inter-node communications are affected by the indication received in block 605, such as based on the determination with respect to block 660. If so, the routine continues to block 687, and otherwise continues to block 689. In block 687, the routine determines a new destination substrate network address to use for each destination computing node in an affected routing path for inter-node communications for one or more sending computing nodes, in a manner similar to that discussed with respect to block 625 and elsewhere. The routine then stores the determined new information as part of the network topology information for the managed computer network. After block 687, or if the routine determines in block 685 that there are not any affected paths, the routine continues to block 689 to optionally update the mapping information stored by one or more communication manager modules affected by changes that result from the indication received in block 605, such as one or more routing path changes and/or one or more changes to configured network topology and accessible computing nodes based on connection of a managed computer network to a virtual peering router. In addition, in block 689, the routine optionally initiates the sending of one or more routing-related communications to one or more managed computer networks (e.g., to computing nodes of those managed computer networks that participate in a routing protocol for those managed computer networks), such as to reflect routing changes corresponding to a connection of an indicated managed computer network to a virtual peering router, or to indicate other routing information.

If it is instead determined in block 610 that a message of another type is received, the routine continues to block 690 to perform another indicated operation as appropriate. For example, as discussed in greater detail elsewhere, in some embodiments the routine may generate and send routing information to at least some computing nodes of a managed computer network that participate in a routing protocol for that managed computer network, including in a manner that is specific to the context of the recipient computing node within the configured network topology of the managed computer network, and/or in a manner to coordinate the routing information provided to the various computing nodes. The generation and sending of such routing information may be initiated in various manners, such as based on received routing information and/or other updates to configured network topology information (e.g., as discussed with respect to block 689), in a periodic manner, etc. In addition, in embodiments in which clients pay fees for various types of functionality provided to them, such as fees for connecting to virtual peering routers and/or for at least some routing-related communications that are received or sent, the routine may further track corresponding operations and provide such information to the system manager module (e.g., periodically, as soon as usage occurs, etc.).

After blocks 689 or 690, or if it is determined in block 635 that there are no more computing nodes, the routine continues to block 695 to determine whether to continue, such as until an explicit indication to terminate is received. If it is determined to continue, the routine returns to block 605, and if not continues to block 699 and ends.

In addition, various embodiments may provide mechanisms for customer or other client users and other entities to interact with an embodiment of the system manager module for purpose of configuring computing nodes and their communications. For example, some embodiments may provide an interactive console (e.g. a client application program providing an interactive user interface, a Web browser-based interface, etc.) from which users can manage the creation or deletion of virtual computer networks, and the configuration of network topology information for virtual computer networks (including connection to and other use of virtual peering routers), as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In some embodiments, some or all of the functionality of an embodiment of the CNS system may be provided in exchange for fees from users or other entities acting as customers or other clients of the CNS system, as discussed previously, and if so the mechanisms for such clients to interact with an embodiment of the system manager module may include mechanisms for users and other entities to provide payment and payment-related information, as well as to monitor corresponding payment information, and the CNS system may take various actions to obtain appropriate payments from such clients. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services. Additional details related to the operation of example embodiments of a program execution service and/or configurable network service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" U.S. application Ser. No. 11/692,038, filed Mar. 27, 2007 and entitled "Configuring Intercommunications Between Computing Nodes;" and U.S. application Ser. No. 12/332,214, filed Dec. 10, 2008 and entitled "Providing Access To Configurable Private Computer Networks;" each of which is incorporated herein by reference in its entirety. In addition, additional details related to the management of provided virtual networks that may be used by at least some embodiments of a CNS system, such as in conjunction with an Overlay Network Manager module of such a CNS system, are available in U.S. application Ser. No. 12/060,074, filed Mar. 31, 2008 and entitled "Configuring Communications Between Computing Nodes;" in U.S. application Ser. No. 12/414,260, filed Mar. 30, 2009 and entitled "Providing Logical Networking Functionality For Managed Computer Networks;" and in U.S. application Ser. No. 12/491,818, filed Jun. 25, 2009 and entitled "Providing Virtual Networking Functionality For Managed Computer Networks;" each of which is also incorporated herein by reference in its entirety.

It will also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. a university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-component application (e.g., a multi-tiered business application) may in some embodiments use the described techniques to provide functional decomposition and/or isolation for the various component types (e.g., Web front-ends, database servers, business rules engines, etc.). More generally, the described techniques may be used to virtualize physical networks to reflect almost any situation that would conventionally necessitate physical partitioning of distinct computing systems and/or networks.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable storage medium whose contents configure a computing system to perform a method, the method comprising:
   under control of the configured computing system,
      receiving information from a first client for use in configuring a first virtual computer network for the first client, the configuring including specifying inter-connections between multiple first computing nodes of the first virtual computer network, the configuring further including specifying a first connection between the multiple first computing nodes and a virtual peering router that enables interactions with one or more other second virtual computer networks that have multiple second computing nodes; and
      automatically providing the first virtual computer network in accordance with the configuring by overlaying the first virtual computer network on a distinct substrate network, the providing of the first virtual computer network including:
         establishing the first connection between the first virtual computer network and the virtual peering router;
         after the one or more second virtual computer networks have established one or more second connections to the virtual peering router, and after one or more routing communications are received from at least one of the second virtual computer networks that are directed to the virtual peering router via at least one of the established second connections, forwarding the received one or more routing communications to the first virtual computer network based at least in part on configuration information associated with the virtual peering router that includes first peering configuration information supplied by the first client for the virtual peering router, the first peering configuration information preventing routing communications from any virtual computer networks other than the one or more second virtual computer networks to be sent to the first computing nodes of the first virtual computer network via the virtual peering router, the forwarding being performed without physically providing the virtual peering router and including automatically determining whether to perform the forwarding based at least in part on the first peering configuration information; and
         automatically determining to not forward one or more additional routing communications to the first virtual computer network that are directed to the virtual peering router by one or more third virtual computer networks distinct from the one or more second virtual computer networks.

2. The non-transitory computer-readable storage medium of claim 1 wherein the configured computing system is part of a configurable network service that provides multiple virtual computer networks to multiple remote clients, wherein the one or more second virtual computer networks are provided to the first client by the configurable network service, wherein the method further comprises automatically providing the one or more second virtual computer networks in accordance with information received from the first client by overlaying the one or more second virtual computer networks on the substrate network, wherein the computer-readable storage medium is a memory of the configured computing system that stores the contents, and wherein the contents are instructions that when executed program the computing system to perform the method.

3. The non-transitory computer-readable storage medium of claim 1 wherein the one or more second virtual computer networks are each overlaid on the substrate network, wherein the established one or more second connections are logical connections, and wherein the method further comprises receiving the one or more routing communications by intercepting the one or more routing communications before the one or more routing communications are forwarded over the substrate network.

4. The non-transitory computer-readable storage medium of claim 1 wherein the established first connection is a logical connection, and wherein the method further comprises receiving one or more additional routing communications that are directed to the virtual peering router via the established first connection from the first virtual computer network, and sending the received one or more additional routing communications to one or more of the second computing nodes of the one or more second virtual computer networks in accordance with the configuration information associated with the virtual peering router.

5. The non-transitory computer-readable storage medium of claim 1 wherein the specified inter-connections for the first virtual computer network include one or more first networking devices, and wherein the providing of the first virtual computer network is performed without physically providing the one or more first networking devices and further includes forwarding a plurality of communications over the substrate network, the forwarded plurality of communications including multiple communications for the first virtual computer network that are forwarded between the multiple first computing nodes over the substrate network in a manner that emulates functionality that would be provided by the one or more first networking devices if the one or more first networking devices were physically provided.

6. The non-transitory computer-readable storage medium of claim 1 wherein the establishing of the first and second connections includes enabling the multiple first computing nodes of the first virtual computer network to direct communications to the multiple second computing nodes of the one or more second virtual computer networks, and wherein the method further comprises forwarding a plurality of communications over the substrate network, the forwarded plurality of communications including multiple first communications for the first virtual computer network that are forwarded between the multiple first computing nodes over the substrate network, the forwarded plurality of communications further including multiple second communications that are forwarded from the first virtual computer network to the one or more second virtual computer networks via the established first and second connections in a manner that emulates functionality that would be provided by the virtual peering router if the virtual peering router was physically provided.

7. The non-transitory computer-readable storage medium of claim 1 wherein the forwarding of the received one or more routing communications to the first virtual computer network includes selecting at least one of the multiple first computing nodes to receive the forwarded routing communications based at least in part on the selected at least one first computing nodes participating in a first routing protocol used by the first virtual computer network, wherein the received one or more routing communications are specified in accordance with a second routing protocol that is used by the one or more second virtual computer networks and that is distinct from the first routing protocol, and wherein the method further comprises automatically modifying the forwarded one or more routing communications to be specified in accordance with the first routing protocol.

8. The non-transitory computer-readable storage medium of claim 1 wherein the first peering configuration information indicates one or more filters to limit routing communications that are allowed to be sent to the first computing nodes of the first virtual computer network via the virtual peering router from other virtual computer networks, and wherein the method further comprises automatically limiting additional routing communications that are forwarded to the first virtual computer network via the virtual peering router in accordance with the first peering configuration information.

9. The non-transitory computer-readable storage medium of claim 1 wherein the first peering configuration information indicates one or more filters to limit routing communications that are allowed to be sent to the first computing nodes of the first virtual computer network via the virtual peering router from another virtual computer network based at least in part on information about a client for whom the another virtual computer network is provided, and wherein the automatic determining of whether to perform the forwarding of the received one or more routing communications includes retrieving information about a second client associated with the one or more second virtual computer networks and performing the determining based at least in part on the retrieved information.

10. The non-transitory computer-readable storage medium of claim 1 wherein the first peering configuration information indicates one or more filters to limit routing communications that are allowed to be sent to the first computing nodes of the first virtual computer network via the virtual peering router from another virtual computer network based at least in part on information about the another virtual computer network, and wherein the automatic determining of whether to perform the forwarding of the received one or more routing communications includes retrieving information about the one or more second virtual computer networks and performing the determining based at least in part on the retrieved information.

11. The non-transitory computer-readable storage medium of claim 1 wherein the configured computing system is part of a configurable network service that provides multiple virtual computer networks to multiple remote clients, wherein the first virtual computer network and the one or more second virtual computer networks are part of the provided multiple virtual computer networks, wherein the configuration information associated with the virtual peering router further includes second peering configuration information supplied for the virtual peering router by a second client associated with the one or more second virtual computer networks, wherein the one or more second virtual computer networks are connected via a private connection to one or more external computer systems of the second client, wherein the second peering configuration information includes restrictions on sending routing information corresponding to the external computer systems outside of the second virtual computer network, wherein the received one or more routing communications include routing information corresponding to at least one of the one or more external computer systems, and wherein the forwarding of the received one or more routing communications includes preventing the routing information corresponding to at least one of the one or more external computer systems from being forwarded to the first virtual computer network based at least in part on the second peering configuration information.

12. The non-transitory computer-readable storage medium of claim 1 wherein the first peering configuration information includes one or more restrictions about which virtual computer networks are allowed to connect to the virtual peering router, and wherein the method further comprises automatically determining that the one or more second connections are authorized by the first peering configuration information before establishing the one or more second connections.

13. The non-transitory computer-readable storage medium of claim 1 wherein the method further comprises:
before receiving the one or more routing communications,
automatically providing a third virtual computer network for a third client in accordance with third configuration information specified by the third client, the third configuration information including third peering configuration information supplied by the third client for the virtual peering router; and
establishing a third connection from one or more third networking devices of the third virtual computer network to the virtual peering router; and
after the receiving of the one or more routing communications, automatically determining to not forward the received one or more routing communications to the third virtual computer network based at least in part on the third peering configuration information.

14. The non-transitory computer-readable storage medium of claim 13 wherein the virtual peering router to which the first and second connections are established is a first virtual peering router, and wherein the third connection is to the first virtual peering router via a distinct second virtual peering router, the first and second virtual peering routers being part of a group of two or more inter-connected virtual peering routers.

15. The non-transitory computer-readable storage medium of claim 1 wherein the information received from the first client includes an instruction from the first client to create the virtual peering router on behalf of the first client, and wherein the providing of the first virtual computer network further includes creating the virtual peering router by providing functionality to emulate functionality of the virtual peering router.

16. The non-transitory computer-readable storage medium of claim 1 wherein the configured computing system is part of a configurable network service that provides multiple virtual computer networks to multiple remote clients, wherein the first virtual computer network and the one or more second virtual computer networks are part of the provided multiple virtual computer networks, wherein the multiple first computing nodes are each a virtual machine hosted on one of multiple physical computing systems of the configurable network service, wherein the providing of the first virtual computer network further includes configuring one or more virtual machine communication manager modules that execute on one or more of the physical computing systems to manage communications for the hosted virtual machines, and wherein the establishing of the first connection and the forwarding of the received one or more routing communications are performed dynamically while the first virtual computer network is operational and without stopping use of the first virtual computer network based at least in part on management of communications by the virtual machine communication manager modules.

17. A computer-implemented method, comprising:
receiving information from a first client for use in configuring a first virtual computer network for the first client, the configuring including specifying inter-connections between multiple first computing nodes of the first virtual computer network; and
automatically providing the first virtual computer network in accordance with the configuring by overlaying the first virtual computer network on a distinct substrate network, the automatic providing of the first virtual computer network being performed by one or more configured computing systems and including:
establishing a first connection between the multiple first computing nodes of the first virtual computer network and a peering router;
after a second virtual computer network has established a second connection to the peering router, and after one or more routing communications are received from the second virtual computer network that are directed to the peering router via the established second connection, forwarding the received one or more routing communications to the first virtual computer network based at least in part on the established first connection and on first peering configuration information supplied by the first client for the peering router, the first peering configuration information preventing routing communications from virtual computer networks other than the second virtual computer network to be sent to the first virtual computer network via the peering router, the forwarding including automatically determining whether to perform the forwarding based at least in part on the first peering configuration information; and
automatically determining to not forward one or more additional routing communications to the first virtual computer network that are directed to the peering router by one or more third virtual computer networks distinct from the second virtual computer network.

18. The method of claim 17 wherein the one or more routing communications include information about one or more of multiple second computing nodes of the second virtual computer network, wherein the peering router is a virtual peering router, and wherein the forwarding of the received one or more routing communications to the first virtual computer network is performed without physically providing the virtual peering router and enables the multiple first computing nodes to send additional communications to the one or more second computing nodes.

19. The method of claim 17 wherein the one or more configured computing systems are part of a configurable network service that provides multiple virtual computer networks to multiple remote clients, and wherein the first virtual computer network and the second virtual computer network are part of the provided multiple virtual computer networks.

20. The method of claim 17 further comprising automatically providing the second virtual computer network for the first client in accordance with information received from the first client by overlaying the second virtual computer network on the substrate network.

21. The method of claim 17 wherein the first peering configuration information associated with the peering router by the first client indicates the one or more third virtual computer networks and indicates to block routing communications from the one or more third virtual computer networks.

22. A computing system, comprising:
one or more processors; and
a manager module that is configured to, when executed by at least one of the processors:
receive information from a first client for use in configuring a first virtual computer network for the first client, the configuring including specifying inter-connections between multiple first computing nodes of the first virtual computer network; and
automatically provide the first virtual computer network in accordance with the configuring by overlaying the first virtual computer network on a distinct substrate network, the automatic providing of the first virtual computer network including:
establishing a first connection between the multiple first computing nodes of the first virtual computer network and a peering router;
after a second virtual computer network has established a second connection to the peering router, and after one or more routing communications are received from the first virtual computer network that are directed to the peering router via the established first connection, forwarding the received one or more routing communications to the second virtual computer network based at least in part on the established second connection and on first peering configuration information supplied by the first client for the peering router, the first peering configuration information preventing routing communications to be sent to virtual computer networks other than the second virtual computer network via the peering router, the forwarding including automatically determining whether to perform the forwarding based at least in part on the first peering configuration information; and
automatically determining to not forward one or more additional routing communications from the first virtual computer network that are directed to the peering router to one or more third virtual computer networks distinct from the second virtual computer network.

23. The computing system of claim 22 wherein the peering router is a virtual peering router, wherein the forwarding of the received one or more routing communications to the second virtual computer network is performed without physically providing the virtual peering router and includes automatically determining whether to perform the forwarding based at least in part on first peering configuration information associated with the virtual peering router by the first client, and wherein the manager module includes software instructions for execution by the one or more processors.

* * * * *